(12) United States Patent
Ström et al.

(10) Patent No.: US 7,693,337 B2
(45) Date of Patent: Apr. 6, 2010

(54) MULTI-MODE ALPHA IMAGE PROCESSING

(75) Inventors: Jacob Ström, Stockhoolm (SE); Tomas Akenine-Möller, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 711 days.

(21) Appl. No.: 10/583,454

(22) PCT Filed: Dec. 17, 2004

(86) PCT No.: PCT/SE2004/001921

§ 371 (c)(1), (2), (4) Date: Jun. 19, 2006

(87) PCT Pub. No.: WO2005/059838

PCT Pub. Date: Jun. 30, 2005

(65) Prior Publication Data

US 2007/0019869 A1 Jan. 25, 2007

(30) Foreign Application Priority Data

Dec. 19, 2003 (SE) .................................... 0303497
Jul. 8, 2004 (SE) .................................... 0401850

(51) Int. Cl.
- G06K 9/36 (2006.01)
- H03M 7/00 (2006.01)
- G09G 5/00 (2006.01)
- G09G 5/02 (2006.01)

(52) U.S. Cl. .................... 382/233; 382/166; 341/50; 341/106; 345/582; 345/589; 345/592; 345/601

(58) Field of Classification Search ................ 382/100, 382/162, 232, 166, 233, 239; 341/1, 4, 75, 341/51, 52, 55, 56, 82, 106, 109, 173, 200; 345/418, 419, 582, 589, 591, 592, 593, 600, 345/601, 602, 643

See application file for complete search history.

(56) References Cited

U.S. PATENT DOCUMENTS 5,444,800 A 8/1995 Kim (Continued)

FOREIGN PATENT DOCUMENTS

CN 1307782 A 8/2001

(Continued)

OTHER PUBLICATIONS

Delp et al., "Image Compression Using Block Truncation Coding" IEEE Transactions on Communications, vol. COM-27, No. 9, pp. 1335-1342, Sep. 1979.

(Continued)

Primary Examiner—Andrew W Johns
Assistant Examiner—Thomas A Conway
(74) Attorney, Agent, or Firm—Nixon & Vanderhye P.C.

(57) ABSTRACT

An alpha image encoding and decoding scheme operable according two different modes is disclosed. In the encoding, an alpha image is decomposed into alpha image blocks (600) comprising image elements (610). The blocks (600) are compressed into block representations (700) according to one of the two compression modes. A block representation (700) comprises a color codeword (720), an intensity codeword (730), an alpha codeword (740) and a sequence (750) of image element associated indices indicative of one of the codewords (730, 740). The compression and decompression mode to use for a block (600) is determined based on the alpha codeword (740). In a high alpha-resolution mode, the index sequence (750) comprises alpha indices selecting one of the quantized alpha values (740A, 740B) of the alpha codeword (740) and intensity indices selecting an intensity modifier from a modifier set represented by the intensity codeword (730). In a high luminance-resolution mode, the index sequence (750) only comprises intensity indices.

31 Claims, 17 Drawing Sheets

U.S. PATENT DOCUMENTS

| | | | |
|---|---|---|---|
| 5,748,904 | A | 5/1998 | Huang et al. |
| 5,793,371 | A | 8/1998 | Deering |
| 5,835,244 | A | 11/1998 | Bestmann |
| 5,926,647 | A * | 7/1999 | Adams et al. ............ 712/36 |
| 5,956,431 | A | 9/1999 | Iourcha et al. |
| 6,023,266 | A | 2/2000 | Eglit et al. |
| 6,297,826 | B1 | 10/2001 | Semba et al. |
| 6,404,923 | B1 | 6/2002 | Chaddha |
| 6,636,222 | B1 | 10/2003 | Valmiki et al. |
| 6,658,146 | B1 | 12/2003 | Iourcha et al. |
| 6,687,411 | B1 | 2/2004 | Miura et al. |
| 7,251,360 | B2 | 7/2007 | Takahashi |
| 2003/0053706 | A1 | 3/2003 | Hong et al. |
| 2003/0090709 | A1 | 5/2003 | Rijavec |
| 2004/0218812 | A1 | 11/2004 | Douglas |
| 2007/0019869 | A1 | 1/2007 | Strom et al. |
| 2007/0071333 | A1 | 3/2007 | Strom et al. |
| 2007/0127812 | A1 | 6/2007 | Strom |
| 2007/0140554 | A1 | 6/2007 | Strom et al. |
| 2007/0237404 | A1 | 10/2007 | Strom |

FOREIGN PATENT DOCUMENTS

| | | |
|---|---|---|
| EP | 0 739 139 | 10/1996 |
| EP | 1 118 963 A1 | 7/2001 |
| WO | WO 2005/059836 | 6/2005 |
| WO | 2006/006915 | 1/2006 |
| WO | WO2006/126949 A1 | 11/2006 |
| WO | WO 2007/021227 A1 | 2/2007 |
| WO | WO 2007/117206 | 3/2007 |

OTHER PUBLICATIONS

Campbell et al., Two Bit/Pixel Full Encoding, Siggraph '86, vol. 20, No. 4, pp. 215-223, Aug. 1986.

Fenny, "Texture Compression using Low-Frequency Signal Modulation", Graphics Hardware 2003, pp. 84-91, Jul. 2003.

Akenine-Möller et al., "Graphics for the Masses: A Hardware Rasterization Architecture for Mobile Phone", ACM Transactions on Graphics, vol. 22, No. 3, Proceedings of ACM SIGGRAPH 2003, pp. 801-808, Jul. 2003.

International Search Report for PCT/SE2004/001921 dated Apr. 6, 2005.

International Application Status Report in Application No. PCT/SE2007/050127, Mar. 20, 2007.

International Search Report in International Application No. PCT/SE2007/050127, Oct. 30, 2007.

U.S. Appl. No. 10/582,988 filed Jun. 15, 2006; Inventor: Strom.

U.S. Appl. No. 10/583,453 filed Jun. 19, 2006; Inventor: Strom.

U.S. Appl. No. 10/582,689 filed Jun. 13, 2006; Inventor: Strom.

U.S. Appl. No. 11/401,444 filed Apr. 11, 2006; Inventor: Strom.

U.S. Office Action mailed Mar. 9, 2009 in related U.S. Appl. No. 10/582,988.

U.S. Office Action mailed Mar. 9, 2009 in related U.S. Appl. No. 10/582,689.

U.S. Office Action mailed Mar. 3, 2009 in related U.S. Appl. No. 10/583,453.

U.S. Office Action mailed May 15, 2009 in related U.S. Appl. No. 11/401,444.

U.S. Office Action mailed Sep. 16, 2009 in related U.S. Appl. No. 10/583,453.

Chinese Office Action mailed Mar. 7, 2008 in corresponding CN application 200480038094.6.

Y. Linde, A. Buzo and R. Gray, "An algorithm for vector quantizer design", IEEE Transactions on Communications, vol. 28, pp. 84-94, Jan. 1980.

Said et al, "A New, Fast, and Efficient Image Codec Based on Set Partitioning in Hierarchical Trees", IEEE Transactions on Circuits and Systems for Video Technology, vol. 6, No. 3, Jun. 1996, pp. 243-250.

Pettersson et al., "Texture Compression: Thumb—Two Hues Using Modified Brightness", XP-002396817, 2005, pp. 7-12.

Ström et al., "iPackman: High-quality, Low-Complexity Texture Compression for Mobile Phones", XP-002396818, Graphics Hardware, Jul. 30-31, 2005, pp. 64-70.

European Standard Search Report completed Aug. 30, 2006.

* cited by examiner

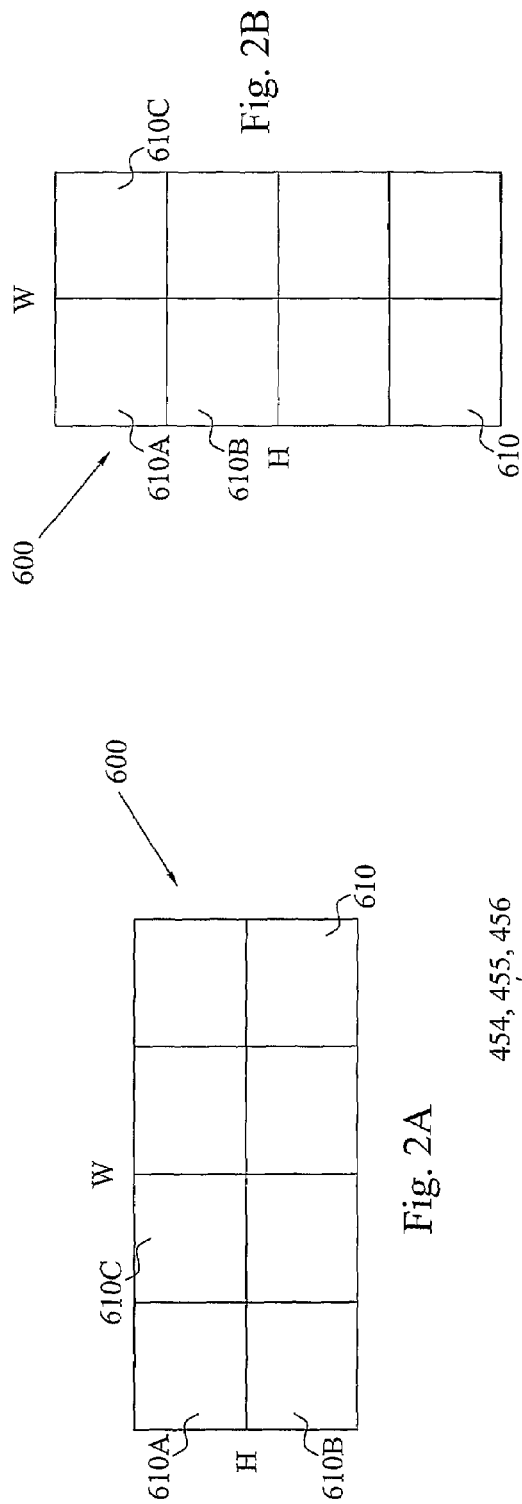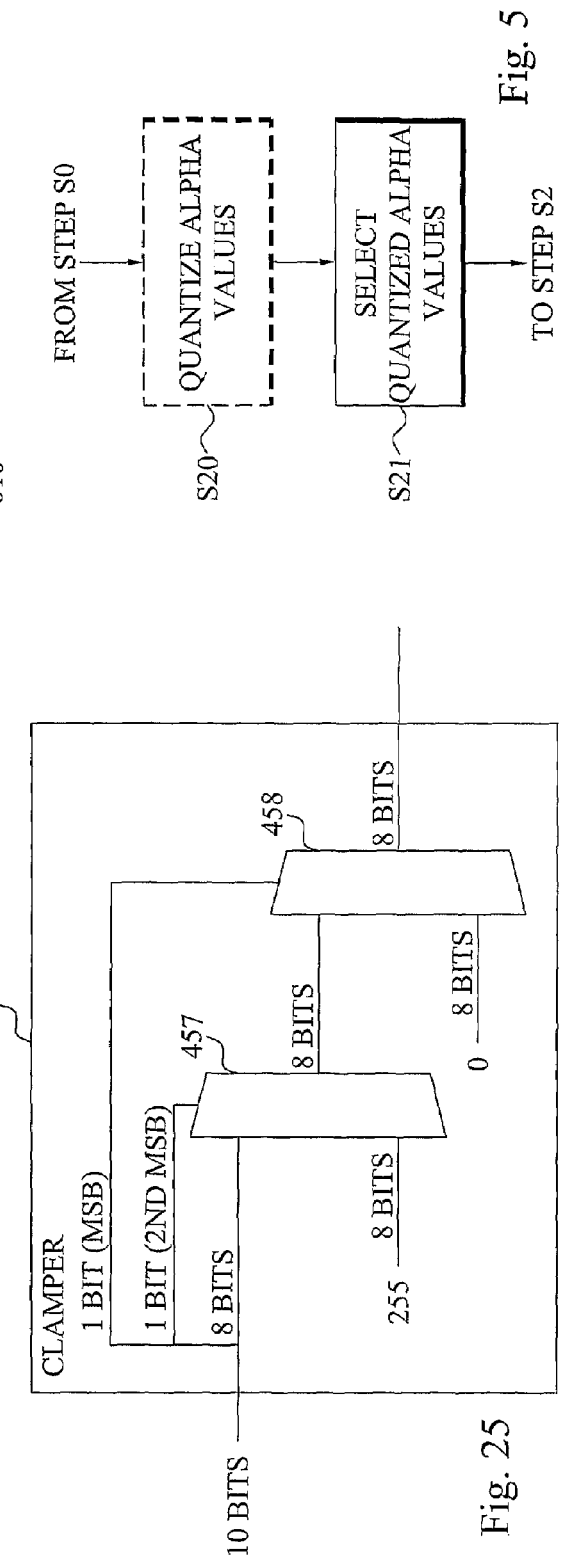

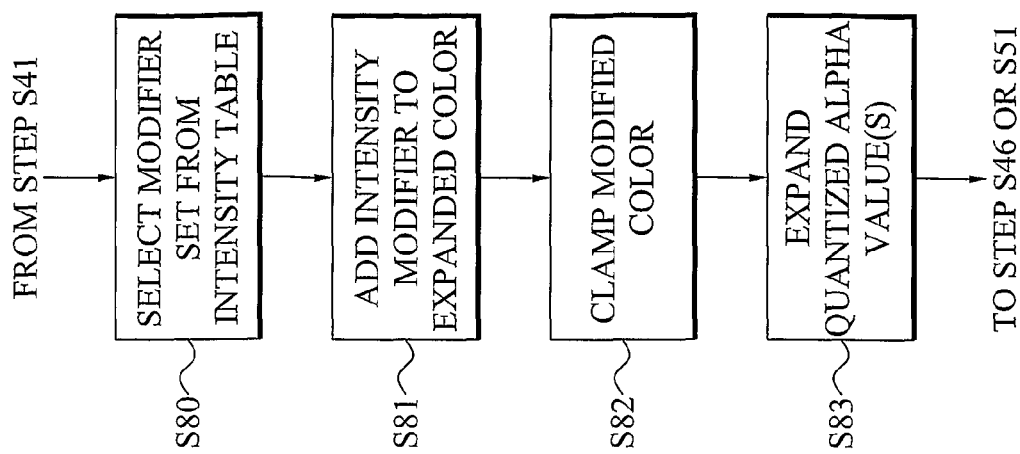
Fig. 10
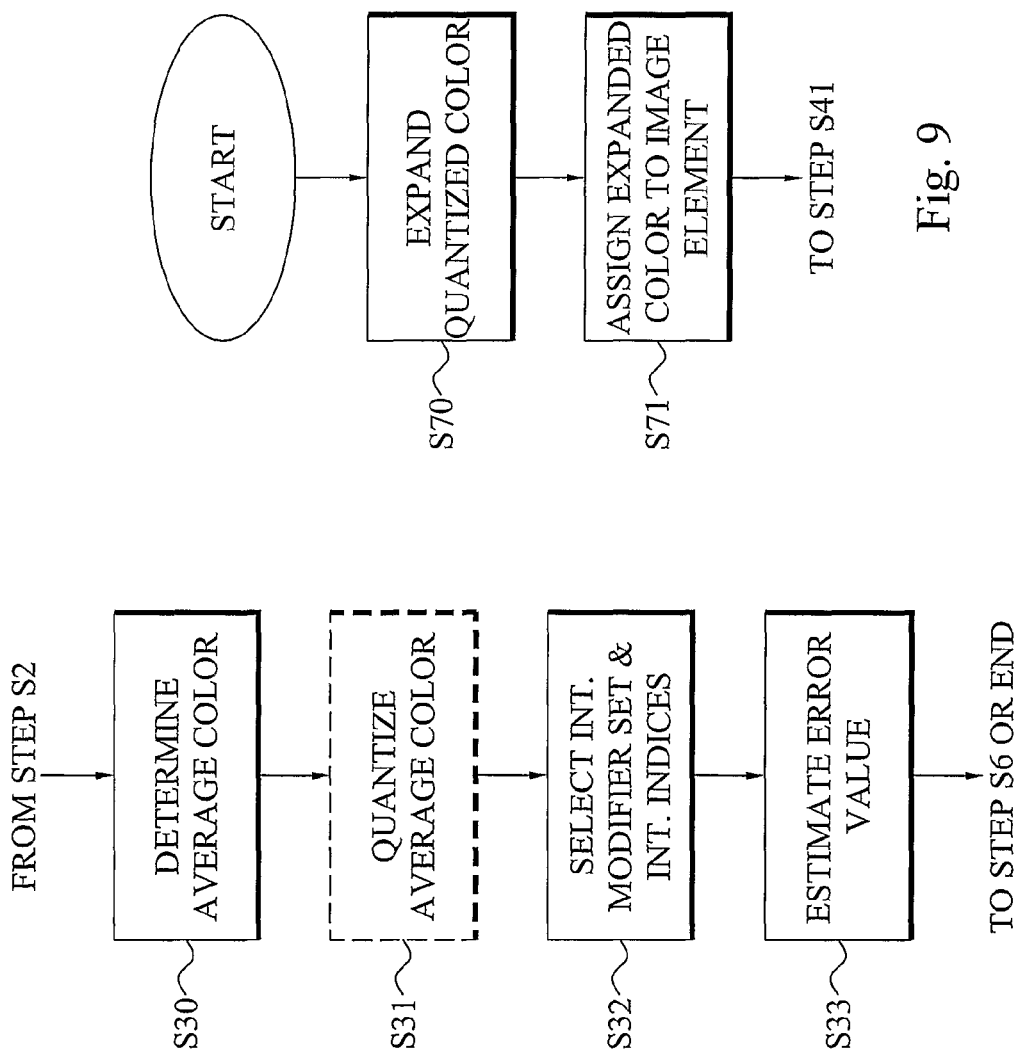
Fig. 9
Fig. 6

MULTI-MODE ALPHA IMAGE PROCESSING

This application is the U.S. national phase of international application PCT/SE2004/001921 filed 17 Dec. 2004, which designated the U.S. and claims priority to SE 0303497-2 filed 19 Dec. 2003, and SE 0401850-3 filed 8 Jul. 2004, the entire contents of each of which are hereby incorporated by reference.

TECHNICAL FIELD

The present invention generally refers to image processing, and in particular to methods and systems for encoding and decoding images.

BACKGROUND

Presentation and rendering of images and graphics on data processing systems and user terminals, such as computers, and in particular on mobile terminals have increased tremendously the last years. For example, three-dimensional (3D) graphics and images have a number of appealing applications on such terminals, including games, 3D maps and messaging, screen savers and man-machine interfaces.

A 3D graphics rendering process typically comprises three sub-stages. Briefly, a first stage, the application stage, creates several triangles. The corners of these triangles are transformed, projected and lit in a second stage, the geometry stage. In a third stage, the rasterization stage, images, often denoted textures, can be "glued" onto the triangles, increasing the realism of the rendered image. The third stage typically also performs sorting using a z-buffer.

However, rendering of images and textures, and in particular 3D images and graphics, is a computationally expensive task in terms of memory bandwidth and processing power required for the graphic systems. For example, textures are costly both in terms of memory, the textures must be placed on or cached in fast on-chip memory, and in terms of memory bandwidth, a texture can be accessed several times to draw a single pixel.

In order to reduce the bandwidth and processing power requirements, an image (texture) encoding method or system is typically employed. Such an encoding system should result in more efficient usage of expensive on-chip memory and lower memory bandwidth during rendering and, thus, in lower power consumption and/or faster rendering. This reduction in bandwidth and processing power requirements is particularly important for thin clients, such as mobile units and telephones, with a small amount of memory, little memory bandwidth and limited power (powered by batteries).

In addition to efficiently and accurately compressing and decompressing an image, there is a general desire that the texture compression and decompression systems should have the capability of managing alpha components. Such alpha components can be used to represent transparent or semi-transparent pixels or texels in the textures, which are used in a wide range of applications.

In a patent description U.S. Pat. No. 5,956,431, Iourcha et al. disclose a texture compression scheme called S3TC (S3 Texture Compression) or DXTC (DirectX Texture Compression). An image is decomposed into a number of image blocks of 4 pixels×4 pixels. Each such image block is encoded into a bit sequence of 64 bits, thus resulting in a compression rate of 4 bpp (bits per pixel). The 64-bit sequence comprises two basic colors or color codewords (16 bits each) and a 32-bit sequence of 2-bit indices, one index for each pixel in the image block. During decoding, a color palette of four colors is generated. The first two RGB (red, green and blue) colors of the palette correspond to the two basic colors (codewords). The two additional colors, situated between the basic colors in the RGB space, are then interpolated therefrom. Each 2-bit index then identifies, for each pixel, one of the four colors of the palette to use for that pixel.

Although, the S3TC scheme works fairly well for computer terminals, it is not well adapted for mobile units and other thin clients. Such mobile units typically only have memory busses of 16 or 32 bits at best. Thus, at least two, and possibly up to four, memory accesses are required to read out the 64-bit compressed version of an image block, if S3TC is implemented in a mobile unit. In addition, during the interpolation of the two additional colors of the color palette, multiplication by $\frac{1}{3}$ and $\frac{2}{3}$ is performed, which is not ideal in hardware. The compression using S3TC is also relatively time consuming, at least on a mobile terminal.

The S3TC scheme handles alpha textures as a special case. The bits are then interpreted differently in order to allow for a so-called punch-through alpha. This simple version of alpha mechanism represents each pixel as either being completely opaque or transparent. The fact that S3TC cannot handle more accurate alpha is one of the major drawbacks of the system.

SUMMARY

The technology disclosed herein overcomes these and other drawbacks of the prior art arrangements.

It is a general object of the technology disclosed herein to provide an efficient image processing.

It is another object of the technology disclosed herein to provide an efficient image encoding and image decoding.

Yet another object of the technology disclosed herein is to provide image encoding and decoding adapted for usage in thin clients with low memory and memory bandwidth capacity.

A further object of the technology disclosed herein is to provide image encoding and decoding adapted for alpha images comprising transparent and/or semi-transparent image elements.

These and other objects are met by the technology disclosed herein.

Briefly, the technology disclosed herein involves alpha image processing in the form of encoding (compressing) an alpha image and decoding (decompressing) an encoded (compressed) image.

An alpha image to be encoded is decomposed into a number of image blocks comprising multiple image elements (pixels, texture elements, texels, or volume elements, voxels). An image block preferably comprises eight image elements and preferably has a size of $2^m \times 2^n$ image elements, where m=3−n and n=0, 1, 2, 3, or a size of $2^m \times 2^n \times 2^p$, where m, n, p=0, 1, 2, 3 and preferably m+n+p=3. Each image element in a block is characterized by a color, e.g. a 24-bit RGB (red, green, blue) color, and an alpha or transparency value, e.g. an 8-bit alpha value. The individual image blocks are then compressed.

In this lossy block compression, multiple codewords representing properties of the image elements in the block are determined. Furthermore, an index sequence of image element associated indices is provided for the block. This sequence comprises, for at least a subset of the image elements in the block, an index associated with one of the codewords or a property representation generated based on one of the codewords.

The block compression technology disclosed herein can be performed according to one of two different alpha compression modes. The use of two different compression modes provides flexibility to the encoding method by being able to better adapt to the properties of the individual image blocks in the alpha image. As a consequence of having a choice, per block basis, between two different compression modes, the image quality of the processed image is improved compared to the prior art alpha-adapted encoding schemes with a single (fixed) alpha encoding. The first compression mode technology disclosed herein provides a high alpha resolution. This mode is particularly suitable for compressing image blocks having image elements of varying alpha values. The second compression mode is a high luminance resolution mode that preserves the luminance (intensity) components better than the first mode, though at the cost of lower alpha resolution.

Both compression modes of the invention results in a compressed representation of an image block that comprises a color codeword, an intensity codeword, an alpha codeword and an index sequence.

The alpha codeword comprises multiple quantized alpha values that are representations of at least one alpha value of the image elements in the block. The actual choice of compression mode to use for a current image block is based on this alpha codeword, preferably based on at least one of the quantized alpha values of the alpha codeword, such as based on a comparison of the multiple quantized alpha values of the alpha codeword. In an implementation of the invention, the first compression mode is selected if the multiple quantized alpha values differ, whereas the second compression mode is used when all quantized alpha values are equal. In an alternative implementation, one of the quantized alpha values has a combined alpha coding and mode representing functionality. In such a case, this quantized alpha value is used for determining operational mode.

The color codeword is a representation of the colors of the image elements in the image block. Correspondingly, the intensity codeword is a representation of a set of multiple intensity modifiers for modifying the intensity of the image elements in the block. The intensity codeword is preferably an index or pointer into an intensity table comprising multiple intensity modifier sets. In such a case, the intensity codeword is associated with one of these multiple modifier sets. The intensity table could include modifier values that are common to both compression modes. Alternatively, mode-specific intensity tables with mode-adapted intensity modifier values could be employed.

In the first compression mode, the index sequence comprises an alpha index subsequence and an intensity index subsequence. The alpha index subsequence in turn comprises, for each image element in at least a portion of the image elements in the block, an alpha index associated with a quantized alpha value from the multiple quantized alpha values of the alpha codeword. In a preferred embodiment of the invention, this alpha index subsequence comprises, for each image element in a first portion of the image elements in the block, an alpha index associated with one of the multiple quantized alpha values. Each image element in a second remaining portion of the image elements in the block is associated with a pre-defined quantized alpha value from the multiple quantized alpha values. Thus, no alpha index is required for this (these) image element(s) of the second portion.

The intensity index subsequence comprises, for each subset of at least one image element, an intensity index associated with an intensity modifier from the intensity modifier set associated with the intensity codeword. In a first embodiment of this compression mode, a pair of (neighboring) image elements in the block share the same intensity index. Thus, the intensity index subsequence then comprises four intensity indices for an image block with eight image elements. In a second embodiment of this compression mode, each image element has an own intensity index. However, then an intensity index is preferably associated with an intensity modifier from a subset of the intensity modifier set or from a modifier set that comprises fewer modifier values compared to a modifier set used in connection with pairwise associated indices.

In the second compression mode, the index sequence comprises, for each image element in the image block an intensity index associated with an intensity modifier from the intensity modifier set.

In the second compression mode no alpha indices are available for the image elements in the block. Thus, all the image elements of the block will be associated with a same alpha value. This should be compared to the first compression mode, where each image element is associated with an alpha value.

In a preferred example embodiment, a compressed representation of an image block is a 32-bit sequence independent of the employed compression mode. This compressed image block then preferably comprises a 9-bit color codeword, a 3-bit intensity codeword, a 4-bit alpha codeword, a 15-bit index sequence in the first compression mode or a 16-bit index sequence, of which one bit is shared by the alpha codeword in the second compression mode, and a 1-bit mode index indicating that the image block is an alpha image block.

During decoding, the compressed image block(s) that should be decompressed is identified and fetched from e.g. a memory location. Once the correct compressed image block is identified a decompression mode to use for the block is determined based on the alpha codeword.

Thereafter, a color representation is generated for at least one of the image elements of the image block. This color generation is performed based on the color codeword in the compressed block representation. An intensity modifier set is provided using the intensity codeword, preferably by identifying the modifier set from an intensity table. The intensity modifier to use for the image element that should be decoded is then selected from the provided modifier set based on the intensity index associated with the image element and found in the intensity index sequence. Once the correct intensity modifier value is selected, the intensity of the image element is modified with this value.

A correct quantized alpha value is identified using an alpha index or a pre-defined association in the first mode. In the second mode all quantized alpha values are equal so no selection thereof is required. An alpha value is generated for the image element based on the identified quantized alpha value.

Due to the small (32-bit) size of an encoded image block, the technology disclosed herein is well adapted for thin clients with limited memory capacity and bandwidth. In addition, the encoding is very fast so that it can be performed also in terminals with low clock frequencies. Furthermore, the decoding can extremely simply be implemented in e.g. hardware using only a few standard components.

The technology disclosed herein offers the following advantages:

Gives high quality (peak signal/noise ratio) for alpha images due to the flexibility of having access to two potential compression and decompression operational modes adapted for different alpha image blocks;

Hardware implementation of decoding is extremely simple;

Encoder and decoder can easily be extended to also manage non-alpha image blocks and non-alpha images;

Encoding is very fast, which enables implementations also in terminals with low clock frequencies;

Exhaustive encoding is possible at feasible speed on a computer; and

Encoded image data has a size that is suited for thin clients with limited memory capacity and bandwidth.

Other advantages offered by the technology disclosed herein will be appreciated upon reading of the below description of example embodiments.

SHORT DESCRIPTION OF THE DRAWINGS

The invention together with further objects and advantages thereof, may best be understood by making reference to the following description taken together with the accompanying drawings, in which:

FIGS. 2A and 2B illustrate example embodiments of an image block technology disclosed herein;

FIG. 5 is a flow diagram illustrating the alpha codeword determining step of FIG. 1 in more detail;

FIG. 6 is flow diagram illustrating the steps of determining color codeword, providing intensity codeword and providing intensity index sequence of FIG. 1 in more detail;

FIG. 9 is a flow diagram illustrating the color representation generating step of FIG. 7 in more detail;

FIG. 10 is a flow diagram illustrating the steps of providing modifier set, selecting modifier, modifying intensity and generating alpha value of FIG. 7 in more detail;

Figure 11:
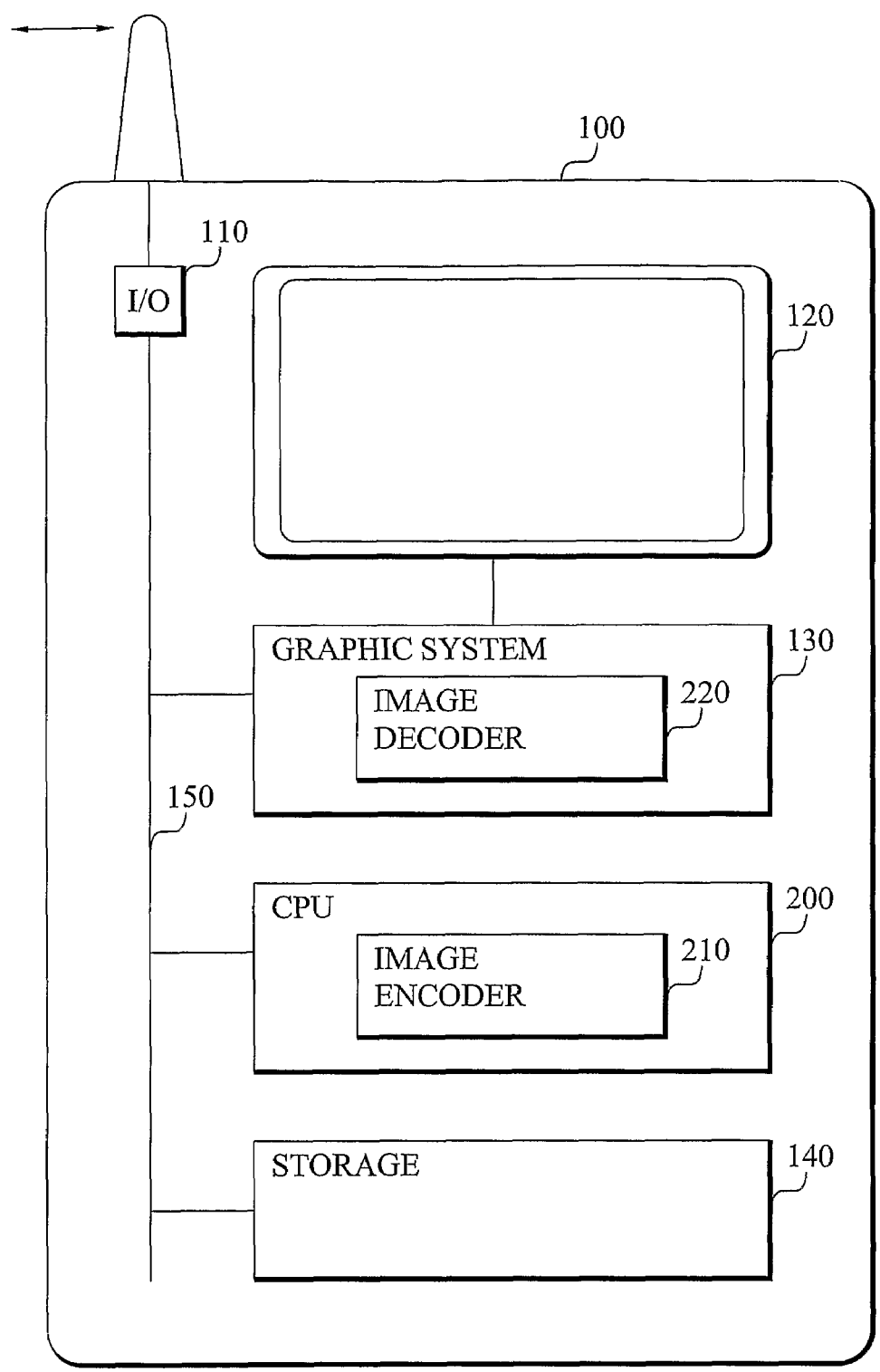
Figure 15:
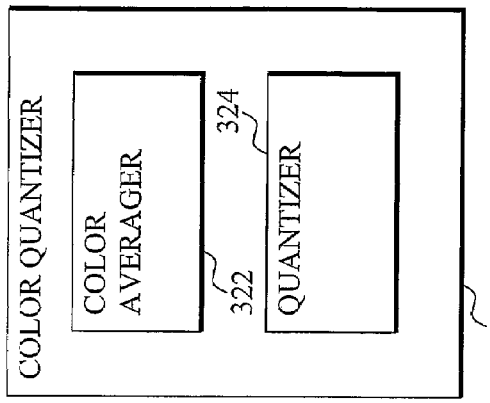
Figure 16:
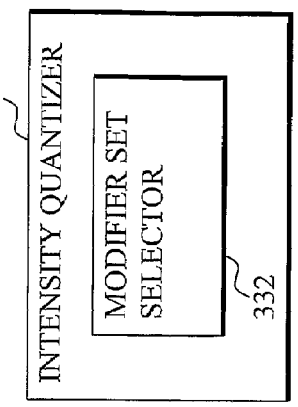
Figure 13:
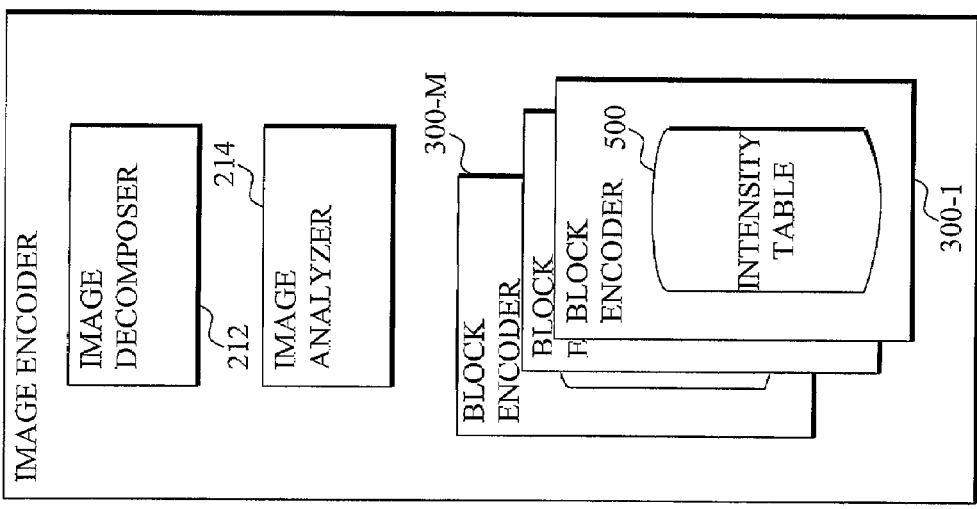
Figure 12:
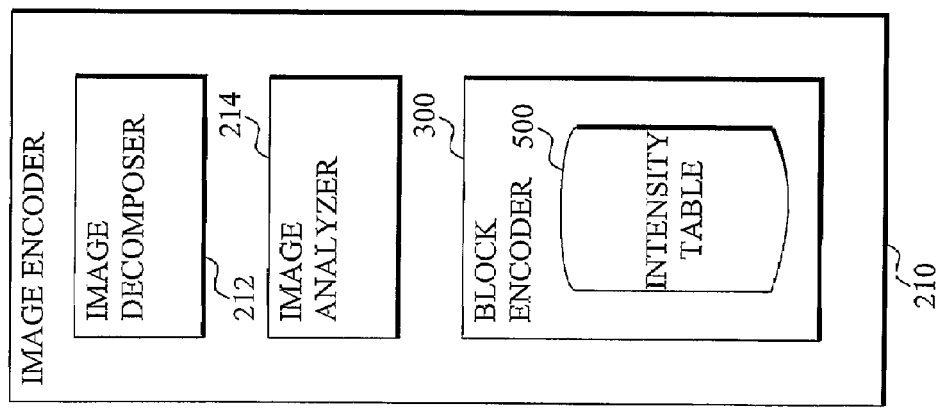
Figure 17:
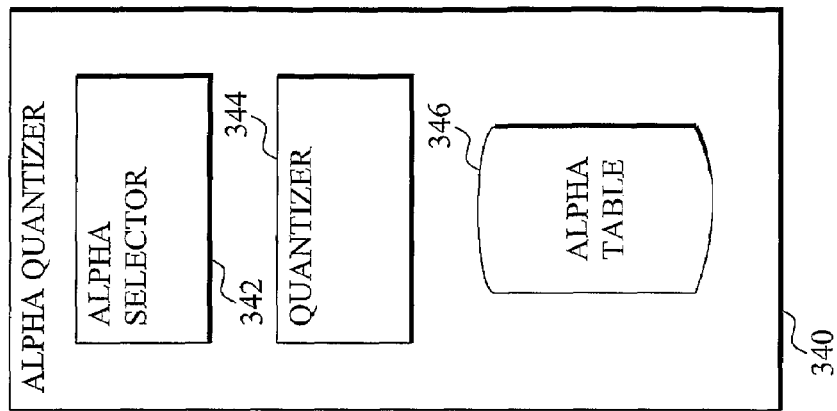
Figure 14:
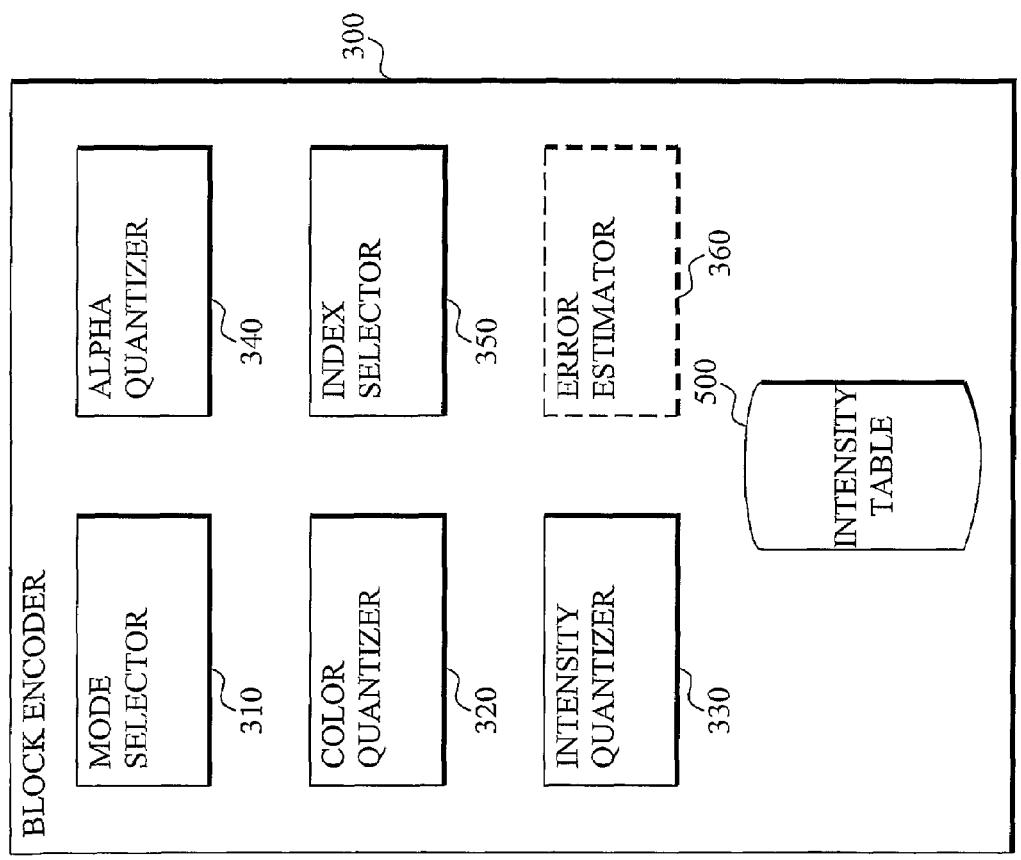
Figure 20:
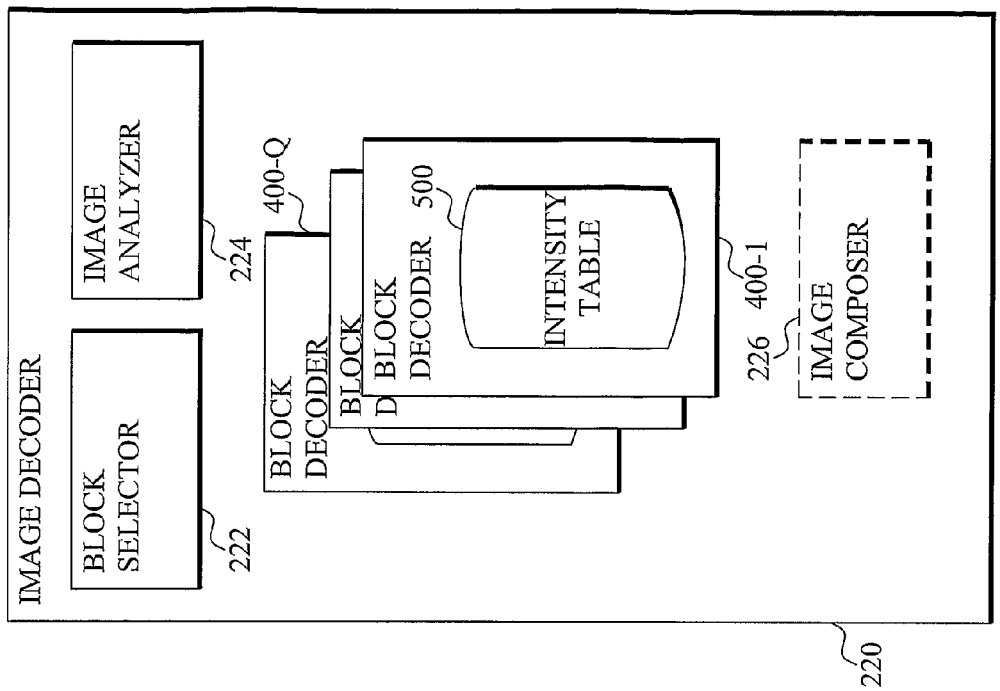
Figure 19:
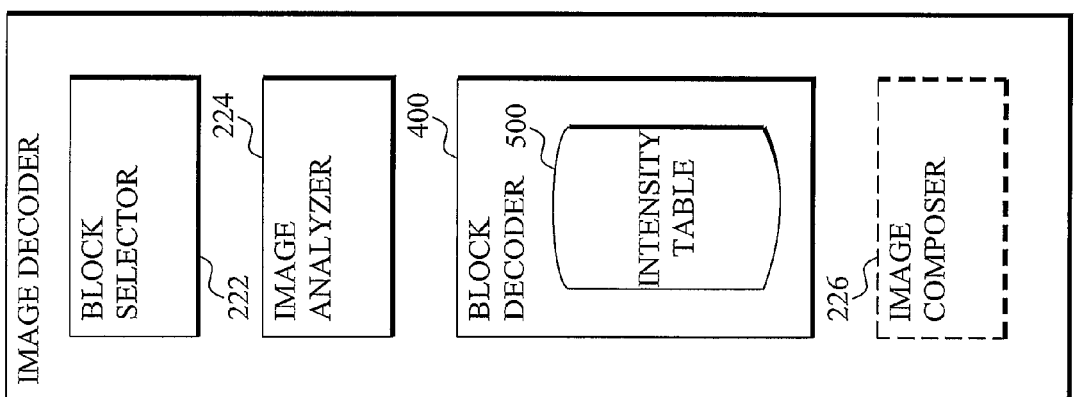
Figure 18:
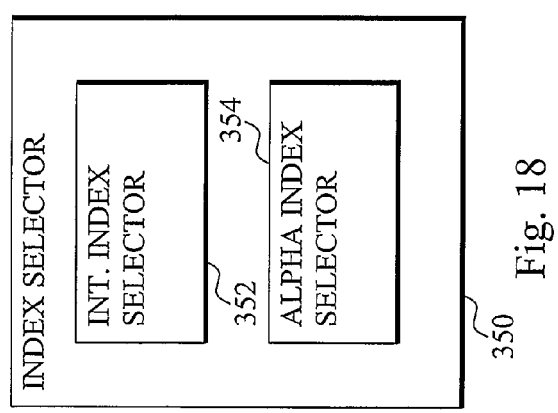
Figure 21:
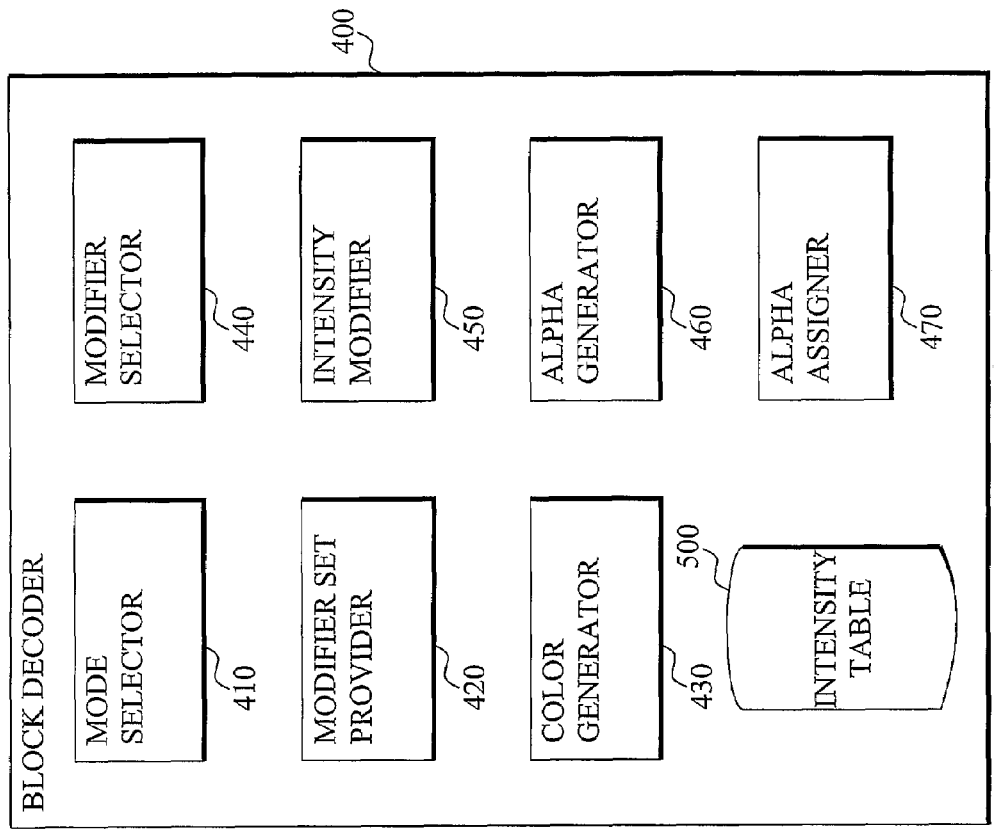
Figure 22A:
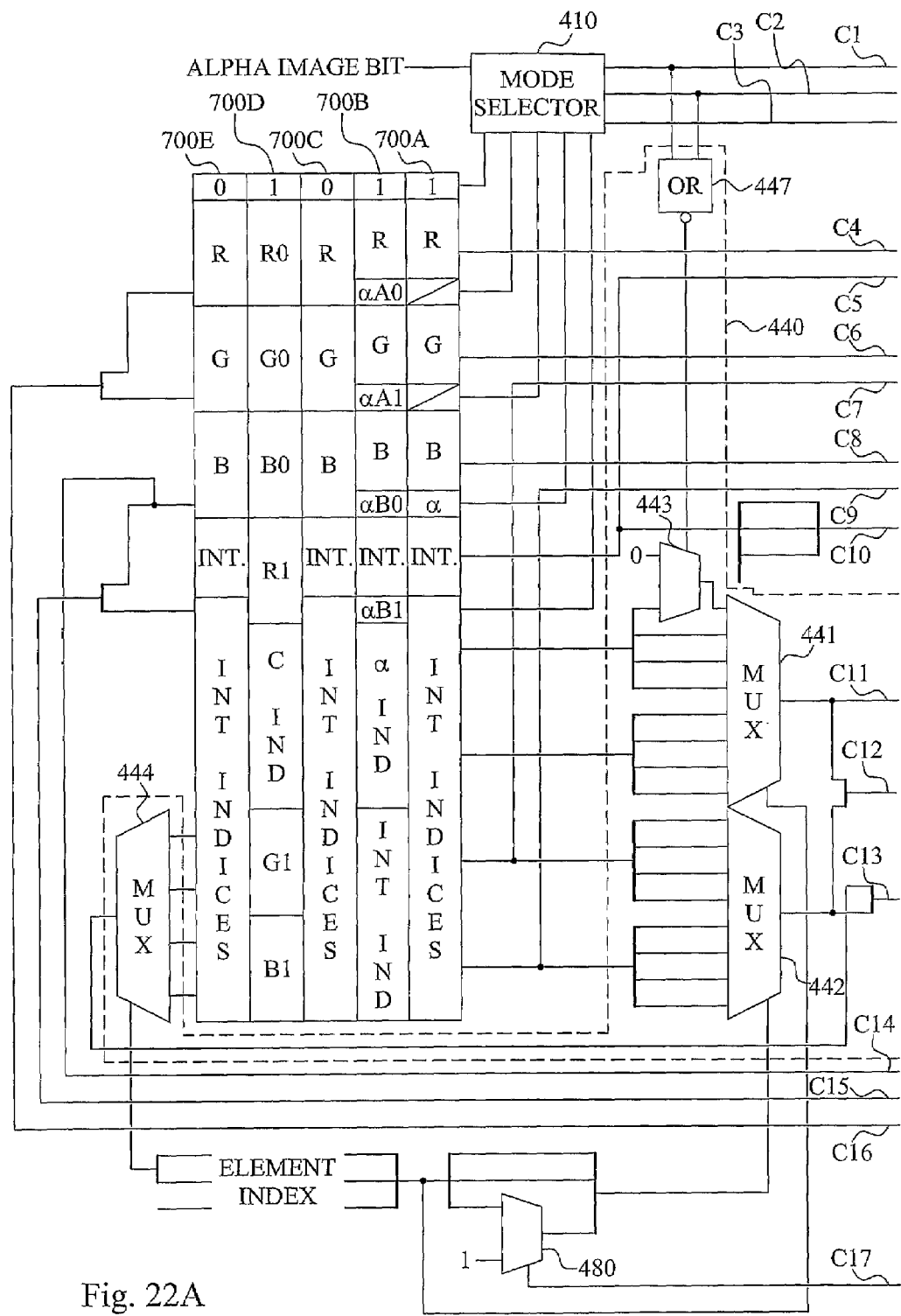
Figure 22B:
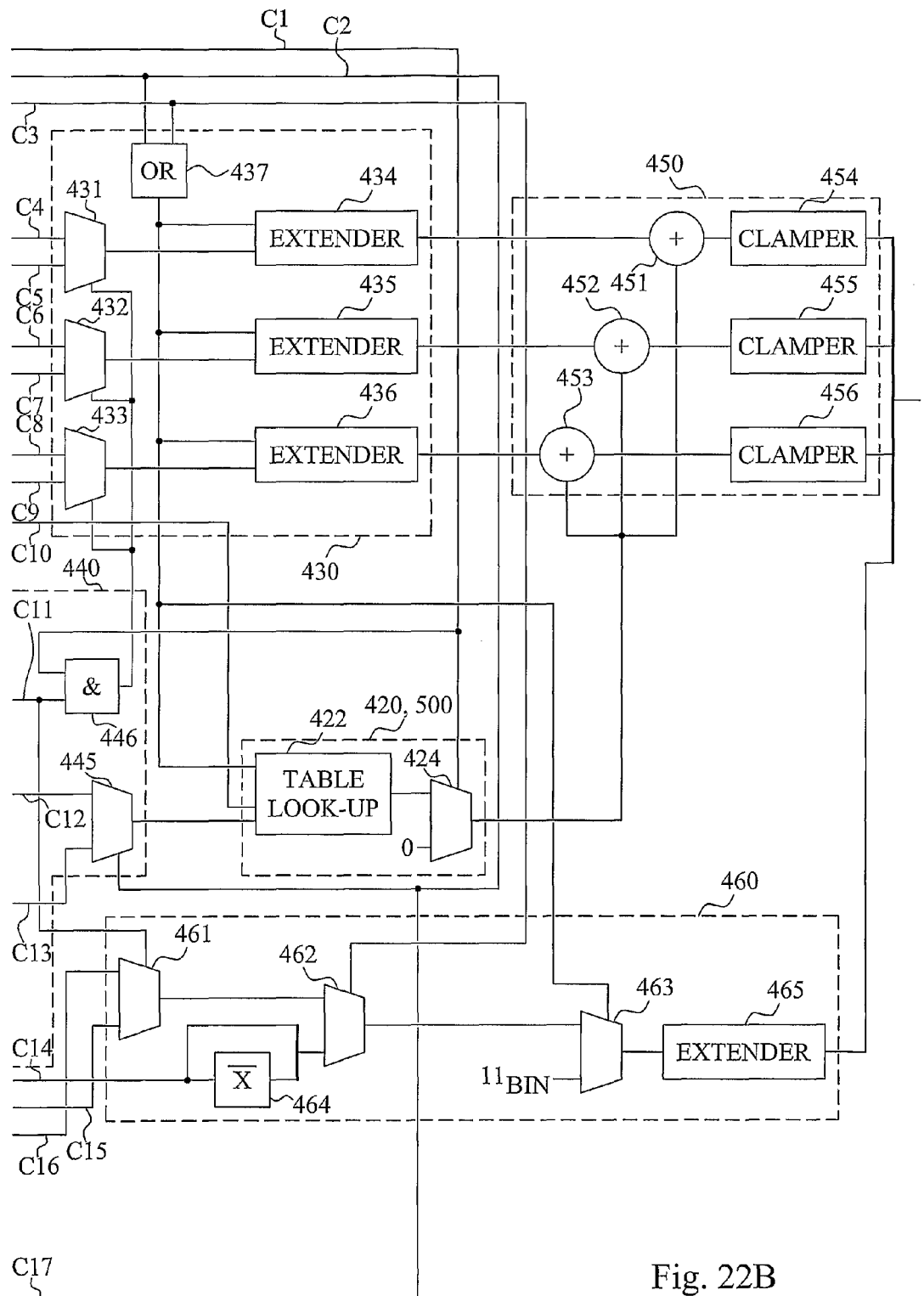
Figure 23:
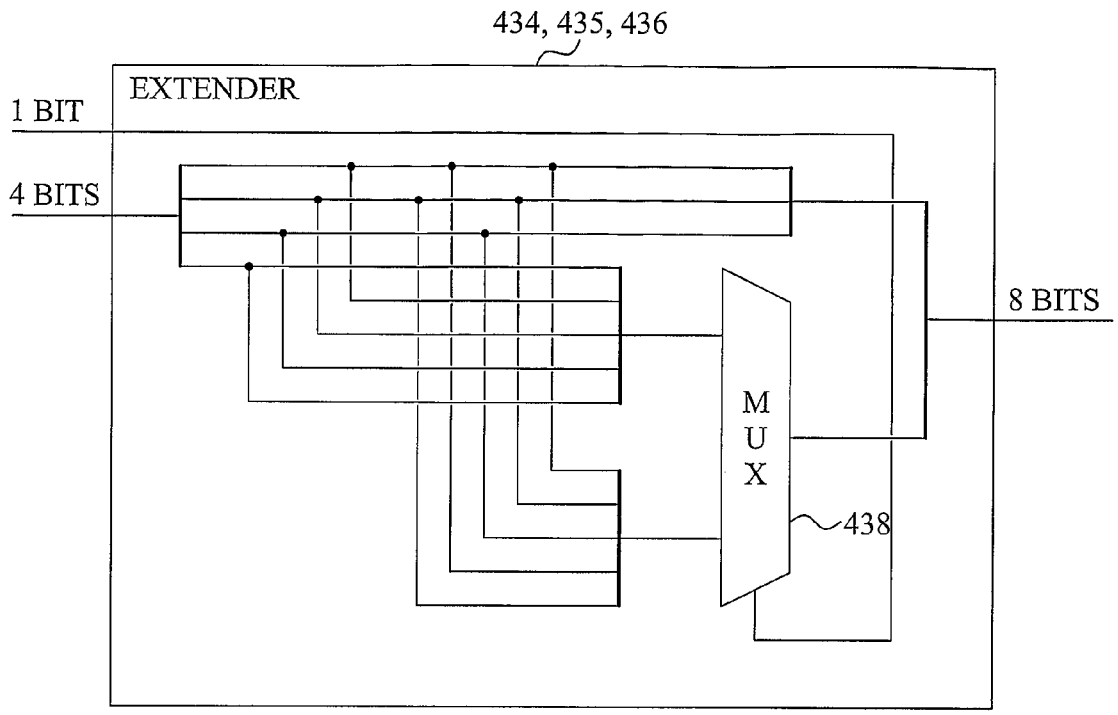
Figure 24:
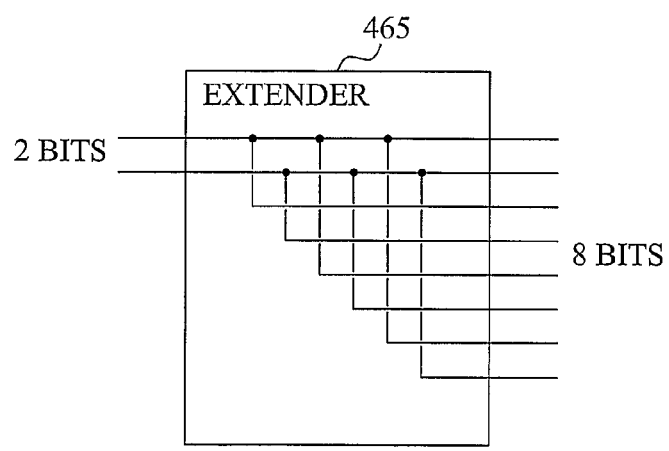
Figure 26:
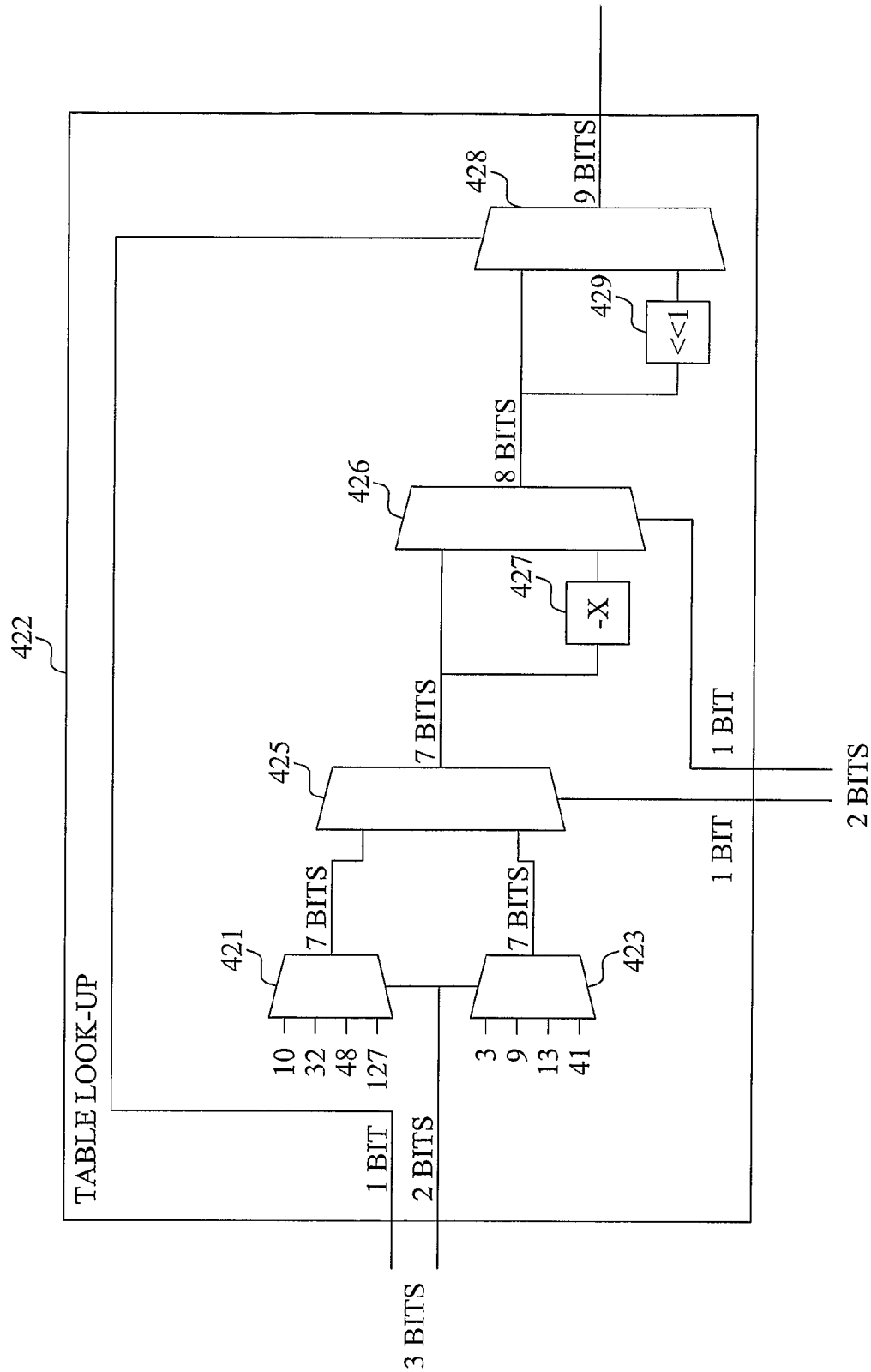
Figure 27:
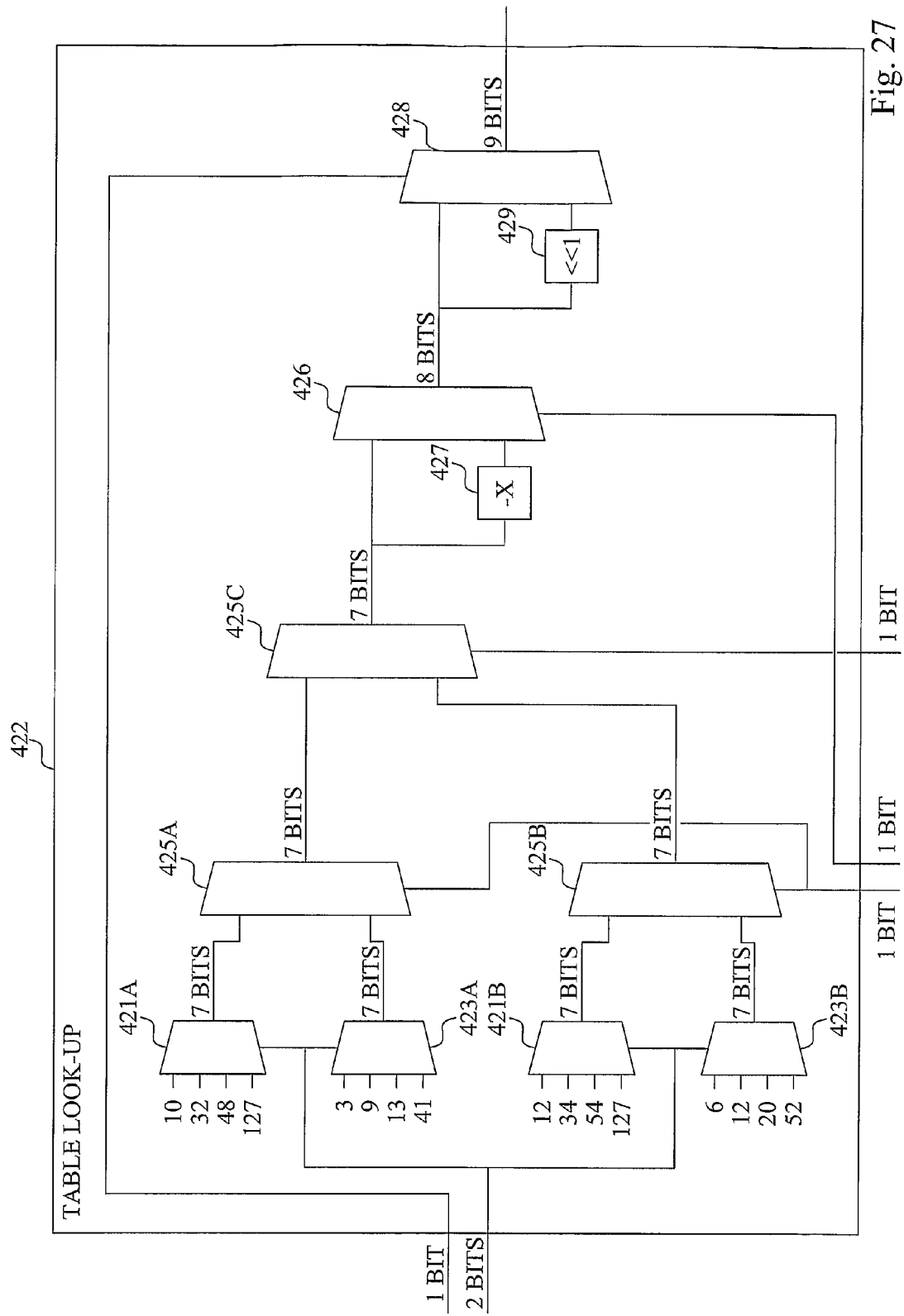

FIG. 11 schematically illustrates an example of a user terminal with an image encoder and decoder;

FIG. 12 is a block diagram schematically illustrating an example embodiment of an image encoder;

FIG. 13 is a block diagram schematically illustrating another example embodiment of an image encoder;

FIG. 14 is a block diagram schematically illustrating an example embodiment of a block encoder;

FIG. 15 is a block diagram schematically illustrating the color quantizer of the block encoder of FIG. 14 in more detail;

FIG. 16 is a block diagram schematically illustrating the intensity quantizer of the block encoder of FIG. 14 in more detail;

FIG. 17 is a block diagram schematically illustrating the alpha quantizer of the block encoder of FIG. 14 in more detail;

FIG. 18 is a block diagram schematically illustrating the index selector of the block encoder of FIG. 14 in more detail;

FIG. 19 is a block diagram schematically illustrating an example embodiment of an image decoder;

FIG. 20 is a block diagram schematically illustrating another example embodiment of an image decoder;

FIG. 21 is a block diagram schematically illustrating an example embodiment of a block decoder;

FIGS. 22A and 22B are a hardware block diagram schematically illustrating an example embodiment of a block decoder;

FIG. 23 is hardware block diagram illustrating an example embodiment of a first version of bit extender used in FIGS. 22A and 22B in more detail;

FIG. 24 is hardware block diagram illustrating an example embodiment of a second version of bit extender used in FIGS. 22A and 22B in more detail;

FIG. 25 is hardware block diagram illustrating an example embodiment of the clampers of FIGS. 22A and 22B in more detail;

FIG. 26 is a hardware block diagram illustrating an embodiment of the table look-up of FIGS. 22A and 22B in more detail; and FIG. 27 is a hardware block diagram illustrating another embodiment of the table look-up of FIGS. 22A and 22B in more detail.

DETAILED DESCRIPTION

Throughout the drawings, the same reference characters will be used for corresponding or similar elements.

The technology disclosed herein relates to image and graphic processing, and in particular to encoding or compressing alpha images and decoding or decompressing encoded (compressed) alpha images.

Generally, during image encoding, an image is decomposed or divided into a number of image blocks. Each such image block then comprises multiple, i.e. at least two, image elements having image element associated properties, among others, a certain color and an associated alpha or transparency value. The image blocks are then encoded or compressed to generate an encoded representation of the image.

When an encoded image is to be displayed on a screen, or a geometric primitive associated with the encoded image is to be rendered, the relevant image elements of the encoded image blocks are identified and decoded. These decoded image elements can then be used to generate a decoded representation of the original image for display, or they can be used for rendering the geometric primitive.

The technology disclosed herein is well adapted for usage with three-dimensional (3D) graphics and images, such as photos, text and "synthetic" images, all of which can be used in applications, such as games, 3D maps and scenes, 3D messages, e.g. animated messages, screen savers, man-machine interfaces (MMIs), etc., but is not limited thereto. Thus, the technology disclosed herein could also be employed for encoding other types of images or graphics, e.g. one-dimensional (1D), two-dimensional (2D) or 3D images.

In the technology disclosed herein the expression "image element" refers to an element in an image block or encoded (compressed) representation of an image block. This image block, in turn, corresponds to a portion of an image or texture. Thus, an image element could be a texel of a (1D, 2D or 3D) texture or a pixel of a (1D, 2D or 3D) image. Correspondingly, an image element could be a voxel in a 3D texture or image. Generally, an image element is characterized by certain image-element-associated properties, such as a color value and an alpha or transparency value. Furthermore, in the following, the term "image" is used to denote any 1D, 2D or 3D image or texture that can be encoded and decoded.

In the art of image processing, alpha values are used to represent the transparency property of an image element. Generally, an alpha value is typically defined as $alpha_{13}value=1-transparency$, if $0 \leq alpha_{13}value \leq 1$ and $0 \leq transparency \leq 1$. Thus, an alpha value of 1 corresponds in this definition to non-transparency or opacity (transparency is 0), whereas an alpha value of 0 then represents full transparency (transparency is 1). Although this definition of alpha values is the most common in the art, the technology disclosed herein is not limited thereto. Actually, an alpha value of an image element can, thus, according to the technology disclosed herein represent any transparency property of that image element depending on the employed alpha value-transparency relationship.

Generally, the alpha value of an image element in an image can take a value from a minimum alpha value, e.g. 0 or 0.0, typically representing fully transparency, up to a maximum alpha value, e.g. 255 or 1.0, typically representing non-transparency or opacity. An alpha value between these limits then represents semi-transparency. An image is typically defined as a so-called "alpha image" if it comprises at least one image element with an associated alpha value that differs from a pre-defined value representing non-transparency, e.g. the maximum value mentioned above. In some applications, an image is classified as an alpha image if at least a minimum amount of multiple image elements of the image has a respective alpha value different from the pre-defined non-transparency value. In both these implementations, a pre-defined interval of multiple values representing non-transparency, e.g. 213-255 or 0.84-1.0, can be used instead of a single pre-defined non-transparency value. In such a case, if the alpha value(s) of at least one image element or a minimum amount of image elements are not within the non-transparency interval, then the image is classified as an alpha image, otherwise it is a so-called non-alpha image or an alpha-free image.

Correspondingly, an image block is typically classified as an "alpha image block" if at least one of its including image elements, or at least a minimum amount of the image elements, has alpha value different from the pre-defined non-transparency value or is not within the non-transparency interval. A non-alpha or alpha free block then includes image elements with alpha values equal to the non-transparency value or within the non-transparency interval.

It is anticipated by the technology disclosed herein that the image elements of an "alpha image" in addition to their respective alpha values also have associated color values. Thus, an alpha image of the invention could be a so-called RGBA-image. Note also that an alpha image according to the technology disclosed herein may include only alpha image blocks or a combination of alpha and non-alpha image blocks.

Image Encoding

Figure 1:
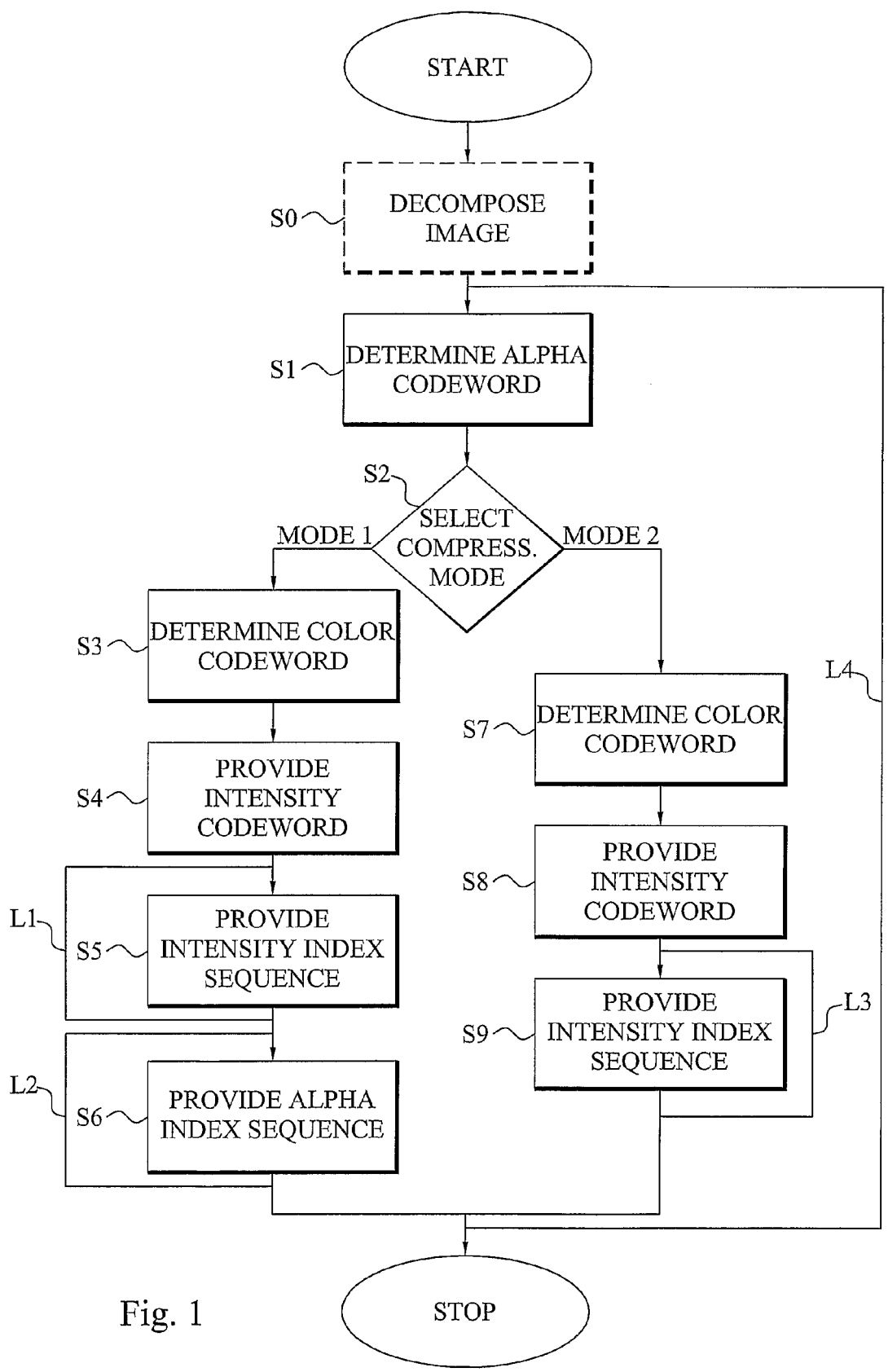
FIG. 1 is a flow diagram illustrating an example embodiment of an image encoding method technology disclosed herein.

FIG. 1 is a flow diagram of an embodiment of the (lossy) method of encoding an alpha image according to the technology disclosed herein. In a first step S0, the image is decomposed or divided into a number of image blocks. Each such image block then comprises multiple image elements. In a preferred example embodiment of the invention, an image block comprises eight image elements (pixels or texels)and has a size of $2^m \times 2^n$ image elements, where m=3−n and n=0, 1, 2, 3. More preferably, n is 1 or 2. FIGS. 2A and 2B schematically illustrate two examples of an image block 600 with eight image elements 610 according to the technology disclosed herein. In FIG. 2A, the height is two image elements 610 and the width is four image elements 610, i.e. m=1 and n=2, whereas for the image block 600 in FIG. 2B m=2 and n=1. Correspondingly, when compressing 3D images, a preferred image block size could be 2×2×2 image elements (voxels). However, the technology disclosed herein is not limited to blocks with 8 image elements but could alternatively be used in connection with image blocks having less or more than eight image elements, e.g. 4×4 image elements.

Returning to FIG. 1, the whole image block is preferably decomposed into (non-overlapping) image blocks in step S0. However, in some applications, only a portion of an image is encoded and, thus, only this portion is decomposed into image blocks.

In step S1, an alpha codeword is determined for the current image block. This alpha codeword comprises multiple quantized alpha values that represent at least one alpha value of the image elements in the block. In a next step S2, an alpha block compression or encoding mode to use for the image block is selected based on the determined alpha codeword, preferably based on at least one of the quantized alpha values of the codeword. In a first implementation of this mode selection, step S2 is performed based on a comparison of the quantized alpha values. Thus, if the quantized alpha values differ, a first alpha block compression mode, denoted PAA (Packman-Alpha-Alpha) mode herein, is selected for the block, whereas if the quantized alpha values are equal a second alpha block compression mode, denoted PAT (Packman-Alpha-Two-timer) mode herein, should instead be used. In a second implementation of this mode selection, one of the quantized alpha values has a combined alpha coding and mode representing functionality. In such a case, the actual bit-pattern of this mode-associated quantized alpha value signals the compression mode to use. For example, if this mode-associated quantized alpha value is $00_{bin}$, $01_{bin}$ or $10_{bin}$ the PAA compression mode should be used, otherwise ($11_{bin}$) the PAT mode is used.

However, both compression modes preferably result in a compressed image block representation that includes a color codeword, an intensity codeword and an index sequence in addition to the alpha codeword. In addition, the resulting bit sizes of the two different encoded blocks in terms of the number of bits are preferably equal.

In the PAA compression mode, different alpha values can be assigned, based on the alpha codeword and index sequence, to the image elements in the block. In contrast, in the PAT mode, which could be viewed as a complement or auxiliary mode to the PAA compression mode, a single alpha value is assigned, based on the alpha codeword, to all image elements in the block. However, the PAT compression mode compensates this lower alpha resolution, with a higher luminance (intensity) resolution for the image elements. As a consequence, the PAA compression mode is particularly suitable for compressing image blocks having image elements of different alpha value. The PAT compression mode is preferably employed for image blocks having similar alpha values and will preserve the luminance components of the block better than the PAA mode (though at the cost of lower alpha resolution).

The PAA mode or first alpha block compression mode will first be described. In step S3, a color codeword is determined for the image block. This color codeword is a representation of the colors of the image elements in the image block. In a preferred embodiment, the color codeword is a representation of an average color of the image elements of the block. The color could be a RGB (Red, Green, Blue) color, a color in the YUV space or YCrCb space, or any other color space used in image and graphics processing and management. The color codeword is preferably in the same color format (space) as the original image. However, in some cases, it may be useful to convert the image to a different color format, i.e. having the color codeword in a first color space and the original image in a second different color space. The color codeword is preferably a 9-bit color-representation sequence. For example, a RGB color codeword could comprise 3 bits for the red color component, 3 bits for the green component and 3 bits for the blue component.

Thereafter, an intensity codeword is provided in step S4. This intensity codeword is a representation of a set of multiple intensity modifiers that are used (during decoding) for modifying the intensity of the image elements in the image block.

In a preferred example embodiment, the intensity codeword is an index or representation allowing identification of an intensity modifier set. This index could then identify or point to the set in an intensity table or codebook comprising several different intensity modifier sets. Each set comprises two or more intensity modifier values, preferably at least four modifier values. In a preferred example embodiment, the modifier values of a set are mathematically complementary values, i.e. each set is preferably symmetrical.

The intensity table preferably comprises sets including small intensity modifier values, which are adapted for allowing representation of smoothly changing surfaces. In addition, the table preferably also comprises sets that include large intensity modifier values, which are adapted for allowing representation of sharp edges.

The actual intensity modifier values of the sets in the table can be found by starting with random values and then optimizing these values using a number of different optimization schemes and algorithms, such as versions of the LBG-algorithm (Linde, Buzo and Gray) [2], simulated annealing and coordinate search, which are known to a person skilled in the art. A handful of images of different types can be used as training data, possibly including only alpha images or both alpha and non-alpha images.

In order to make a hardware implementation of the intensity table less expensive, the intensity modifiers of a set can be forced to be symmetrical, as was discussed above, and/or the intensity modifiers of a given set could be a copy of intensity modifiers of another set modified by a factor, e.g. two.

Table 1 illustrates an example of an intensity table comprising 8 sets of intensity modifiers, with four modifier values in each set.

TABLE 1

| Set | Codeword | Intensity modifier value | | | |
|---|---|---|---|---|---|
| 1 | $000_{bin}$ | −10 | −3 | 3 | 10 |
| 2 | $001_{bin}$ | −32 | −9 | 9 | 32 |
| 3 | $010_{bin}$ | −48 | −13 | 13 | 48 |
| 4 | $011_{bin}$ | −127 | −41 | 41 | 127 |
| 5 | $100_{bin}$ | −20 | −6 | 6 | 20 |
| 6 | $101_{bin}$ | −64 | −18 | 18 | 64 |
| 7 | $110_{bin}$ | −96 | −26 | 26 | 96 |
| 8 | $111_{bin}$ | −254 | −84 | 84 | 254 |

In Table 1, the intensity modifier sets 5-8 are a copy of sets 1-4 multiplied by a factor of two.

If the intensity table comprises at most 8 different intensity modifier set, the intensity codeword is preferably a 3-bit index ($000_{bin}$-$111_{bin}$) identifying one of the (eight) sets, e.g. [−32, −9, 9, 32] for codeword $00_{bin}$, of the table. Due to careful choice of the modifier values in the sets, the entire Table 1 can be reconstructed using only eight modifier values, and the remaining 24 values could be calculated therefrom.

The technology disclosed herein is, though, not limited to usage of Table 1, but could use other tables with other intensity modifier sets and values. Furthermore, for more or less than eight sets in a table, the size of the intensity codeword might have to be changed. For example, if the table comprises two (3-4 or more than 8) intensity modifier sets, the intensity codeword size could be limited to one bit (two bits or four (or more) bits). In addition, the number of intensity modifier values per set could differ from four, e.g. five values could be used per set, giving an example of [−32, −9, 0, 9, 32].

The intensity values of the sets in the table could be determined using several different types of images as training data, as was discussed above. However, if only a specific image type is to be encoded the modifier values could be determined using training data corresponding to that image type, i.e. giving an intensity table dedicated for a specific image type. It could also be possible to have an intensity table with intensity modifier values adapted for a specific image. In these cases, i.e. table dedicated for image or image type, it might be necessary to include the intensity modifier values of the table in the compressed file of encoded image blocks or otherwise associate them therewith.

Note that since two different alpha block compression modes are employed according to the technology disclosed herein, a singe intensity table could be employed for both modes. However, in certain implementations, it could be more advantageously to construct and use a first intensity table adapted for alpha images and blocks compressed according to the PAA mode and a second different intensity table for images and blocks compressed according to the PAT mode. Likewise, a common intensity table could be used for both alpha and non-alpha images. In most applications, it might, though, be more advantageous to use a "non-alpha" intensity table when compressing non-alpha images and one or several different dedicated "alpha" intensity tables when compressing alpha images, which will be discussed further herebelow.

In addition, the intensity codeword does not have to be a pointer to an intensity modifier set in a table, but could actually be an intensity modifier set itself, e.g. comprises two modifier values, such as 9 and 32, and where the other modifier values, such as −9 and −32, can be determined from these two values. Alternatively, the intensity modifier sets employed could be according to [−ka, −a, a, ka] or [−$k_2$a, −$k_1$a, $k_1$a, $k_2$a], where a is 0 or a positive integer and k, $k_1$ and $k_2$ are multiplication factors. In such a case, the intensity codeword only needs to include the value a and all the remaining three values can be calculated therefrom if k or $k_1$ and $k_2$ are pre-defined multiplication factors.

Once the intensity codeword is provided in step S4, a next step S5 selects intensity indices or representations for the image elements in the image block. Each such intensity index is associated with one intensity modifier value from the intensity modifier set provided in step S4. In other words, the intensity index allows identification of which intensity modifier of the set to use for a specific subset of at least one image element of the block.

In the case of an intensity modifier set comprising four modifier values, such as −32, −9, 9, 32, the intensity index could be a 2-bit sequence identifying one of these four values.

In an example embodiment of this PAA compression mode, an intensity index is associated with and assigned to a subset of multiple image elements in the block, preferably two image elements and more preferably two neighboring image elements. Briefly returning to FIGS. 2A and 2B, such a subset of two neighboring image elements could be represented by image elements 610A and 610B in FIG. 2A or 2B or image elements 610A and 610C in FIG. 2A or 2B. This means that the luminance resolution will be halved compared to if each image element is associated with an own intensity index.

In another example embodiment of this PAA compression mode, each image element in the block is associated with an own intensity index, preferably a 1-bit intensity index. As a consequence, only a subset, preferably two, of the intensity modifiers from the intensity modifier set can be indexed for each image element if the size of the compressed block is to remain the same. In cases the modifier set includes four different modifier values, e.g. −32, −9, 9, 32, this subset of modifiers could include the minimum and maximum modifier, i.e. −32 and −32. Alternatively, the subset could include the values −9 or 9 or any other combination of preferably two modifier values from the set. In this example embodiment of the PAA compression mode, each image element, thus, is associated with a respective intensity index. However, this typically comes at the cost of a reduced amount of available modifier values for the image elements in the block.

In a further example embodiment of the technology disclosed herein, the two above-identified example embodiments are combined. In such a case, there will be a choice on block basis in the PAA mode, whether to assign intensity indices for each pair of image elements or individually to the image elements. An intensity mode index could then be generated and added to the compressed block representation. For example, if this intensity mode index is $0_{bin}$ ($1_{bin}$), the intensity indices are assigned for image element pairs and all of the modifier values of a set are available. However, if the intensity mode index is $1_{bin}$ ($0_{bin}$), the intensity indices are assigned individually to the image elements and only a subset of the modifier values in the set are available.

In an alternative implementation to usage of dedicated intensity mode index, the employed intensity table could be modified. In such a case, some of the including modifier sets comprise the maximum number of modifier values, preferably four such values, whereas other modifier sets comprise less than this maximum number of modifier values, preferably two values. Table 1 above can then be replaced by Table 2 below:

TABLE 2

| Set | Codeword | Intensity modifier value | | | |
|---|---|---|---|---|---|
| 1 | $000_{bin}$ | −12 | −4 | 4 | 12 |
| 2 | $001_{bin}$ | −47 | −19 | 19 | 47 |
| 3 | $010_{bin}$ | −127 | −42 | 42 | 127 |
| 4 | $011_{bin}$ | | −30 | 30 | |
| 5 | $100_{bin}$ | −24 | −8 | 8 | 24 |
| 6 | $101_{bin}$ | −94 | −38 | 38 | 94 |
| 7 | $110_{bin}$ | −254 | −84 | 84 | 254 |
| 8 | $111_{bin}$ | | −127 | 127 | |

Thus, an intensity codeword of $011_{bin}$ or $111_{bin}$ corresponds in this illustrative, but non-limiting, example to an intensity mode index of $1_{bin}$, i.e. the intensity indices are assigned individually to the image elements and the available intensity modifier values are −30 and 30 (−127 and 127) for an intensity codeword of $011_{bin}$ ($111_{bin}$). The remaining intensity codewords are associated with modifier sets that include four modifier values each and signal that the intensity indices should be assigned to pairs of image elements.

In a modified version of Table 2 half of the modifier sets and, thus, the intensity codewords could be associated with the first intensity mode and the remaining half is then associated with the second intensity mode. However, since it is expected that the first intensity mode (pairwise index assignment and maximum amount of modifier values) will be used for most alpha blocks compressed according to the PAA mode, more of the intensity codewords and modifier set are preferably associated with this first intensity mode compared to the second intensity mode, as is illustrated in Table 2.

Step S5 is preferably repeated for all subsets of image elements, preferably for all pairs of neighboring image elements or for all image elements in the image block, depending on the implementation used, which is schematically illustrated by the line L1.

A next step S6 selects alpha indices or representations for the image elements in the image block. Each such alpha index is associated with one quantized alpha value from the alpha codeword determined in step S1. In other words, the alpha index allows identification of which alpha value to use for a specific image element of the block. In a preferred implementation of the PAA compression mode, the alpha codeword comprises two quantized alpha values αA and αB, each preferably being a 2-bit quantized alpha value. As a consequence, each quantized alpha value can potentially represent one alpha value out of a set of four different alpha values. For example, assume that this set of alpha values is 0, 85, 170, 255, or correspondingly, 0.0, 0.3333, 0.6667, 1.0, an quantized alpha value of $00_{bin}$ can then represent 0 (0.0), $01_{bin}$ represents 85 (0.3333), $10_{bin}$ represents 170 (0.6667) and 255 (1.0) is represented by $11_{bin}$.

In a first example embodiment, each image element in the block is associated with a respective alpha index. However, in a preferred exam le embodiment of the technology disclosed herein, resulting a smaller total size of the compressed block representation, a subset of the image elements in the block is associated with a pre-defined quantized alpha value (selected from the first, αA, or second, αB, quantized alpha value). As a consequence, no selection or assignment of alpha index has to be performed for this (these) image element(s). For example, the first (last) image element could always be associated with the first (or second) quantized alpha value. The index sequence does then not need to contain an alpha index for this first (last) image element. As a consequence, the sequence will only contain seven image element associated alpha indices in the case of an image block with totally eight image elements. It is anticipated by the technology disclosed herein that more than one image element could be pre-associated with a quantized alpha value. It should be noted that since an quantized alpha value represents an alpha value, preferably on a one-to-one basis, associating an alpha index with an quantized alpha value also includes associating an alpha index with an alpha value.

Step S6 is preferably repeated for the image elements in the block, more preferably for all image elements excluding the image element(s) with pre-defined quantized alpha value association, which is schematically illustrated by the line L2.

Figure 3A:
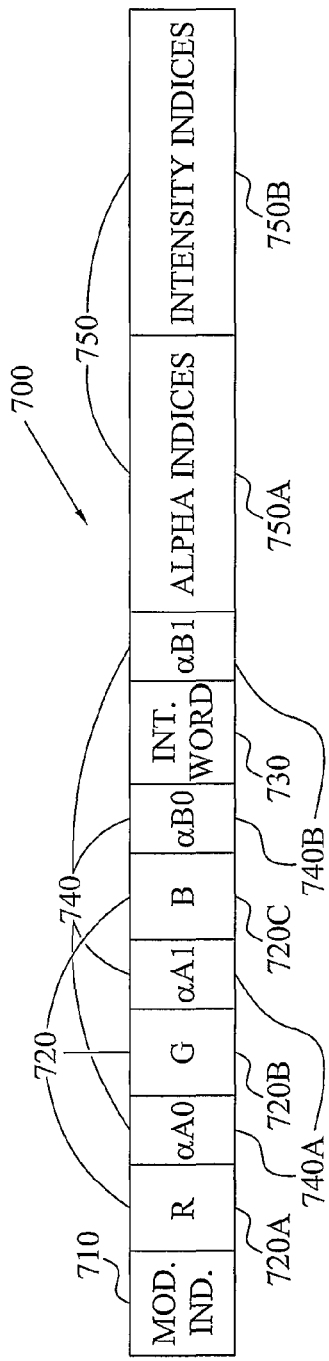
FIGS. 3A to 3C illustrate embodiments of compressed representations of an image block.

The result of the compression of steps S1 to S6 is a compressed image block or more precisely a compressed (encoded) representation of the image block. Such a compressed block representation 700 is illustrated in FIG. 3A. The representation 700 comprises the color codeword 720, including the three color components R 720A, G 720B and B 720C, the intensity codeword 730, the alpha codeword 740, including the two quantized alpha values αA 740A and αB 740B and a sequence or bitmap 750 of image element indices. This index sequence 750 preferably includes a first subsequence with alpha indices 750A and a second subsequence with intensity indices 750B. In addition, the compressed block representation 700 preferably includes an alpha block index 710, identifying the image block as an alpha image block. In cases, where an image only includes so-called alpha blocks, this alpha block index 710 could be omitted.

Note that the mutual order of the alpha block index 710, color codeword 720 and its including color components 720A to 720C, intensity codeword 730, alpha codeword 740 and its including quantized alpha values 740A and 740B and index sequence 750 and its including subsequences 750A and 750B of the compressed image block 700 may differ from what is illustrated in the figure. Note also that the codewords and index sequence do not need to be laid out consecutively.

If the image block comprises eight image elements (see e.g. FIGS. 2A and 2B) and each intensity index is 2 bits and an intensity index is assigned for each image element pair, the size of the intensity index subsequence 750B is 8 bits. This same size of 8 bits is also obtained when using 1-bit intensity indices associated with each image element in the block. Furthermore, assume that the corresponding size of the alpha codeword 740 is 4 bits and that the alpha index subsequence 750A comprises a 1-bit alpha index for seven of the eight image elements (one of the image elements is then pre-defined associated with the first (or second) quantized alpha value), which thus results in 7 bits for the subsequence 750A. If the sizes of the color 720 and intensity 730 codewords are 9 and 3 bits, respectively, and the alpha block index 710 is 1 bit, the total size of the encoded representation 700 of the image block is 32 bits and a compression rate of 4 bpp is obtained. This small size of the representation 700 is well adapted for thin clients, such as mobile units, which typically have memory busses of 16 or 32 bits. As a result, only one or at worst two memory accesses are then needed to read out the encoded representation 700. Returning to FIG. 1, if the mode selection of step S2 indicates that the PAT mode or second alpha block compression mode should instead be selected, the method continues to step S7. In this step S7, a color codeword is determined for the image elements in the block. This step S7 basically corresponds to the step S3 and is not further discussed. In the following step S8, an intensity codeword is provided for the image block similar to step S4. However, in cases where different intensity tables are used for the two alpha block compression modes, the intensity codeword provided in step S8 is obtained using a table dedicated for the PAT compression mode, whereas the intensity codeword provided in step S4 is obtained employing a table suitable for this PAA mode.

Once the intensity codeword is provided in step S8, a next step S9 selects intensity indices or representations for the image elements in the image block. Each such intensity index is associated with one intensity modifier value from the intensity modifier set provided in step S8. In this PAT compression mode, each image element is preferably associated with an intensity index, giving a total of eight intensity indices for an image block with eight image elements.

Step S9 is preferably repeated for all image elements in the block, which is schematically illustrated by the line L3.

Note that in this PAT compression mode, no alpha indices are provided for the image elements. This is due to that all image elements are associated with a same quantized alpha value (and, thus, alpha value). In the PAA compression mode, the alpha codeword preferably included two quantized alpha values αA and αB, each preferably comprising two bits each αA0, αA1 and αB0, αB1, respectively. However, in a first implementation of this PAT compression mode αA0=αB0 and αA1=αB1 and only one of the quantized alpha values, denoted "useful" or data-carrying quantized alpha value herein, will be used during decoding of the block. In an alternative implementation, αA is the mode-associated quantized alpha value, i.e. equals the PAT-specific bit pattern of e.g. $11_{bin}$. The remaining quantized alpha value αB will then be the useful quantized alpha value.

All bits of this useful quantized alpha value could be used for coding an alpha value representation. In an alternative embodiment, only one bit of the useful quantized alpha value will be used an alpha value representation. In this latter case, the quantized alpha value and, thus, the alpha codeword can typically only represent one out of two possible alpha values, e.g. 85 (0.3333) or 170 (0.6667).

In cases only one bit of the useful quantized alpha value is used as alpha value representation, the remaining bit of this quantized alpha value is preferably shared with the (intensity) index sequence. As a consequence, the step S9 could be regarded as including the sub-step of modifying the alpha codeword by (re-)setting one bit of the useful quantized alpha value of the alpha codeword according to the bit value of a portion of an intensity index associated with one of the image elements, typically the first image element in the block.

Figure 3B:
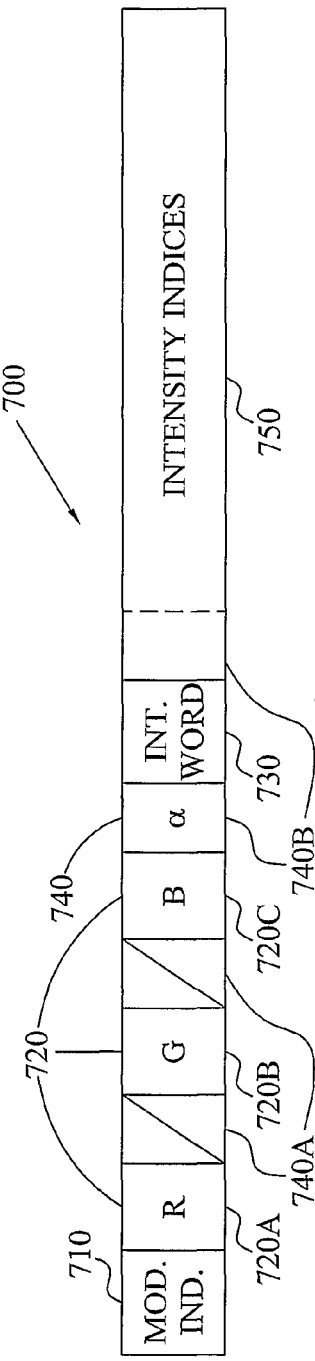

The result of the compression of steps S1, S2 and S7 to S9 is a compressed image block. Such a compressed block representation 700 is illustrated in FIG. 3B. The representation 700 comprises the color codeword 720, including the three color components R 720A, G 720B and B 720C, the intensity codeword 730, the alpha codeword 740, including the two quantized alpha values αA 740A and αB 740B. In the figure, the quantized alpha value αA 740A is a copy of the quantized alpha value αB 750B (or is equal to $11_{bin}$). In addition, since only a single bit α of the useful quantized alpha value 740B will be used for alpha purposes the remaining bit will, in this implementation, be shared with the intensity index sequence 750. Similarly to FIG. 3A, the compressed block representation 700 preferably includes an alpha block index 710, identifying the image block as an alpha image block. In cases, where an image only includes so-called alpha blocks, this alpha block index 710 could be omitted.

Note that the mutual order of the alpha block index 710, color codeword 720 and its including color components 720A to 720C, intensity codeword 730, alpha codeword 740 and index sequence 750 of the compressed image block 700 may differ from what is illustrated in the figure. Note also that the codewords and index sequence do not need to be laid out consecutively.

If the image block comprises eight image elements (see e.g. FIGS. 2A and 2B) and each intensity index is 2 bits and an intensity index is assigned for each image element in the block, the size of the intensity index sequence 750 is 16 bits, of which one is shared with the alpha codeword 740. Furthermore, assume that corresponding size of the color 720, intensity 730 and alpha 740 codeword 740 is 9, 3 and 4 bits, respectively, and a 1-bit alpha block index is used. The total size of the encoded representation 700 of the image block is then 32 bits and a compression rate of 4 bpp is obtained.

The steps S1 to S9 are preferably repeated for all image blocks provided during the decomposing of step S0 (schematically illustrated by line L4). The result is then a sequence or file of compressed image blocks. The resulting compressed image blocks could be ordered in a file from left to right and top to bottom in the same order in which they were broken down in the block decomposing of step S0. The method then ends.

As a consequence of the two compression modes, in some instances an encoded image will include image blocks compressed only according to the PAA or PAT compression mode. However, for most practical implementations, an encoded image will typically include some block representations compressed according to the PAA mode and other block representations compressed according to the PAT mode.

The encoded image could be provided to a memory for storage therein until a subsequent rendering, e.g. display, of the image. Furthermore, the encoded image could be provided as a signal of encoded block representations to a transmitter for (wireless or wired) transmission to another unit.

If a same intensity table is used in the two compression modes (step S4 and S8), the compression method illustrated in the flow diagram of FIG. 1 could possibly be amended so that the determination of color codeword (step S3 or S7) and provision of intensity codeword (steps S4 or S8) are performed before the selection of compression mode in step S2. In such a case, the unique steps of the PAA mode will be the provision of intensity index sequence (step S5) and provision of alpha index sequence (step S6). The corresponding PAT-specific step will be the provision of intensity index sequence (step S9).

Figure 4:
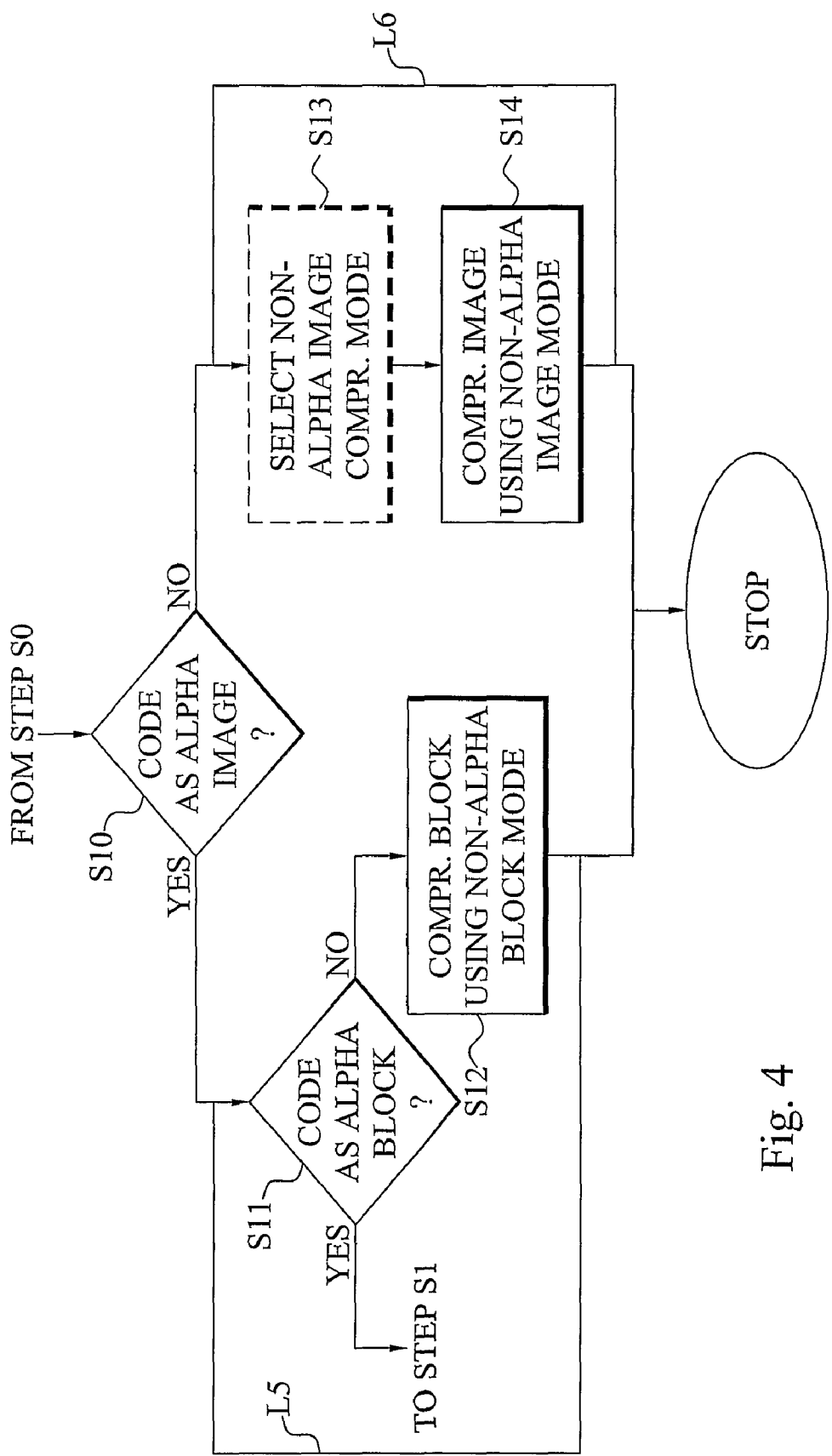
FIG. 4 is a flow diagram illustrating additional steps of the image encoding method of FIG. 1.

FIG. 4 is a flow diagram illustrating additional steps of the image compression method of FIG. 1. The method continues from step S0 in FIG. 1. In a next step S10, it is determined whether the current image should be encoded as an alpha image or as non-alpha or alpha-free image. This selection could be based on a global alpha image index associated with the image. Alternatively, the selection is based on an investigation of the alpha values or properties of the image elements of the image. Thus, if the alpha value of at least one image element or of at least a minimum amount of multiple image elements differ from the pre-defined non-transparency value or are not within the non-transparency interval, the image is classified as an alpha image, otherwise it is a non-alpha image.

If it is concluded that the image should be encoded (compressed) as an alpha image in step S10 the method continues to step S11. This step S11 investigates the image blocks of the decomposed image and determines whether they should be encoded as alpha blocks or non-alpha blocks. This classification is preferably performed by investigating the alpha values of the image elements in the block. Similarly to above, if the alpha value of at least one image element or of at least a minimum amount of multiple image elements of the image block differ from the pre-defined non-transparency value or are not within the non-transparency interval, the block is classified as an alpha block, otherwise it is a non-alpha block.

In an alternative embodiment of the invention, the respective alpha values of the image elements in the block under investigation in step S11 are first quantized before the decision of compression mode (alpha block mode or non-alpha block mode) is taken. As was briefly mentioned above in connection with the discussion of alpha codewords, the quantized alpha values of the codeword can preferably represent values selected from a set of available alpha representing values, e.g. 0.0 (0), 0.3333 (85), 0.6667 (170), 1.0 (255). In such a case, the alpha values of the image elements can first be quantized into values selected from this set. For example, assume that the alpha value of an image block to be compressed is as follows:

| 0.95 | 0.98 | 0.90 | 0.99 |
| 0.85 | 0.95 | 0.91 | 0.92 |

Further assume that a single pre-defined alpha value of 1.0 (255) represents non-transparency. Thus, if the classification of this block would be taken before quantization it would be classified as an alpha block since all image elements has alpha values different from the non-transparent value of 1.0. However, if each alpha value of block is first quantized into one of the possible values 0.0, 0.3333, 0.6667, 1.0, the classification will be different. In that case, all quantized alpha values will be 1.0, which represents non-transparency, and the block should be compressed as a non-alpha block.

If the block instead would have the following alpha values,

| 0.95 | 0.98 | 0.90 | 0.99 |
| 0.85 | 0.95 | 0.91 | 0.72 | the alpha value of the last image element would be quantized into 0.6667 (all other values would be quantized into 1.0). This block would, in this example, be classified as an alpha block since at least one of the image elements has a (quantized) alpha value different from the pre-defined non-transparent value of 1.0. However, since the remaining image elements in the block has alpha values (very) close to the non-transparent value it might be best from the compression quality point of view to compress the block as a non-alpha block. In such a case, the classification of step S11 could be performed by employing an interval of non-transparency value instead of a single pre-defined non-transparency value and/or by requiring that at least two image elements have associated quantized alpha values different from the pre-defined non-transparency value.

Figure 3C:
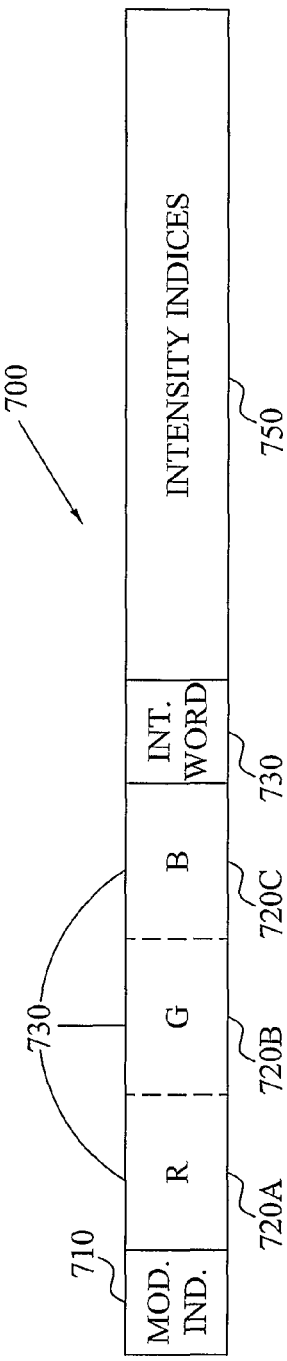

If the step S11 classifies the current image block as an alpha block the method continues to step S11 of FIG. 1. However, if the block instead is classified in step S11 as a non-alpha or alpha-free block, the method continues to step S12. In this step S12, the image block is compressed using a non-alpha block mode or third compression mode, denoted PAP (Packman-Alpha-Packman) mode herein. This PAP compression mode includes determining a color codeword for the block, preferably a 12-bit color codeword (4 bits for each R, G, B color component). In addition, an intensity codeword is provided similar to the PAA and PAT modes discussed above in connection with FIG. 1. This intensity codeword is preferably a 3-bit index to a set of multiple intensity modifiers found in an intensity table. This intensity table could be a table common to the two alpha block compression modes (PAA and PAT) and this non-alpha block compression mode (PAP). However, it might be advantageous to use a dedicated intensity table adapted for non-alpha blocks. Thereafter, intensity indices are provided, preferably a 2-bit intensity index per image element in the block. These indices are each associated with one of the intensity modifiers from the modifier set. FIG. 3C illustrates an image block 700 compressed according to this PAP mode. In addition to the color codeword 720, intensity codeword 730 and intensity index sequence 750, the compressed block representation 700 preferably includes a 1-bit non-alpha block index 710, indicating that the block has been compressed using the PAP compression mode. Note that the sizes of the image blocks 700 of FIGS. 3A-3C compressed using PAA and PAT modes (FIGS. 3A and 3B) and PAP mode (FIG. 3C) are preferably equal, and more preferably 32 bits.

Returning to FIG. 4, the block classification of step S11 and block compression of steps S1-S9 of FIG. 1 or of step S12 are preferably repeated for image blocks of the alpha image that should be compressed, which is schematically illustrated by the line L5.

As a consequence of the PAA, PAT and PAP modes, in some instances an encoded alpha image will include image blocks compressed only according to one of these modes. However, for most practical implementations, such an encoded alpha image will typically include some block representations (FIG. 3A) compressed according to the PAA mode, some block representations (FIG. 3B) compressed according to the PAT mode and some block representation (FIG. 3C) compressed according to the PAP mode.

If the image investigation of step S10 in FIG. 4 determines that the image should be encoded as a non-alpha image (alpha-free image), the method continues to the optional step S13. In this step S13, a non-alpha image compression mode to use for a current block is selected. In cases where there is only a single such non-alpha image compression mode available, no mode selection is required in step S13. In a next step S14, the image block is compressed using this (possibly selected) non-alpha image mode. A preferred such non-alpha image mode is denoted PA (PAckman) mode herein. Briefly, in that PA compression mode a 12-bit color codeword, 4-bit intensity codeword and 16-bit intensity index sequence are generated for each image block, resulting in a total size of 32 bits. In an extension of the PA compression scheme, a selection between two non-alpha image compression modes can be made for each block, denoted PP (Packman-Packman) and PC (Packman-CCC) mode, respectively. In such a case, the step S13 selects per block basis which of the PP or PC mode to use for the current block. The PP mode is similar to the PA scheme. However, the compressed image block preferably includes a 1-bit PP mode index and a 3-bit intensity index instead of a 4-bit intensity index. The PC compression mode uses two color codewords instead of one color and one intensity codeword. As a consequence, an image block compressed according to this PC mode preferably comprises a 1-bit PC mode index, two 12-bit color codewords and a 7-bit color index sequences that preferably includes a 1-bit color index to one of the two color codewords for all but one image element in the block. The remaining image element then has a pre-defined association with the first (or second) color codeword so that no color index is required for that image element.

The steps S13 and S14 are preferably performed for all image blocks in the non-alpha image that should be compressed, which is schematically illustrated by the line L6.

FIG. 5 is a flow diagram illustrating the alpha codeword determining step of FIG. 1 in more detail. The method continues from step S0 of FIG. 1. In a next optional step S20, the alpha values of the image elements are quantized into values of the pre-defined set available quantized alpha values. As was discussed in the foregoing, if each quantized alpha value comprises 2 bits, the pre-defined set preferably comprises four such values. For example, these values could be 0.0, 0.3333, 0.6667, 1.0, which represent the values 0 (0 or 0), 85 (170 or 341), 170 (341 or 682), 255 (511 or 1023) in cases with up to 256 (512 or 1024) different alpha values. In alternative embodiments the set could instead be according to one of the following alternatives 0.0, 0.50, 0.75, 1.0; 0, 0.25, 0.50, 1.0; 0, 0.25, 0.75, 1.0 or some other suitable four values in the interval 0 to 1 (which corresponds to between 0 and 255, 511, 1023, i.e. between 0 and $2^n - 1$, where n is an integer). However, in the PAT compression mode, only a single bit of the "useful" quantized alpha value is employed. As a consequence, the quantized alpha value can only then be selected from two possible values, which preferably constitute a subset of the four values mentioned above, e.g. 0.3333 and 0.6667 or 0.0 and 1.0.

In either case, once the alpha values have been quantized, the two quantized alpha values to use for the alpha codeword are selected in step S21. These quantized alpha values should be those two values from the set that best represents the (quantized) alpha values of the image elements in the block.

Assume that the current block has the following alpha values:

| | | | |
|---|---|---|---|
| 0.60 | 0.30 | 0.85 | 0.92 |
| 0.00 | 1.00 | 0.80 | 0.98 |

In the step S20, the alpha values are quantized into values of the set 0.0, 0.3333, 0.6667, 1.0. In such a case, the block above will be represented by the following quantized values:

| | | | |
|---|---|---|---|
| 0.6667 | 0.3333 | 1.0 | 1.0 |
| 0.0 | 1.0 | 1.0 | 1.0 |

The best quantized alpha values to use can be found by performing a search among the available values and calculating error values:

$$\varepsilon^2 = \sum_{i=1}^{N} (\hat{\alpha}_i - p_i)^2, \quad (1)$$

where $\hat{\alpha}_i$ is the quantized alpha value of image element i, $p_i \in$ the subset of two quantized alpha values and N is the total number of image elements in the block. This is repeated for all pairs of quantized alpha values and the two such quantized alpha values that minimize the error will be selected as alpha codeword. In the example block above, the first quantized alpha value could be 0.0 whereas the second is 1.0. This block will then be compressed according to the PAA compression mode since the two quantized alpha values of the codeword are not equal.

In another example, the original block could have the following alpha values:

| | | | |
|---|---|---|---|
| 0.30 | 0.25 | 0.17 | 0.42 |
| 0.20 | 0.38 | 0.24 | 0.48 |

When quantizing these values, all will be assigned the value of 0.3333. In this case, using the equation (1) above for finding the two optimal quantized alpha values for the block will result in equal quantized alpha values. Thus, this block is preferably compressed according to the PAT mode. Thus, the most significant bit (MSB) ($\alpha$B0) of the second quantized alpha value ($\alpha$B) (useful quantized alpha value) will be assigned $0_{bin}$ representing the quantized alpha value of 0.3333. The MSB ($\alpha$A0) of the first quantized alpha value ($\alpha$A) will then be a copy of this $\alpha$B0, i.e. is $0_{bin}$. The least significant bit (LSB) ($\alpha$B1) of the second quantized alpha value will be shared by the intensity index sequence and is, thus, determined by the intensity index value of the first image element. The LSB ($\alpha$A1) of the first quantized alpha value will be a copy of this $\alpha$B1. Alternatively, the first quantized alpha value ($\alpha$A) will be $11_{bin}$ (i.e. equal to the PAT mode index), the MSB of the second quantized alpha value ($\alpha$B) will be assigned $0_{bin}$ and the LSB of the second quantized alpha value ($\alpha$B) will be determined by the intensity index value of the first image element. As a consequence, only the MSB of the second quantized alpha value will be used, during decoding, for generating alpha values for the image elements in the block.

In another example, the block could include the following alpha values:

| 0.10 | 0.05 | 0.15 | 0.04 |
|------|------|------|------|
| 0.07 | 0.10 | 0.12 | 0.08 |

After quantization, all values will be 0.0. At first sight, it might seem a good idea to compress the block according to the PAT mode. However, in cases where the only available quantized alpha values are 0.3333 and 0.6667 the desired value of 0.0 cannot be exactly represented in this mode. In such a case, it would be better to use the PAA compression mode. The first quantized alpha value ($\alpha A$) of the codeword would then typically be $00_{bin}$. Note, though that it is important that at least one of the two bits of second quantized alpha value ($\alpha B$) must be $1_{bin}$, i.e. $\alpha B \neq 00_{bin}$, since otherwise the block will be compressed according to the PAT mode.

In an alternative example embodiment of the technology disclosed herein, the original alpha values can be organized into at least two groups or clusters. For example, $\alpha_1, \alpha_3$ and $\alpha_4$ are all close to 0.4, whereas the remaining values $\alpha_2, \alpha_5, \alpha_6, \alpha_7$ and $\alpha_8$ of the image elements are close to the value 0.9. The two values that best represent these two clusters can then be determined, i.e. 0.4 and 0.9 in the present example. The two quantized alpha values (out of the up to four possible values) that best represent these two values are then selected as alpha codeword, i.e. 0.3333 ($01_{bin}$) and 1.0 ($11_{bin}$).

Once the alpha codeword has been determined for the image block, the method continues to step S2 of FIG. 1.

FIG. 6 is a flow diagram illustrating the steps of determining color and intensity codeword and providing intensity indices of FIG. 1. The method continues from step S2 of FIG. 1. In a next step S30, an average color of the image elements in the image block is determined. In the following, it is assumed that the color of an image element is represented by 24 bits of RGB color, i.e. 8 bits of the red component, 8 bits or the green component and 8 bits of the blue component. However, the invention is not limited to this particular example, but can be applicable to any color representation of image elements. The average color ($\bar{R}, \bar{G}, \bar{B}$) is then determined as:

$$\bar{R} = \frac{1}{N}\sum_{i=1}^{N} R_i$$

$$\bar{G} = \frac{1}{N}\sum_{i=1}^{N} G_i$$

$$\bar{B} = \frac{1}{N}\sum_{i=1}^{N} B_i, \tag{2}$$

where $R_i, G_i, B_i$ are the R, G, B component of image element i and N is the total number of image elements in the image block.

Once the average color ($\bar{R}, \bar{G}, \bar{B}$) is determined in step S30, a next step S31 quantizes the average color. The (24-bit) average color is preferably quantized into a 9-bit sequence (color codeword). In other words, each 8-bit average component is quantized into a 3-bit average component. For example, if the average color $\bar{R}, \bar{G}, \bar{B}$ is calculated to:

$$\begin{bmatrix}178\\88\\21\end{bmatrix} = \begin{bmatrix}10110010\\01011000\\00010101\end{bmatrix}_{bin},$$

a 3-bit quantized version ($\hat{R}, \hat{G}, \hat{B}$) could be generated from:

$$\begin{bmatrix}182\\73\\36\end{bmatrix} = \begin{bmatrix}10110110\\01001001\\00100101\end{bmatrix}_{bin},$$

i.e. $[101, 010, 001]_{bin}$ could be used as a (9-bit) color codeword.

Step S32 investigates the different intensity modifier sets of the table and the different modifier values of the sets. A next step S33 calculates an error value for each such modifier set and modifier value test. Based on these error values, a modifier set and intensity modifier values of the set that results in a smallest error value is selected in the step S33. This is described in more detail below.

The color property of an image block can be encoded using one of three different examples denoted simple encoding, exhaustive encoding and combined quantization, which are briefly discussed below.

Simple Encoding

In order to encode an (alpha) image block, basically a color codeword and a correct intensity modifier set are selected. Once this is done, encoding of the image elements in the image block is done by trying all the four intensity modifiers of the set and calculating the error. In a first embodiment of the PAA compression mode, a single intensity modifier is associated with multiple, preferably a pair of neighboring, image elements. In the second embodiment of the PAA mode, each image element is associated with a single intensity modifier but only a subset of the intensity modifiers can be selected. In some applications, a more accurate modifier selection and higher encoding quality is obtained by employing a weighted error value, such as:

$$\epsilon^2 = w_R(\hat{R}+q-R)^2 + w_G(\hat{G}+q-G)^2 + w_B(\hat{B}+q-B)^2, \tag{3}$$

where the original (24-bit) color of an image element is (R, G, B), ($\hat{R}, \hat{G}, \hat{B}$) denotes the color codeword (quantized average color, 9 bits), the chosen modifier set is [-a, -b, b, a] and q ∈ [-a, -b, b, a], q ∈ [-a, a] or q ∈ [-b, b], $W_R, W_G, W_B$ are different weights for the color components. In addition, $W_G$ is preferably larger than $W_R$ and $W_B$. For example, $$w_B = \frac{2}{16},$$

or $$w_R = 0.299,$$
$$w_G = 0.587$$

and $$w_B = 0.114.$$

and $$w_R = \frac{5}{16},$$

$$w_G = \frac{9}{16}$$

A corresponding (weighted) error value is calculated for all combinations of modifiers and sets, and the combination of modifiers and set that result in the smallest error is selected.

In this simple encoding, an average color of eight image elements in the block, quantized to 3 bits per color component, is used as color codeword. The correct intensity modifier set is then chosen by exhaustive search, i.e. all the eight sets in an intensity table, e.g. Table 1, are tried, and the set that minimizes the error value is selected. This requires 8×4=32 evaluations per image element. If weights are $$w_R = \frac{5}{16},$$

$$w_G = \frac{9}{16}$$

and $$w_B = \frac{2}{16},$$

integer arithmetics can be used and the encoding becomes fast. For this selection of weights, encoding of an image of 64×64 pixels (image elements) using the simple encoding should take less than 100 ms, often around 30 ms, on a 1.2 GHz PC laptop.

Exhaustive Encoding

In the simple encoding example described above, the quantized average color was simply used as a representation (color codeword) of the colors of the image elements in the image block. In this exhaustive encoding example both the colors and the intensity modifier sets (including the modifier values) are chosen, i.e. every possible combination is tried. For a given image element, a further iteration through all 9 bits of color is added in addition to the previous iteration of all 3 bits of intensity modifier set and the 2 bits of intensity index, which together gives $2^{14}$ steps. Encoding an image of 64×64 pixels should take less than half a minute, possibly about 10 s, using the same PC laptop as for the simple compression. Although this might be far too long for run-time applications, especially for larger images, it is not prohibitive for off-line encoding.

Combined Quantization

As for the simple encoding example, this example starts with a (24-bit) average color $(\hat{R}, \overline{G}, \hat{B})$, but the color components of this average color are quantized together with the intensity components, i.e. selection of intensity modifier sets and values.

If $R_{low}$ and $R_{high}$ denote the 3-bit quantization levels or values that are directly below and above $\overline{R}$, respectively so that $R_{low} \leq \overline{R} \leq R_{high}$. The task is then to choose $\hat{R}$ as either $R_{low}$ or $R_{high}$. The same is true for the green and blue components.

Firstly, the error value is calculated with $(\hat{R}, \overline{G}, \hat{B})=(R_{low}, G_{low}, B_{low})$:

$$\epsilon^2=(R_{low}+q-\overline{R})^2+(G_{low}+q-\overline{G})^2+(B_{low}+q-\overline{B})^2. \quad (4)$$

This can be simplified into:

$$\epsilon=(\delta_R+q)^2+(\delta_G+q)^2+(\delta_B+q)^2, \quad (5)$$

where $\delta_R=R_{low}-\overline{R}$, $\delta_G=G_{low}-\overline{G}$ and $\delta_B=B_{low}-\overline{B}$. Further assume that q (the intensity modifier) can be chosen freely, i.e. is equal to the optimal $$q = -\frac{\delta_R + \delta_G + \delta_B}{3}.$$

Inserting this optimal q into equation (5) gives after simplification:

$$\varepsilon^2 = \frac{2}{3}(\delta_R^2 + \delta_G^2 + \delta_B^2 - \delta_R\delta_G - \delta_R\delta_B - \delta_G\delta_B) = \frac{2}{3}\xi, \quad (6)$$

where $\xi$, is the expression in the brackets.

However, if the higher value is instead chosen for the red component, i.e. $(\hat{R}, \overline{G}, \hat{B})=(R_{high}, G_{low}, B_{low})$, and the fact that $R_{high}-\overline{R} \approx 36+\delta_R$ is used, equation (5) can be rewritten as:

$$\epsilon^2 \approx ((\delta_R+36)+q)^2+(\delta_G+q)^2+(\delta_B+q)^2. \quad (7)$$

This expression can further be simplified, by inserting the optimal $$q \approx -\frac{\delta_R + 36 + \delta_G + \delta_B}{3}$$

for this case, into:

$$\varepsilon^2 \approx \frac{2}{3}(\delta_R^2 + \delta_G^2 + \delta_B^2 - \delta_R\delta_G - \delta_R\delta_B + 36^2 + 36 \times 2\delta_R - \delta_G - \delta_B) \quad (8)$$

$$= \frac{2}{3}(\xi + 36[36 + 2\delta_R - \delta_G - \delta_B]).$$

In order to determine which of these two quantized colors $(R_{low}, G_{low}, B_{low})$ or $(R_{high}, G_{low}, B_{low})$ is the best, i.e. gives the smallest error value, the extra expression in the straight brackets of equation (8) is investigated. In other words, if $36+2\delta_R-\delta_G-\delta_B<0$, $(R_{high}, G_{low}, B_{low})$ should be chosen, else $(R_{low}, G_{low}, B_{low})$ is chosen (in the case $36+2\delta_R-\delta_G-\delta_B=0$, either codeword could be chosen). This procedure is then repeated for all possible combinations of low and high quantizations for the three color components, i.e. for all neighboring quantized colors of the average color. The result is presented in Table 3 below.

TABLE 3

| Color codeword | Error value $\epsilon^2$ |
| --- | --- |
| $R_{low}, G_{low}, B_{low}$ | $\frac{2}{3}\xi$ |
| $R_{high}, G_{low}, B_{low}$ | $\frac{2}{3}(\xi + 36[36 + 2\delta_R - \delta_G - \delta_B])$ |
| $R_{low}, G_{high}, B_{low}$ | $\frac{2}{3}(\xi + 36[36 + 2\delta_G - \delta_R - \delta_B])$ |

TABLE 3-continued

| Color codeword | Error value $\epsilon^2$ |
| --- | --- |
| $R_{low}, G_{low}, B_{high}$ | $\frac{2}{3}(\xi + 36[36 + 2\delta_B - \delta_R - \delta_G])$ |
| $R_{low}, G_{high}, B_{high}$ | $\frac{2}{3}(\xi + 36[36 - 2\delta_R + \delta_G + \delta_B])$ |
| $R_{high}, G_{low}, B_{high}$ | $\frac{2}{3}(\xi + 36[36 - 2\delta_G + \delta_R + \delta_B])$ |
| $R_{high}, G_{high}, B_{low}$ | $\frac{2}{3}(\xi + 36[36 - 2\delta_B + \delta_R + \delta_G])$ |
| $R_{high}, G_{high}, B_{high}$ | $\frac{2}{3}\xi$ |

Note that ξ, is not required to be explicitly calculated, only the expressions (error representations) in the straight brackets of Table 3 have to be calculated in order to select the quantization levels (color codeword) to use. Further note that color codeword ($R_{low}, G_{low}, B_{low}$) and ($R_{high}, G_{high}, B_{high}$) give the same error value. This is under the assumption that any q (intensity modifier value) can be reached. In reality, however, q is limited to the intensity modifier values of the used modifier set(s) or modifier subset, e.g. the modifier values of Table 1. According to Table 1, smaller modifier values (q) can be specified with greater accuracy than larger values, which means that it is better to choose ($R_{high}, G_{high}, B_{high}$) rather than ($R_{low}, G_{low}, B_{low}$) if ($\hat{R}, \overline{G}, \hat{B}$) is closer to ($R_{high}, G_{high}, B_{high}$) than ($R_{low}, G_{low}, B_{low}$), and vice versa. The total encoding time should not change much compared with the simple encoding, i.e. an image of 64×64 pixels should still be compressed in less than 100 ms.

Image Decoding

Figure 7:
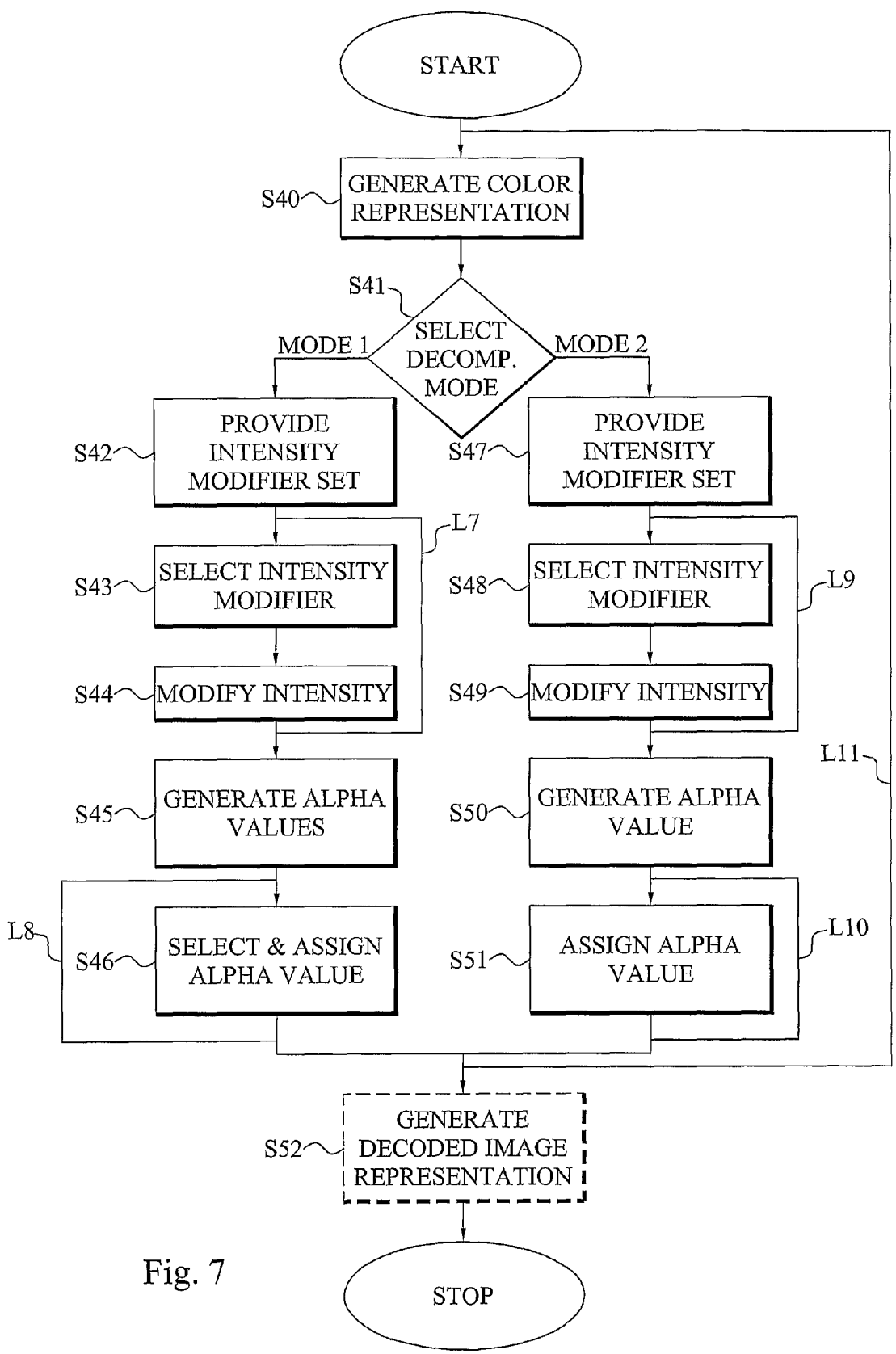
FIG. 7 is a flow diagram illustrating an image decoding method.

FIG. 7 illustrates a flow diagram of a method of decoding an encoded image or encoded version of an original image according to the technology disclosed herein. The encoded image basically comprises several compressed or encoded representations of image blocks, such as representations 700 of FIG. 3A or 3B. These compressed block representations are preferably generated by the image encoding method discussed above in connection with FIG. 1.

The method generally starts by identifying compressed image block(s) to decompress. It could be possible that all compressed image blocks of an encoded image should be decompressed to generate a decoded representation of the original image. Alternatively, only a portion of the original image is to be accessed. As a consequence, only a selected number of image blocks have to be decompressed (or more precisely, a selected amount of image elements of certain image blocks have to be decompressed or decoded).

The method starts in step S40, where a color representation is generated for at least one of the image elements in the image block. This color generation is performed based on the color codeword in the compressed block representation. In a next step S41, a decompression mode to use for the current image block is selected. This mode selection is based on the alpha codeword, preferably based on a comparison of the quantized alpha values of the alpha codeword or based on the actual value or bit-pattern of at least one of the quantized alpha values. Similarly to the compression mode selection of FIG. 1, if the quantized alpha values differ, a first decompression mode (PAA mode) is selected, whereas if (all) quantized alpha values are equal, a second decompression mode (PAT mode) is selected in step S41. Alternatively, if the mode-associated quantized alpha value is equal to a PAA-specific (PAT-specific) value, the PAA (PAT) decompression mode should be selected in S41.

According to the PAA decompression mode, an intensity modifier set is provided in step S42. This modifier set is provided based on the intensity codeword in the compressed block representation. This set provision is preferably performed by identifying, by means of the intensity codeword, an intensity modifier set from a table, e.g. Table 1, comprising multiple modifier sets. This table could be a table common to both alpha block decompression modes or a mode-adapted table. However, in some applications it might be possible that the intensity codeword itself comprises the modifier set and that no table look-up is required.

In step S43, the intensity modifier to use for the image element that should be decompressed is selected. The modifier value is selected from the modifier set provided in step S42 based on the intensity index associated with the image element or associated with the image element subset, to which the image element belongs. In this PAA decompression mode, if each image element is associated with an own intensity index, this index preferably points to an intensity modifier found in a subset of the modifier set. For example, if the intensity modifier set provided in step S42 is according to [−a, −b, b, a], the (1-bit) intensity index preferably only can represent the modifier value −a or a (or alternatively e.g. −b or b). However, in cases where a given intensity index is instead assigned to a subset of multiple (neighboring) image elements, the intensity index preferably can represent any of the modifier values −a, −b, b or a.

Once the correct intensity modifier value is selected in step S43, the intensity of the image element is modified or modulated with this value in step S44. Intensity modification according to the invention refers to modifying, e.g. adding or multiplying, all color components of the color representation by the (possibly weighted) intensity modifier value.

Steps S43 and S44 could be performed for several image elements in the image block (schematically illustrated by line L7). It is anticipated by the invention that in some applications, only a single image element is decompressed from a specific image block, multiple image elements of a specific image block are decompressed or all the image elements of a specific block are decompressed.

In the following step S45, multiple, preferably two, alpha values are determined for the image block based on the alpha codeword. In a next step S46, an alpha value is selected for and assigned to the image element that is being decompressed. This alpha value is typically selected using an alpha index associated with the relevant image element and found in the alpha index sequence. However, if the relevant image element belongs to the subset of image elements that does not have an associated alpha index but instead has a pre-defined associated alpha value, that pre-defined alpha value is identified and assigned to the image element in step S46. Step S46 could be performed for several image elements in the image block (schematically illustrated by line L8).

Alternatively, in particular when decompressing a single or a few of the image elements in the compressed block representation, the quantized alpha value of the codeword associated with the image element, either through an alpha index or through the pre-defined association, is selected in step S46. An (unquantized) alpha value is then generated using this selected quantized alpha value. As a consequence, only a single alpha value is then generated and step S45 could be omitted. Thus, the selection based on alpha index can be performed among alpha values, in turn generated using the quantized alpha values of the alpha codeword, or among the quantized alpha values.

If the PAT decompression mode is instead selected in step S41, the method continues to step S47, where an intensity modifier set is provided for the image block using the intensity codeword, preferably provided from an intensity table. This step S47 basically corresponds to the step S42. However, in some applications, different intensity tables can be used in the PAA (step S42) and PAT (step S47) decompression modes. In the next step S48, an intensity modifier to use for the image element is selected from the modifier set provided in step S47. Contrary to the PAA decompression mode, each image element is preferably associated with a unique intensity index and the indices can represent any of the modifier values in the modifier set. The selected intensity modifier is then used to modify the intensity of the image element in step S49. This step S49 corresponds to step S44. The two steps S48 and S49 are preferably repeated for all image elements in the block that should be decompressed, which is schematically illustrated by the line L9.

In the following step S50, a (single) alpha value is generated based on the alpha codeword, more preferably based on the "useful" quantized alpha value of the codeword. In step S51, this alpha value is assigned to the image element. Note that in this mode, preferably only one alpha value is generated and, thus, no selection of alpha value is required. The generated alpha value is preferably assigned to the image elements that should be decompressed, which is schematically illustrated by the line L10.

Steps S40 to S46 or S51 are preferably repeated for all image blocks that comprise image elements that should be decoded (schematically illustrated by line L11). This means that the loop of steps S40 to S46 or S51 could be performed once, but most often several times for different compressed image blocks and/or several times for a specific compressed image block.

In the optional step S52, a decoded representation of the original image, or a portion thereof, is generated based on the decompressed image elements and blocks. Note that in some applications, several image elements have to be decompressed in order to render a single pixel, texel or voxel of the decoded representation. For example, during trilinear interpolation, eight image elements are decompressed and for bilinear interpolation the corresponding number is four image elements, which is well known to the person skilled in the art. The method then ends.

In cases where the same intensity table is used in both decompression modes, the decoding method of FIG. 7 can be modified so that the division into different modes is performed later in the decompression procedure. In such a case, the color representation generation and alpha value(s) generation, and possibly the modifier set provision, precede the decompression mode selection. The mode specific operations will then be selecting and assigning alpha values in the PAA mode and assigning alpha value in the PAT mode.

Figure 8:
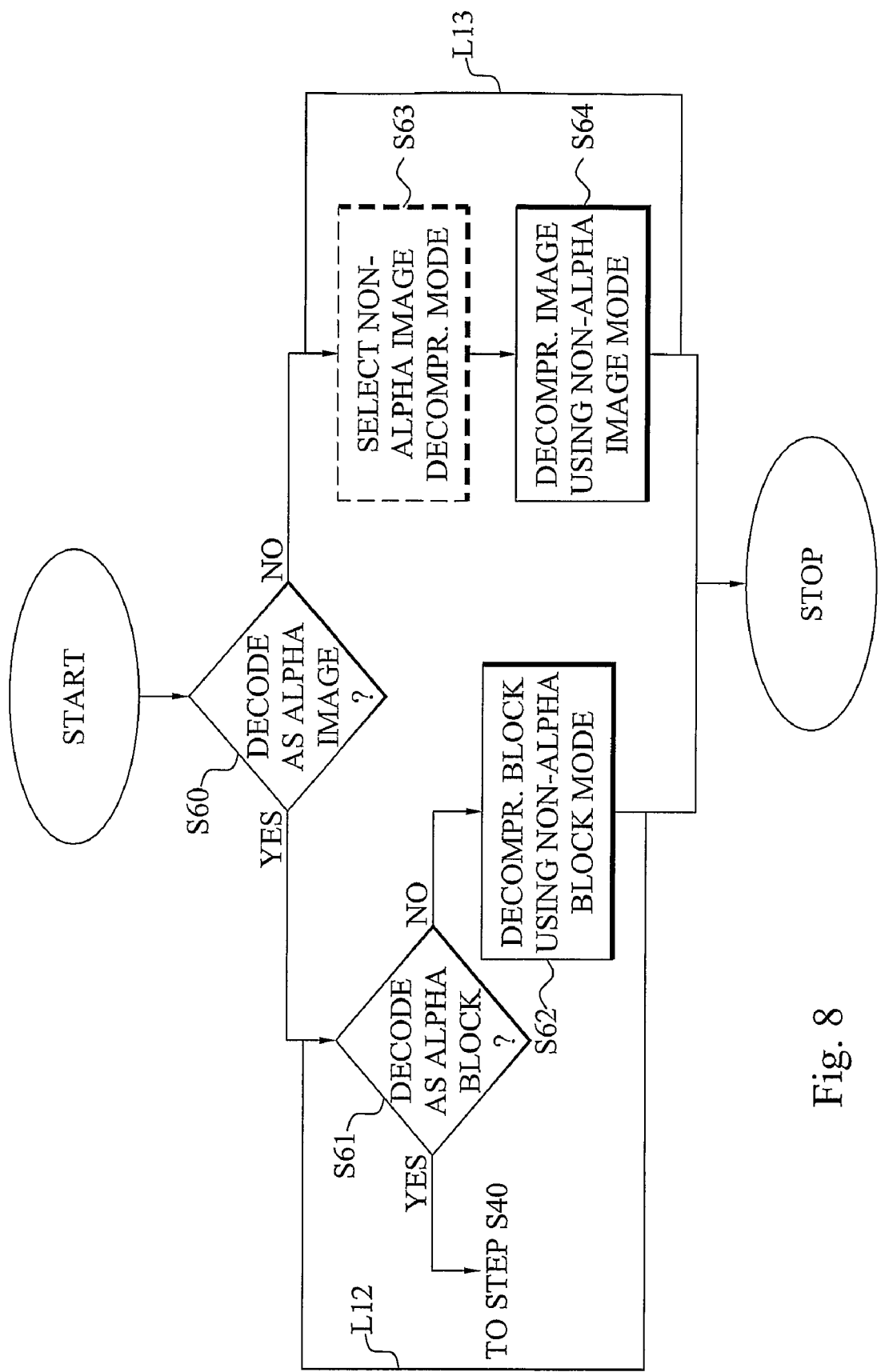
FIG. 8 is flow diagram illustrating additional steps of the image decoding method of FIG. 7.

FIG. 8 is a flow diagram illustrating additional steps of the image decoding method of the invention. The method starts in step S60, where it is investigated whether the image should be decoded as an alpha image or as a non-alpha (alpha-free) image. This selection is preferably based on a (global) alpha image index associated with the image.

If the image is an alpha image, the method continues to step S61. In this step S61, the individual image blocks that should be decompressed are classified as alpha blocks or non-alpha blocks. This classification is preferably performed based on an alpha block index included in the compressed block representations. Thus, if this alpha block index is $1_{bin}$ (or alternatively $0_{bin}$), the image block is an alpha block and should be decompressed using an alpha decompression mode, i.e. one of the modes discussed above in connection with FIG. 7. The method then continues to step S40 of FIG. 7.

If the image block is classified as a non-alpha block it should be decompressed according to a non-alpha block decompression mode (PAP mode) in step S62. This PAP mode basically comprises the steps S40, S42 (or S47), S43 (or S48) and S44 (or S49) of FIG. 7. Thus, a color representation is generated for the image elements in the block using the color codeword. An intensity modifier set is provided using the intensity codeword, preferably provided from an intensity table. This table could be common to this mode and the PAA and PAT modes. However, it might be advantageous to use an intensity table adapted for this PAP mode. Intensity modifiers are then selected from the provided set using the intensity index sequence and the intensity of the image elements are modified.

The block classification of step S61 and block decompression according to one of the alpha block decompression modes (FIG. 7) or the non-alpha block decompression mode (step S62) are preferably repeated for all compressed image blocks of the image that include image elements that should be decoded, schematically illustrated by the line L12.

An encoded image classified as a non-alpha image in step S60 should be decoded using a non-alpha image decompression mode. In the optional step S63, a non-alpha decompression mode to use for a current compressed block is selected. In cases where there is only a single such non-alpha mode available no mode selection is required in step S63. In a next step S64, the compressed image block, or at least a portion thereof, is decompressed using this (possibly selected) non-alpha image mode. A preferred such non-alpha image decompression mode, the PA mode basically corresponds to the PAP decompression mode. The main difference is that the PA decompression mode can utilize an intensity table with preferably up to 16 different modifier sets (due to the 4-bit intensity codeword), whereas the PAP decompression mode preferably uses an intensity table with up to eight different modifier sets (due to 3-bit intensity codeword). In an extension of the PA decompression scheme, a selection between two non-alpha image decompression modes (PP mode or PC mode) can be made for each block. In such a case, the step S63 selects per block basis which of these two modes to use for the current block, preferably based on a (PP or PC) mode index included in the compressed block. The PP decompression mode is similar to the PA scheme. However, the decompressed image block preferably includes a 1-bit PP mode index and a 3-bit intensity index instead of a 4-bit intensity index. The PC decompression mode uses two color codewords instead of one color and one intensity codeword. As a consequence, during decompression two color representations are generated for the block using these two codewords. An image element that is to be decoded is then assigned a color representation selected from these two color representation, preferably based on a color index or a pre-defined element-codeword association.

The steps S63 and S64 are preferably performed for all image blocks in the non-alpha image that should be compressed, which is schematically illustrated by the line L13.

FIG. 9 illustrates an embodiment of the color representation generating step S40 of FIG. 7 in more detail. The method starts in step S70, where the quantized color of the color codeword, preferably 9 bits, is expanded or extended into, preferably, 24 bits. For the case with a RGB color, each quantized 3-bit color component of the color codeword is expanded into an 8-bit color component. This color expansion may be realized by replicating the 3-bit pattern into an 8-bit color word. In other words, a 3-bit color component of $101_{bin}$ is expanded into $10110110_{bin}$. In step S71, the expanded color is assigned to the image elements of the image block, which are to be decoded. The method then continues to step S41 of FIG. 7.

FIG. 10 is a flow diagram illustrating the steps S42 to S46 or steps 47 to S51 in more detail. The method continues from step S41 in FIG. 7. In a next step S80, an intensity modifier set is selected from the intensity table based on the intensity codeword. This intensity table could be a common or a mode-specific table. If the intensity modifier set stored in the intensity table comprises a first subset of modifier values, e.g. [a, b], a second subset of intensity modifier values can be determined from the values of the first subset, e.g. [−a, −b]. In a next step S81, the intensity of the image element is modified by adding an intensity modifier from the selected modifier set to the expanded color. Thus, this modifier value is added to all components (all three for a RGB color) of the color for the image element. This could be implemented as a simple addition of the modifier value to all color components. However, in some applications it could be preferred to weight the modifier value before adding it to the components. In such a case, different weights can be employed for the different color components. In an alternative embodiment, another type of modification than a simple addition could be employed, e.g. multiplication or XOR. In such a case, the same modulation is performed to all components of the expanded color using one and the same intensity modifier value, although this value may be different weighted for the components.

In a next step S82, the resulting intensity-modified color component values are clamped between a minimum color threshold and a maximum color threshold. For example, if after adding the (possibly weighted) intensity modifier value to a color component, the resulting value is smaller than the minimum threshold, the value is clamped to the value of this threshold. Correspondingly, if the resulting value is larger than the maximum threshold, the value of the threshold should instead be used for that component. A non-limiting example of a minimum and maximum threshold is 0 and 255, respectively, for the case with 256 different levels in the color components.

In the following step S83, one or multiple, depending on the used alpha block decompression mode, (8-bit) alpha value(s) is (are) generated by expanding the quantized alpha value(s). In the PAA mode, this expansion can be realized by repeating the two bit pattern of respective quantized alpha value. For example, an quantized alpha value of $01_{bin}$ is expanded to the 8-bit value of $0101\ 0101_{bin}$, which corresponds to the alpha value of 85 (0.3333). In the PAT mode, only a single bit of one of the quantized alpha values is preferably used for generating an alpha value. For example, if this single bit is $1_{bin}$ ($0_{bin}$), the 8-bit alpha value could e.g. be $1010\ 0101_{bin}$ ($0101\ 0101_{bin}$), which corresponds to 170 or 0.6667 (85 or 0.3333).

If a mode-associated quantized alpha value is used, a (al-pha) look-up table could be employed for determining the quantized alpha values that will be expanded into alpha values. In Table 4 below, αA represents the mode-associated quantized alpha value and αB is the data-carrying quantized alpha value.

TABLE 4

| αA | αB | 1st quantized alpha value | 2nd quantized alpha value |
|---|---|---|---|
| $00_{bin}$ | $00_{bin}$ | $00_{bin}$ | $01_{bin}$ |
| $01_{bin}$ | $00_{bin}$ | $00_{bin}$ | $10_{bin}$ |
| $10_{bin}$ | $00_{bin}$ | $00_{bin}$ | $11_{bin}$ |
| $00_{bin}$ | $01_{bin}$ | $01_{bin}$ | $00_{bin}$ |
| $01_{bin}$ | $01_{bin}$ | $01_{bin}$ | $10_{bin}$ |
| $10_{bin}$ | $01_{bin}$ | $01_{bin}$ | $11_{bin}$ |
| $00_{bin}$ | $10_{bin}$ | $10_{bin}$ | $00_{bin}$ |
| $01_{bin}$ | $10_{bin}$ | $10_{bin}$ | $01_{bin}$ |
| $10_{bin}$ | $10_{bin}$ | $10_{bin}$ | $10_{bin}$ |
| $00_{bin}$ | $11_{bin}$ | $11_{bin}$ | $11_{bin}$ |
| $01_{bin}$ | $11_{bin}$ | $11_{bin}$ | $00_{bin}$ |
| $10_{bin}$ | $11_{bin}$ | $11_{bin}$ | $01_{bin}$ |

Note that when αA is equal to $11_{bin}$ the PAT mode should be used, otherwise the PAA mode is employed. Using the Table 4 for PAA mage blocks allows identification of the quantized alpha values to expand (based on alpha index or pre-defined association) into alpha values. The actual expansion is performed similar to above. As can be further seen from the Table 4, there is a one-to-one correspondence between the data-carrying quantized alpha value αB and the first quantized alpha value, but not between the mode-associated quantized alpha value αA and the second quantized alpha value.

The method continues to step S46 or S51 of FIG. 7.

Decoding an encoded image block will further be illustrated by four examples herebelow. In the two first examples, a compressed block representation as illustrated in FIG. 3A, an image block as illustrated in FIG. 2A and an intensity table according to Table 1 are assumed, in the third example, the compressed block representation is according to FIG. 3B and in the fourth example the Table 4 will be employed.

DECODING EXAMPLE 1

The compressed representation of the image block is according to 1 101 0 010 1 001 1 011 1 1011000 01 11 00 $10_{bin}$, where the bit 0 is the mode index, bit 1-3 is the red component of the color codeword, bit 4 is the MSB of the first quantized alpha value of the alpha codeword, bit 5-7 is the green component of the color codeword, bit 8 is the LSB of the first quantized alpha value, bit 9-11 is the blue component of the color codeword, bit 12 is the MSB of the second quantized alpha value of the alpha codeword, bit 13-15 is the intensity codeword, bit 16 is the LSB of the second quantized alpha value, bit 17-23 is the alpha index subsequence and bit 24-31 is the subsequence of intensity indices.

The color codeword is decoded (expanded) to generate the color representation of the image block. Each color component in the color codeword is in 3 bits, but is expanded to 8 bits by replicating the 3-bit pattern into an 8-bit word:
Red: $0110110_{bin} \Leftrightarrow 182$
Green: $0100100_{bin} \Leftrightarrow 73$
Blue: $0110110_{bin} \Leftrightarrow 36$
This expanded color is assigned to the image elements of the image blocks giving:

| (182, 73, 36) | (182, 73, 36) | (182, 73, 36) | (182, 73, 36) |
|---|---|---|---|
| (182, 73, 36) | (182, 73, 36) | (182, 73, 36) | (182, 73, 36) |

The two quantized alpha values of the block are compared. Since $10_{bin}$ (first quantized alpha value) differs from $11_{bin}$ (second quantized alpha value), the block should be decoded according to the PAA decompression mode.

The correct intensity modifier set to use is selected from Table 1 based on the intensity codeword. As is seen in Table 1 an intensity codeword of $011_{bin}$ corresponds to intensity modifiers [−127, −41, 41, 127].

The sequence of intensity indices enables identification of which of these four modifier values to use for the different image elements according to:

$$\begin{bmatrix} 11_{bin} \\ 10_{bin} \\ 00_{bin} \\ 01_{bin} \end{bmatrix} = \begin{bmatrix} -127 \\ -41 \\ 41 \\ 127 \end{bmatrix}$$

In this embodiment of the PAA mode, each intensity index is associated with two neighboring image elements in the block.

The first intensity index is $01_{bin}$, which means that the first intensity modifier value, 127, should be added to all three components of the first image element subset:

$$\begin{bmatrix} 182 \\ 73 \\ 36 \end{bmatrix} + \begin{bmatrix} 127 \\ 127 \\ 127 \end{bmatrix} = \begin{bmatrix} 309 \\ 200 \\ 163 \end{bmatrix}$$

The resulting components are clamped between 0 and 255, thus giving (255, 200, 163). The partly decoded image block is now according to:

| | | | |
|---|---|---|---|
| (255, 200, 163) | (182, 73, 36) | (182, 73, 36) | (182, 73, 36) |
| (255, 200, 163) | (182, 73, 36) | (182, 73, 36) | (182, 73, 36) |

Thus, in this example the same intensity modifier is used for the two image elements positioned in the same column. However, this should merely be seen as an illustrative example. Alternatively, the two neighboring image elements in the same row could instead be assigned the same intensity modifier.

For the next image element subset, the intensity index is $11_{bin}$, i.e. the intensity modifier −127 should be added to all three color components. The result after clamping is (55, 0, 0). Repeating this procedure for all image elements in the block would create the partly decoded image block shown below:

| | | | |
|---|---|---|---|
| (255, 200, 163) | (55, 0, 0) | (223, 114, 77) | (141, 32, 0) |
| (255, 200, 163) | (55, 0, 0) | (223, 114, 77) | (141, 32, 0) |

The two quantized alpha values $10_{bin}$ and $11_{bin}$ are expanded into 8-bit alpha values:
$1^{st}$ alpha value: $10101010_{bin} \Leftrightarrow 170 \Leftrightarrow 0.66670$
$2^{nd}$ alpha value: $11111111_{bin} \Leftrightarrow 255 \Leftrightarrow 1.0$ The first image element is in this example always associated with the first alpha value (or likewise the first quantized alpha value) and is therefore assigned the alpha value 170. For the remaining image elements in the block, the alpha index subsequence is used for selecting alpha value. The second image element (neighbor in the same row) has an alpha index of $1_{bin}$ that represents the second alpha value, i.e. 255. Continuing this value assignment results in the final decoded block of:

| | | | |
|---|---|---|---|
| (255, 200, 163, 170) | (55, 0, 0, 255) | (223, 114, 77, 170) | (141, 32, 0, 255) |
| (255, 200, 163, 255) | (55, 0, 0, 170) | (223, 114, 77, 170) | (141, 32, 0, 170) |

DECODING EXAMPLE 2

In this example, another embodiment of the PAA decompression mode is applied to the compressed representation of the image block 1 101 0 010 1 001 1 011 1 1011000 $01110010_{bin}$. Correspondingly to above, the bit 0 is the mode index, bit 1-3 is the red component of the color codeword, bit 4 is the MSB of the first quantized alpha value, bit 5-7 is the green component of the color codeword, bit 8 is the LSB of the first quantized alpha value, bit 9-11 is the blue component of the color codeword, bit 12 is the MSB of the second quantized alpha value, bit 13-15 is the intensity codeword, bit 16 is the LSB of the second quantized alpha value, bit 17-23 alpha index subsequence and bit 24-31 is the sequence of intensity indices for the image elements of the block.

The color representation is generated in the same way as in the decoding example 1, resulting in the partly decoded block of:

| | | | |
|---|---|---|---|
| (182, 73, 36) | (182, 73, 36) | (182, 73, 36) | (182, 73, 36) |
| (182, 73, 36) | (182, 73, 36) | (182, 73, 36) | (182, 73, 36) |

The same intensity modifier set ([−127, −41, 41, 127]) is selected from Table 1 as in the decoding example 1. However, in this embodiment only the subset comprising the modifier values of [−127, 127] are available for the block. In such a case, an intensity index of $0_{bin}$ represents the modifier 127, whereas $1_{bin}$ represents −127.

The first intensity index is $0_{bin}$, which means that the first intensity modifier value, 127, should be added to all three components of the first image element:

$$\begin{bmatrix} 182 \\ 73 \\ 36 \end{bmatrix} + \begin{bmatrix} 127 \\ 127 \\ 127 \end{bmatrix} = \begin{bmatrix} 309 \\ 200 \\ 163 \end{bmatrix}$$

The resulting components are clamped between 0 and 255, thus giving (255, 200, 163). The partly decoded image block is now according to:

| | | | |
|---|---|---|---|
| (255, 200, 163) | (182, 73, 36) | (182, 73, 36) | (182, 73, 36) |
| (182, 73, 36) | (182, 73, 36) | (182, 73, 36) | (182, 73, 36) |

For the next image element, the intensity index is $1_{bin}$, i.e. the intensity modifier −127 should be added to all three color components. The result after clamping is (55, 0, 0). Repeating this procedure for all image elements in the block would create the partly decoded image block shown below:

| | | | |
|---|---|---|---|
| (255, 200, 163) | (55, 0, 0) | (55, 0, 0) | (55, 0, 0) |
| (255, 200, 163) | (255, 200, 163) | (55, 0, 0) | (255, 200, 163) |

The generation of alpha values is similar to decoding example 1 and is not repeated herein. The final decoded image block will, thus, be according to:

| | | | |
|---|---|---|---|
| (255, 200, 163, 170) | (55, 0, 0, 255) | (55, 0, 0, 170) | (55, 0, 0, 255) |
| (255, 200, 163, 255) | (255, 200, 163, 170) | (55, 0, 0, 170) | (255, 200, 163, 170) |

DECODING EXAMPLE 3

The compressed representation of the image block is according to 1 101 0 010 1 001 0 01111 01 10 00 01 11 00 10$_{bin}$, where the bit 0 is the mode index, bit 1-3 is the red component of the color codeword, bit 4 is a copy of bit 12, bit 5-7 is the green component of the color codeword, bit 8 is a copy of the bit 16, bit 9-11 is the blue component of the color codeword, bit 12 is the "useful" quantized alpha value of the alpha codeword, bit 13-15 is the intensity codeword, bit 16-31 bit 24-31 is the sequence of intensity indices for the image elements of the block.

Since the two quantized alpha values 01$_{bin}$ (bit 4 and bit 8) and 01$_{bin}$ (bit 12 and 16) of the alpha codeword are equal, the PAT decompression mode is used for this block.

The color representation of the block is generated according to the decoding example 1, giving the partly decoded block of:

| | | | |
|---|---|---|---|
| (182, 73, 36) | (182, 73, 36) | (182, 73, 36) | (182, 73, 36) |
| (182, 73, 36) | (182, 73, 36) | (182, 73, 36) | (182, 73, 36) |

The intensity codeword of 011$_{bin}$ means that the same intensity modifier set as in the decoding example 1 and 2 should be used for the current block. However, this is due to that a common intensity table is used in the two alpha block decompression modes for decoding examples 1 to 3. It could, though, be possible to use mode-specific intensity tables so that the modifier set of this decoding example 3 could include other modifier values than the modifier set of the decoding example 1 and 2 even though the intensity codeword is identical in all examples.

The first intensity index is 11$_{bin}$, which means that the first intensity modifier value, −127, should be added to all three components of the first image element:

$$\begin{bmatrix}182\\73\\36\end{bmatrix} + \begin{bmatrix}-127\\-127\\-127\end{bmatrix} = \begin{bmatrix}55\\-54\\-91\end{bmatrix}$$

The resulting components are clamped between 0 and 255, thus giving (55, 0, 0). The partly decoded image block is now according to:

| | | | |
|---|---|---|---|
| (55, 0, 0) | (182, 73, 36) | (182, 73, 36) | (182, 73, 36) |
| (182, 73, 36) | (182, 73, 36) | (182, 73, 36) | (182, 73, 36) |

For the next image element, the intensity index is 01$_{bin}$, i.e. the intensity modifier 127 should be added to all three color components. The result after clamping is (255, 200, 163). Repeating this procedure for all image elements in the block would create the partly decoded image block shown below:

| | | | |
|---|---|---|---|
| (55, 0, 0) | (255, 200, 163) | (141, 32, 0) | (223, 114, 77) |
| (255, 200, 163) | (55, 0, 0) | (223, 114, 77) | (141, 32, 0) |

Thereafter, the alpha value for the image elements is generated. Note that in this PAT mode, a single alpha value is generated for all image elements. The MSB (bit 12) of the second quantized alpha value will be used for generating this alpha value. In this example, this bit is 0$_{bin}$, which is expanded into 0101 0101$_{bin}$ ⇔ 85 ⇔ 0.3333. Thus, the value 85 is assigned to all image elements, resulting in the final decoded image block representation:

| | | | |
|---|---|---|---|
| (55, 0, 0, 85) | (255, 200, 163, 85) | (141, 32, 0, 85) | (223, 114, 77, 85) |
| (255, 200, 163, 85) | (55, 0, 0, 85) | (223, 114, 77, 85) | (141, 32, 0, 85) |

DECODING EXAMPLE 4

The compressed representation of the image block is according to 1 101 0 010 1 001 1 011 1 1011000 01 11 00 10$_{bin}$, where the bit 0 is the mode index, bit 1-3 is the red component of the color codeword, bit 4 is the MSB of the mode-associated quantized alpha value of the alpha codeword, bit 5-7 is the green component of the color codeword, bit 8 is the LSB of the mode-associated quantized alpha value, bit 9-11 is the blue component of the color codeword, bit 12 is the MSB of the data-carrying quantized alpha value of the alpha codeword, bit 13-15 is the intensity codeword, bit 16 is the LSB of the data-carrying quantized alpha value, bit 17-23 is the alpha index subsequence and bit 24-31 is the subsequence of intensity indices.

The generation of color representation and intensity-modifying the color components are performed identically to the decoding example 1 above. The now partly decoded block representation is according to:

| | | | |
|---|---|---|---|
| (255, 200, 163) | (55, 0, 0) | (223, 114, 77) | (141, 32, 0) |
| (255, 200, 163) | (55, 0, 0) | (223, 114, 77) | (141, 32, 0) |

The mode-associated quantized alpha value (αA) is 10$_{bin}$ and the data-carrying quantized alpha value (αB) is 11$_{bin}$. Referring to Table 4, this combination of alpha codeword values represents a first quantized alpha value of 11$_{bin}$ and 10$_{bin}$. These quantized values are expanded into 8-bit alpha values:

1$^{st}$ alpha value: 11111111$_{bin}$ ⇔ 255 ⇔ 1.0

2$^{nd}$ alpha value: 10101010$_{bin}$ ⇔ 170 ⇔ 0.6667

By following the principles outlined in example 1, the final decoded block will be:

| | | | |
|---|---|---|---|
| (255, 200, 163, 255) | (55, 0, 0, 170) | (223, 114, 77, 255) | (141, 32, 0, 170) |
| (255, 200, 163, 170) | (55, 0, 0, 255) | (223, 114, 77, 255) | (141, 32, 0, 255) |

Implementation Discussion

The image encoding (image block encoding) and image decoding (image block decoding) scheme according to the technology disclosed herein could be provided in a general data processing system, e.g. in a user terminal or other unit configured for processing and/or rendering images. Such a terminal could be a computer. However, the invention is well adapted for thin clients, such as Personal Digital Assistance (PDA), mobile units and telephones. Such terminals are typically characterized by limited memory capacity and memory bandwidth, and are powered by batteries, i.e. also limited power supply. Since both encoding and decoding according to the technology disclosed herein can be implemented very simply in hardware, software or a combination of hardware and software and an encoded image block preferably only has a maximum size of 32 bits, the invention could with advantage be applied to a thin client.

Image Processing Terminal

FIG. 11 illustrates an image processing terminal 100 represented by a mobile unit. However, the invention is not limited to mobile units but could be implemented in other terminals and data processing units. Only means and elements in the mobile unit 100 directly involved in the technology disclosed herein are illustrated in the figure.

The mobile unit 100 comprises a (central) processing unit (CPU) 200 for processing data, including image data, within the mobile unit 100. A graphic system 130 is provided in the mobile unit 100 for managing image and graphic data. In particular, the graphic system 130 is adapted for rendering or displaying images on a connected screen 120 or other display unit. The mobile unit 100 also comprises a storage or memory 140 for storing data therein. In this memory 140 image data may be stored, in particular encoded image data (compressed image blocks) according to the technology disclosed herein. Due to the small total size of image blocks (32 bits) and high compression rate (4 bpp), image data can efficiently be stored in the memory 140 also in cases with a mobile unit 100 with limited memory capacity.

An image encoder 210 according to the technology disclosed herein is provided in the mobile unit 100. This encoder 210 is configured for encoding an image or texture into an encoded representation of the image (or texture). As was discussed above, such an encoded representation comprises a sequence or file of multiple compressed image blocks. This image encoder 210 may be provided as software running on the CPU 200, as is illustrated in the figure. Alternatively, or in addition, the encoder 210 could be arranged in the graphic system 130 or elsewhere in the mobile unit 100.

An encoded representation of an image from the block encoder 210 may be provided to the memory 140 over a (memory) bus 150, for storage therein until a subsequent rendering of the image. Alternatively, or in addition, the encoded image data may be forwarded to an input and output (I/O) unit 110 for (wireless or wired) transmission to other external terminals or units. This I/O unit 110 can also be adapted for receiving image data from an external unit. This image data could be an image that should be encoded by the image encoder 210 or encoded image data that should be decoded. It could also be possible to store the encoded image representation in a dedicated texture memory provided, for example, in the graphic system 130. Furthermore, portions of the encoded image could also, or alternatively, be (temporarily) stored in a (texture) cache memory, e.g. in the graphic system 130. A big advantage of the cheap (in terms of complexity) and fast decompression of the technology disclosed herein is that compressed image blocks may, at least temporarily, be stored in the cache for fast and easy access. This is further facilitated by the high compression rate, which allows eight times as much image block data to be simultaneously stored in the cache compared to uncompressed (RGBA8888) block data.

If the (memory) bus 150 has a maximal bandwidth of 32 bits, a single memory access is required to fetch or read out an encoded image representation of the invention from the memory 140. If however, the bus 150 has larger bandwidth capacity, e.g. 64 bits or even 128 bits, multiple encoded image representations could be fetched in a single memory access. For example assume a 64-bit bus 150 and image block size according to FIG. 2A. If the image blocks are according to FIG. 2A and are piled "on top of each other", or if they are according to FIG. 2B and a piled "side by side", an image block together with the subsequent image block in the memory 140 will form a 4×4 square of image elements. However, if the blocks of FIG. 2A (FIG. 2B) are positioned "side by side" ("on top of each other"), the image block together with the following block will form a 2×8 box. A 4×4 square is more preferred, since the probability of finding a desired image element in the 4×4 square is larger than for the 2×8 box, if some form of texture caching system is employed.

An image decoder 220 according to the technology disclosed herein is provided in the mobile unit 100 for decoding an encoded image in order to generate a decoded image representation. This decoded representation could correspond to the whole original image or a portion thereof. The image decoder 220 provides decoded image data to the graphic system 130, which in turn typically processes the data before it is rendered or presented on the screen 120. The image decoder 220 can be arranged in the graphic system 130, as is illustrated in the figure. Alternatively, or in addition, the decoder 200 can be provided as software running on the CPU 200 or elsewhere in the mobile unit 100.

The mobile unit 100 could be equipped with both an image encoder 210 and an image decoder 220, as is illustrated in the figure. However, for some terminals 100 it could be possible to only include an image encoder 210. In such a case, encoded image data could be transmitted to another terminal that performs the decoding and, possibly, rendering of the image. Correspondingly, a terminal 100 could only include an image decoder 220, i.e. no encoder. Such a terminal 100 then receives a signal comprising encoded image data from another terminal and decodes it to generate a decoded image representation. Thus, the encoded image signal could be wirelessly transmitted between terminals using radio transmitter and receiver. Alternatively, other techniques for distributing images and encoded image representations between terminals could be employed, such as IR-techniques using IR ports, Bluetooth and wired transferring of image data between terminals. Also memory cards or chips that can be connected and exchanged between terminals could be used for this image data inter-terminal distribution.

The units 110, 130, 200, 210 and 220 of the mobile unit 100 may be provided as software, hardware or a combination thereof.

Encoder

FIG. 12 illustrates a block diagram of an example embodiment of an image encoder 210 according to the technology disclosed herein. The encoder 210 typically comprises an image decomposer 212 for decomposing or dividing an input image into several image blocks. The decomposer 212 is preferably configured for decomposing the image into image blocks comprising eight image elements. This decomposer 212 could be adapted for decomposing different input images into image blocks with different sizes. In such a case, the decomposer 212 preferably receives input information, enabling identification of which image block format to use for a given image.

The image encoder 210 preferably comprises an image analyzer 214 for classifying the image as an alpha image or a non-alpha image. This analyzer 214 could perform the classification based on a global alpha image index associated with image, e.g. by being stored together with the image data. Alternatively, the analyzer can perform the image classification based on an investigation of the properties (alpha or quantized alpha values) of the image elements in the image. In cases where the image encoder 210 only operates on alpha image, this image analyzer 214 can be omitted. In addition, the image analyzer functionality can alternatively be included in a block encoder 300.

This embodiment of the image encoder 210 comprises a single block encoder 300. This block encoder 300 encodes the image block(s) received from the image decomposer to generate encoded block representation(s). Such an image block representation comprises a color codeword, an intensity codeword, an alpha codeword and a sequence of image element associated indices when operated in an alpha block compression mode (PAA or PAT). The overall size of the block representation is much smaller than the corresponding size of the uncoded image block. The block encoder 300 is preferably configured for processing (encoding) each image block from the decomposer 212 sequentially.

The block encoder 300 preferably comprises, or has access to, at least one intensity table 500 comprising multiple intensity modifier sets. The modifier sets of the table 500 are used for the generation of the intensity, and possibly color, codeword. The intensity table 500 could be arranged in the block encoder 300 or elsewhere in the image encoder 210.

The image encoder 210 could comprise a single intensity table 500 used in all the different compression modes. Alternatively, several different tables could be arranged in the encoder 210, where the intensity modifiers of the tables are adapted for the different compression modes and/or for different image types or a table could be adapted for a specific image.

The units 212, 214 and 300 of the image encoder 210 may be provided as software, hardware or a combination thereof. The units 212, 214, 300 and 500 may be implemented together in the image encoder 210. Alternatively, a distributed implementation is also possible with some of the units provided elsewhere in the user terminal.

FIG. 13 illustrates a block diagram of another example embodiment of the image encoder 210 according to the technology disclosed herein. This image encoder 210 comprises an image decomposer 212 and image analyzer 214 as the example embodiment of FIG. 12, which are not further discussed. However, the encoder 210 includes multiple (M, where M is a positive integer larger than one) block encoders 300-1 to 300-M. Each such block encoder 300-1 to 300-M basically corresponds to the block encoder of the image encoder in FIG. 12. By providing multiple block encoders 300-1 to 300-M in the image encoder 210, multiple image blocks from the decomposer 212 may be processed (encoded) in parallel, which reduces the total image encoding time. Alternatively, a first subset of the block encoders 300-1 to 300-P could be operated for compressing an image block according to the PAA compression mode and a remaining subset of the encoders 300-P+1 to 300-M are operated according to the PAT compression mode (1<P<M). In another example embodiment, a first subset of the block encoders 300-1 to 300-P are operated for compressing alpha images, i.e. according to one of the PAA, PAT and PAP modes. The remaining block encoders 300-P+1 go 300-M could then be used for non-alpha images (PA mode or PP and PC modes). In such a case, the image analyzer 214 preferably generates a compression mode command activating a (or multiple) correct block encoder(s) operable according to the relevant compression mode(s).

Each block encoder 300-1 to 300-M could comprise an intensity table 500. The intensity tables 500 in the different encoders 300-1 to 300-M could all include identical intensity modifier values. Alternatively, mode-specific intensity tables could be employed by the encoders 300-1 to 300-M. In an alternative implementation, a single intensity table 500 is arranged in the image encoder 210 and connected to all block encoders 300-1 to 300-M.

The units 212, 214 and 300-1 to 300-M of the image encoder 210 may be provided as software, hardware or a combination thereof. The units 212, 214, 300-1 to 300-M and 500 may be implemented together in the image encoder 210. Alternatively, a distributed implementation is also possible with some of the units provided elsewhere in the user terminal.

FIG. 14 illustrates a block diagram of an embodiment of a block encoder 300 according to the present invention, such as the block encoder of the image encoder in FIG. 12 or one of the block encoders in the image encoder of FIG. 13. The encoder 300 comprises an alpha quantizer 340 that generates an alpha codeword comprising multiple quantized alpha values based on the alpha values of the image elements in the block. This alpha codeword, or the quantized alpha values of the codeword, are preferably forwarded to a mode selector 310 in the block encoder 300. If the image elements of the current block are all associated with non-transparency values, the alpha quantizer 340 could generate a non-alpha block identifier. In such a case, this non-alpha block identifier is forwarded to the mode selector 310.

The mode selector 310 selects a compression mode to use for the current block. This mode selection is, at least partly, performed based on the received alpha codeword or values from the alpha quantizer 340. For example, if the quantized alpha values are not all equal, the PAA compression mode is selected, whereas if they are equal, the PAT compression mode is selected. Instead, the mode-associated quantized alpha value could be used by the mode selector 310 when selecting compression mode.

The color quantizer 320 determines a color representation of the colors of the image elements in the image block and quantizes this color representation. The color representation is preferably a 24-bit average color of the image element. The color representation is subsequently quantized into a 9-bit color representation, i.e. the color codeword, by the quantizer 310.

An intensity quantizer 330 is provided in the block encoder 300 for identifying an intensity modifier set to use for a current image block. The quantizer 330 is preferably configured for selecting this modifier set from an associated intensity table 500. The quantizer 330 then generates an intensity codeword that is associated with the selected modifier set. In cases, where multiple intensity tables 500 are available, the correct (mode-specific) table to use is preferably identified based on the received mode signal from the mode selector 310.

The encoder 300 further includes an index selector 350 that selects image element associated indices (alpha and intensity indices) for the image elements in the block. When the mode command from the mode selector 310 signals the PAA mode, the index selector 350 firstly generates a first subsequence with alpha indices. This alpha index subsequence preferably comprises an alpha index for each image element in a subset of the image elements of the block. Such an alpha index is associated with one of the quantized alpha values of the alpha codeword generated by the alpha quantizer 340. A remaining subset, preferably including one image element, has a pre-defined association with one of the quantized alpha values, implying that no alpha index is required for this image element. In addition, the index selector 350 also generates an intensity index subsequence. In a first embodiment of this PAA mode, this intensity index subsequence comprises a respective intensity index for each subset of multiple, preferably two, more preferably two neighboring, image elements in the block. In a second embodiment of the PAA mode, each image element is associated with a respective intensity index. These intensity indices are each associated with one of the intensity modifiers in the modifier set represented by the intensity codeword from the intensity quantizer 330. In the first PAA embodiment, all of the modifier values of the modifier set are available and can be represented by an intensity index. However in the second PAA embodiment, preferably a subset of the modifier values can be represented by an intensity index.

In the PAT mode, the index selector 350 generates an intensity index that includes, for each image element in the block, an intensity index associated one of the modifier values in the intensity modifier set represented by the intensity codeword as provided by the intensity quantizer 330.

The block encoder 300 could optionally comprise an error estimator 360 for estimating error values for the purpose of selection of codewords and image element associated indices for the image block. The choice of codeword and indices that minimizes an associated error value is then selected for the relevant compressed image block version(s).

This block encoder structure is very flexible and can be used not only for the alpha block compression modes but also for the non-alpha block compression mode (PAP) and even for compressing non-alpha images.

In such a case, the mode selector 310 generates a respective mode signal. The color quantizer 320, intensity quantizer 330 and index selector 350 are then responsive to this mode-specific signal.

For example, in cases the image is a non-alpha image, the mode selector 310 preferably receives a non-alpha image identifier from the image analyzer of the image encoder. Then, a PA mode or one of the PP and PC mode signals is generated by the mode selector 310.

The mode selector 310 preferably also generates a block mode index that is included in or associated with the resulting compressed image block. For an alpha image, this mode index indicates an alpha block (PAA or PAT mode) or a non-alpha block (PAP mode). For a non-alpha image, this mode index can be used to discriminate between the PP and PC mode. However, in cases where non-alpha images are encoded using the single non-alpha compression mode PA, no block mode index is required.

When the color quantizer 320 receives a PAP, PA or PP mode signal, the quantized color representation of the image block is preferably a 12-bit-color codeword, compared to a 9-bit color codeword in the PAA and PAT mode. In addition, in cases the mode signal represents the PC mode, this color quantizer 320 preferably generates two 12-bit color codewords based on the color components values of the image elements in the block.

The mode-specific signal from the mode selector 310 is used by the intensity quantizer 330 to discriminate between intensity tables and/or between intensity codeword sizes, preferably 3-bit intensity codeword in the PAA, PAT, PAP and PP modes and 4 bits in the PA mode.

If the mode signal represents the PC mode, the index selector 350 generates a color index for each image element in a subset of the image elements in the block. Each color index is associated one of the two color codewords that have been generated by the color quantizer 320 when operated in this PC mode. A remaining image element subset, preferably one image element, has a pre-defined association with one of the color codewords.

The units 310 to 360 of the block encoder 300 may be provided as software, hardware or a combination thereof. The units 310 to 360 and 500 may be implemented together in the block encoder 300. Alternatively, a distributed implementation is also possible with some of the units provided elsewhere in the image encoder.

A preferred implementation of a color quantizer 320 according to the technology disclosed herein is illustrated in the block diagram of FIG. 15. The quantizer 320 comprises means 322 configured for determining an average of the colors of the image elements in the image block. This average color is preferably a RGB color, but could be any other color format used in image processing. This determined average color is provided to quantizing means 324, which quantizes the average color. The quantizer 314 is preferably configured for quantizing a 24-bit average RGB color from the color average 322 into a 9-bit RGB color.

When operated according to one of the PAP, PA and PP modes, the corresponding quantized average RGB color is preferably 12 bits. When operated according to the PC mode, the quantizing means 324 determines two color codewords for the image block. This can be realized by determining an optimal line passing through the average color point in the (RGB-) color space. Two points on this line are then selected and quantized by the quantizing means 324 into two (12-bit) RGB color codewords.

The units 322 and 324 of the color quantizer 320 may be provided as software, hardware or a combination thereof. The units 322 and 324 may be implemented together in the color quantizer 320. Alternatively, a distributed implementation is also possible with some of the units provided elsewhere in the block encoder.

A preferred implementation of an intensity quantizer 330 according to the technology disclosed herein is illustrated in the block diagram of FIG. 16. The quantizer 330 preferably comprises a modifier set selector 332 for selecting a modifier set from an associated intensity table 500. The quantizer 330 then generates an intensity codeword that is associated with the selected modifier set. The choice of intensity table, if any, is preferably based on an input mode signal.

The unit 332 of the intensity quantizer 330 may be provided as software, hardware or a combination thereof.

A preferred implementation of an alpha quantizer 340 according to the technology disclosed herein is illustrated in the block diagram of FIG. 17. Quantizing means 344 of the alpha quantizer 340 preferably quantizes the original alpha values of the image block. The respective alpha values are preferably quantized into a value selected from a pre-defined set of available values, such as a set of [0.0, 0.3333, 0.6667, 1.0](0,85,170,255), [0.0, 0.50, 0.75, 1.0](0,128, 191, 255), [0.0, 0.25, 0.50, 1.0](0, 64, 128, 255) or [0.0, 0.25, 0.75, 1.0](0, 64, 191, 255). This set is preferably stored in a memory or table 346 in the alpha quantizer 342 or otherwise associated thereto. A selector 342 in the quantizer 340 then selects the two quantized alpha values from the pre-defined set that best represents the (eight) quantized values of the block. In an alternative implementation, the selector 342 selects two quantized alpha values for the pre-defined set that best represents the (eight) original (unquantized) alpha values of the block. In either case, these two selected values will be the quantized alpha values of the alpha codeword.

The value selection can be performed as an exhaustive search by testing any of combination of two quantized alpha value from the set in the memory 346. The particular combination that results in a smallest error value is then selected.

The selector 342 compares these two quantized alpha values (selected quantized alpha values). If they differ, the selector 342 generates a PAA mode identifier and forwards it the mode selector of the block encoder. However, if they are equal, a PAT mode identifier is instead generated and transmitted.

Alternatively, the two quantized alpha values can be sent to the mode selector instead of the PAA/PAT mode identifier.

If the two quantized alpha values are not equal, the resulting alpha codeword preferably includes two 2-bit quantized alpha values. If, however, the quantized alpha values are equal, only a single bit of the alpha codeword will be used as representation of an alpha value. One of the bits of the other quantized alpha value will be a copy of this bit. In addition, the remaining bit of one of the quantized alpha values will be shared by the intensity index sequence, i.e. is then defined by the index selector of the block encoder. The remaining bit of the other quantized alpha value will be a copy of this shared bit.

The units 342 and 344 of the alpha quantizer 340 may be provided as software, hardware or a combination thereof. The units 342, 344 and 346 may be implemented together in the alpha quantizer 340. Alternatively, a distributed implementation is also possible with some of the units provided elsewhere in the block encoder.

A preferred implementation of an index selector 350 according to the technology disclosed herein is illustrated in the block diagram of FIG. 18. This index selector 350 preferably comprises an intensity index selector 352 for selecting an intensity index for each subset of at least one image element. The resulting intensity index subsequence preferably includes four 2-bit or eight 1-bit intensity indices when operating the intensity index selector 352 according to the PAA compression mode. Correspondingly, when operated according to the PAT (and PAP, PA or PP) mode, the intensity index selector preferably generates a subsequence of eight 2-bit intensity indices.

The index selector 350 preferably also includes an alpha index selector 354 for selecting alpha indices when operating in the PAA mode and generating an alpha index subsequence. This sequence preferably includes seven 1-bit alpha indices.

The index selector 350 could also include a color index selector that is operable in the PC mode. In such a case, it generates a sequence of color indices, preferably seven 1-bit color indices.

The units 352 and 354 of the index selector 350 may be provided as software, hardware or a combination thereof. The units 352 and 354 may be implemented together in the index selector 350. Alternatively, a distributed implementation is also possible with some of the units provided elsewhere in the block encoder.

Decoder

FIG. 19 illustrates a block diagram of an example embodiment of an image decoder 220 according to the technology disclosed herein. The image decoder 220 preferably comprises an image analyzer 224 that analyzes the received encoded image to determine, whether the encoded image is an alpha image or a non-alpha image. This image classification is preferably based on a global alpha image index associated with the encoded image, such as stored together with the encoded image data. An alpha image identifier (alpha image or non-alpha image) is preferably generated by the analyzer based on the classification and sent to a block decoder 400 that performs the actual decoding of the image blocks. If the image decoder 220 only operates on alpha images, this image analyzer 224 can be omitted. The image analyzing functionality could alternatively be included in a block decoder 400.

A block selector 222 is preferably implemented in the image decoder 220 for selecting, e.g. from a memory, which encoded image block(s) that should be provided to the block decoder 400 for decoding. The block selector 222 preferably receives input information associated with the encoded image data, e.g. from a header or a rendering engine. An address of a compressed image block having the desired image element(s) is computed based on the input information. This computed address is preferably dependent upon the image-element (pixel, texel or voxel) coordinates within an image. Using the address, the block selector 222 identifies the encoded image block from e.g. a memory or a cache. This identified encoded image block is then fetched from the storage and provided to the block decoder 400.

The (random) access to image elements of an image block advantageously enables selective fetching and decoding of only those portions of an image that are needed. Furthermore, the image can be decoded in any order the data is required. For example, in texture mapping only portions of the texture may be required and these portions will generally be required in a non-sequential order. Thus, the image decoding of the technology disclosed herein can with advantage be applied to process only a portion or section of an image.

The selected encoded image block is forwarded to the block decoder 400. In addition to the image block, the decoder 400 preferably receives information specifying which image elements of the block that should be decoded. The information could specify that the whole image block, i.e. all image elements therein, should be decoded. However, the received information could identify only a single or a few of the image elements that should be decoded. In addition, the block decoder 400 also receives the alpha image identifier. The block decoder 400 then generates a decompressed representation of the image element(s) in the block. This decoded representation is preferably an S-bit color, where S is the number of bits per image element in the original image, e.g. a 24-bit RGB color, and a T-bit alpha value, where T is the number of bits per image element in the original image, e.g. 8-bit alpha value. The block decoder 400 preferably comprises an intensity table 500 that is used during the decoding procedure. Alternatively, this intensity table 500 could be provided elsewhere in the image decoder 220. Usage of different intensity tables for different decompression modes and/or image types, discussed above in connection to FIGS. 12 and 13, also applies to the image decoder 220.

An optional image composer 226 could be provided in the decoder 220. This composer receives the decoded image elements from the block decoder 400 and composes them to generate a pixel, texel or voxel that can be rendered or displayed on a screen. The composer 226 could require several input image elements to generate a single pixel, texel or voxel. This image composer 226 could alternatively be provided in the graphic system.

The units 222 to 226 and 400 of the image decoder 220 may be provided as software, hardware or a combination thereof. The units 222 to 226, 400 and 500 may be implemented together in the image decoder 220. Alternatively, a distributed implementation is also possible with some of the units provided elsewhere in the user terminal.

FIG. 20 illustrates a block diagram of another example embodiment of an image decoder 220 according to the technology disclosed herein. The block selector 222, image analyzer 224 and image composer 226 are similar to corresponding units in FIG. 19 and are not further discussed.

The image decoder 220 comprises multiple block decoders 400-1 to 400-Q (Q is a positive integer larger than one). By having access to multiple block decoders 400-1 to 400-Q, the image decoder 220 can process (decompress) multiple compressed image blocks in parallel. These multiple block decoders 400-1 to 400-Q allow for parallel processing that increases the processing performance and efficiency of the image decoder 220. For example, one decoded image element is generally sufficient for nearest neighbor interpolation, whereas four (eight) image element are need for bilinear (trilinear) interpolation. Each block decoder 400-1 to 400-Q could comprise an intensity table 500 used for the decoding. Alternatively, a single table 500 is arranged in the image decoder 220 and connected to all block decoders 400-1 to 400-Q. The further discussion of using different types of intensity tables, see above in connection with FIG. 13, also applies for the image decoder 220. Similar to the discussion above in connection with FIG. 13, a first subset of the block decoders 400-1 to 400-P could be operated for decompressing a compressed image block according to the PAA decompression mode, whereas a remaining subset of the decoders 400-P+1 to 400-Q are operated according to the PAT decompression mode (0<P<Q).

Alternatively, some of the block decoders 400-1 to 400-P are adapted for decompressing blocks of alpha images (PAA, PAT and PAP mode) and the remaining decoders 400-P+1 to 400-Q can then be used for decompressing blocks of non-alpha images (PA, PP or PC mode).

The units 222 to 226 and 400-1 to 400-Q of the image decoder 220 may be provided as software, hardware or a combination thereof. The units 222 to 226, 400-1 to 400-Q and 500 may be implemented together in the image decoder 220. Alternatively, a distributed implementation is also possible with some of the units provided elsewhere in the user terminal.

FIG. 21 is an illustration of an example embodiment of a block decoder 400 according to the technology disclosed herein. The block decoder 400 comprises a decompression mode selector 410 that selects a mode, according to which a current encoded image block should be decompressed. This mode selection is preferably based, at least partly, on an investigation of the alpha codeword or at least one of the quantized alpha values of the alpha codeword, i.e. allows discrimination between the PAA and PAT mode. A mode-specific signal or command is then generated by the mode selector 410. The including units of the block decoder 400 are preferably responsive to this mode-specific signal.

A color generator 430 generates a color representation for the image elements in the image block based on the color codeword. This generator 420 preferably expands the 9-bit color of the codeword into a 24-bit (RGB) color.

The block decoder 400 further includes means 420 for providing an intensity modifier set from an associated intensity table 500 based on the intensity codeword. This provider 420 could be configured for fetching a first subset of modifier values from the intensity table 500 and determining a second subset of modifiers based on the first subset. In cases of a choice between multiple intensity tables 500, the correct table to use is preferably identified by the provider 420 based on the mode signal from the mode selector 410.

A modifier selector 440 is arranged for selecting one of the intensity modifier values from the modifier set provided by the means 410. The modifier selector 440 is configured for selecting correct modifier values for the image elements in the compressed image block based on the sequence of intensity indices. The mode signal from the mode selector 410 enables the modifier selector 440 to identify correct intensity index from the sequence, e.g. discriminate between 1-bit indices (one embodiment of the PAA mode) and 2-bit indices (second embodiment of the PAA mode or PAT mode).

The expanded color from the color generator 430 and modifier value from modifier selector 440 are forwarded to an intensity modulator or modifier 450 that modifies the intensity of the color components of the expanded color with the modifier value. The modifier 450 could use a weighted intensity modifier value, with different weights for the different color components. Furthermore, once the color components have been intensity modified the modifier 450 preferably clamps the components between a maximum and minimum threshold, e.g. between 0 and 255.

An alpha value generator 460 is implemented in the block decoder for generating at least one alpha value for the image block. This value generation is based on the alpha codeword of the compressed image block representation. If the mode command from the mode selector 410 signals the PAA mode, the generator 460 determines a first alpha value using the first quantized alpha value of the alpha codeword and a second alpha value using the second quantized alpha value. The generator 460 could determine the alpha values directly from the quantized alpha values of the alpha codewords. In an alternative implementation, the generator 460 uses a table-look up or conversion algorithm to provide a first and a second quantized alpha value from the alpha codeword. In either case, the (2-bit) quantized alpha values are preferably expanded into 8-bit alpha values. However, when operating in the PAT mode, preferably only a single bit of one of the quantized alpha values is used for generating a single alpha value.

An alpha assigner 470 receives the alpha value from the generator 460 and assigns them to the image elements. This value assignment is performed, in the PAA mode, using the alpha index and the pre-defined alpha association. Thus, for an image element with an associated alpha index, that index is used to select one of the two possible alpha values. If the image element instead is pre-defined associated with one of the quantized alpha values, i.e. has no alpha index, then the alpha value generated from this quantized alpha value is assigned to the image element by the assigner 470. In the PAT mode, no alpha indices are found in the compressed image block. As a consequence, all image elements in the block to be decompressed are assigned the single alpha value from the generator 460.

Similarly to the block encoder of FIG. 14, the block decoder 400 according to the technology disclosed herein provides a flexible solution for expansion of the decompression modes. Thus, the block decoder 400 could be dedicated for decompressing only alpha block blocks. However, it can simply be expanded to also manage decompression of non-alpha blocks according to the PAP, PA, PP or PC modes.

The mode selector 410 then generates the correct mode-specific signal from input information associated with the current compressed image block. This input information preferably includes, in addition to the alpha codeword, a block mode index contained in the compressed image block and a global alpha image index. In such a case, discrimination between the PAA, PAT, PAP, PA, PP and PC modes can be made by the selector 410.

The color generator 430 is responsive to the mode-specific signal from the mode selector 410. In cases the signal represents PAA or PAT mode, a (24-bit) color representation is generated from the 9-bit color codeword. However, a PAP, PA or PP mode signal causes the color generator 430 to determine the (24-bit) color representation from a 12-bit color codeword. Correspondingly, when operating according to the PC mode, a first and second color representation is determined using the first and second color codeword, preferably by expanding the (12-bit) codewords into respective 24-bit colors. The relevant color representation is assigned to the respective image element(s) using the color index sequence and the pre-defined color codeword association.

The units 410 to 470 of the block decoder 400 may be provided as software, hardware or a combination thereof. The units 410 to 470 and 500 may be implemented together in the block decoder 400. Alternatively, a distributed implementation is also possible with some of the units provided elsewhere in the user terminal.

FIGS. 22A and 22B schematically illustrate a possible hardware implementation of a block decoder 400 according to the technology disclosed herein. This block decoder 400 is operable not only according the PAA and PAT decompression modes, but also according to the PAP, PP and PC modes. The input to the block decoder 400 is an image block representation compressed according to the PAT mode (700A), PAA mode (700B), PAP mode (700C), PC mode (700D) or PP mode (700E). As can be seen by these different input block representations 700A to 700E, each preferably comprises 1-bit block mode index, a codeword sequence (including color codeword(s), intensity codeword and/or alpha codeword, depending on the employed mode) and an index sequence (including intensity indices, alpha indices and/or color indices, depending on the employed mode). In the PAT, PAP and PP mode, the intensity indices are organized so that the MSB of the eight intensity indices precedes the eight LSB in the index sequence. Thus, an intensity index sequence of 10110001 10000110$_{bin}$ represents the following intensity indices 11$_{bin}$, 00$_{bin}$, 10$_{bin}$, 10$_{bin}$ 00$_{bin}$, 01$_{bin}$, 01$_{bin}$ and 10$_{bin}$. In the PAA mode, each pair of image elements is associated with a 2-bit intensity index. The MSB and LSB of the intensity index of an image element are provided next to each other in the sequence. Thus, an intensity index sequence of 10000110$_{bin}$ represents the following intensity indices 10$_{bin}$, 00$_{bin}$, 01$_{bin}$ and 10$_{bin}$.

The block decoder 400 will mainly be discussed with reference to a PAA or PAT compressed image block and the including units dedicated for the other operational modes will be briefly described.

The mode selector 410 receives input information in the form of the global alpha image identifier, preferably 1 bit, block mode index, preferably 1 bit, and the quantized alpha values, preferably 4×1 bit. A mode-specific signal is output from the mode selector 410 following a processing of the input data. A PC-specific signal is carried on the connection line C1, whereas a PAA and a PAT signal is carried on the connection line C2 and C3, respectively.

The color codeword is provided to the color generator 430, which is realized by three multiplexors 431 to 433, three bit extenders 434 to 436 and an OR-gate 437. The multiplexors 431 to 433 are only required due to the PC mode, which utilizes two color codewords. In all other operational modes, the color component data carried on the lines C4, C6 and C8 are forwarded, whereas the data carried on the lines C5, C7, and C9 are blocked. The mode selection signal comes from an AND-gate 446, which outputs 1$_{bin}$ in the PC mode and when the color index is 1$_{bin}$, otherwise 0$_{bin}$. A first bit extender 434 receives the 4-bit red component and αA0, a second 435 extender receives the 4-bit green component and αA1, and the third extender 436 receives the 4-bit blue component and αB0 (or α). In addition, the output from the OR-gate 437 is also input to each extender 434 to 436. Remember that in the PAA and PAT mode, the respective color component of the codeword is preferably only 3 bits, whereas for the other modes the corresponding color component is 4 bits. As a consequence, the OR-gate 437 outputs 1$_{bin}$ when decompressing a PAA or PAT block, otherwise it outputs 0$_{bin}$. If an extender 434 to 436 receives an OR-gate output of 1$_{bin}$ it will only process and extend the three MSB of the 4-bit output from its preceding multiplexor 431 to 433 into an 8-bit color component. However, if the OR-gate output is 0$_{bin}$, the whole 4-bit multiplexor output is extended into an 8-bit color component.

A modifier selector 440 is implemented as five multiplexors 441 to 445, an AND-gate 446 and a NOR gate 447. A 3-bit address index is input to the multiplexors 441, 442. Based on the address index, the multiplexors 441, 442 select which of the eight image elements to decode. In PAT, PAP and PP mode, the multiplexor 441 outputs the MSB of the 2-bit intensity index and the multiplexor 442 outputs the LSB. However, in the PAA mode, the multiplexor 441 outputs a 1-bit alpha index. Note that in this mode implementation, the first image element in a PAA block is always associated with the first quantized alpha value. As a consequence, the multiplexor 441 receives seven input bits representing the alpha index sequence plus one additional bit (0$_{bin}$) from the multiplexor 443 representing the first image element. Correspondingly, when operating in the PC-mode, the seven color indices of the block representation 700D are input directly to the multiplexor 441, whereas the pre-defined color association of the first image element is realized by outputting 0$_{bin}$ from the multiplexor 443. This multiplexor 443, thus, forwards the MSB (bit 15) of the index sequence (bit 15-31) in PP, PAP and PAT mode. However, in the PC and PAA mode, the NOR-gate 447 outputs 0$_{bin}$, which causes the multiplexor 443 to output 0$_{bin}$ instead of the MSB of the index sequence.

In the PAA mode, the multiplexor 444 receives a 2-bit address index and uses that address to select the MSB of a correct intensity index. The corresponding LSB of the intensity index is output by the multiplexor 442. These two bits are then combined on the line C13. Note that in this decompression mode, the multiplexor 480 always outputs, in this particular implementation, 1$_{bin}$ as the LSB of the address index.

The combined 2-bit output from the multiplexors 441, 442 or from the multiplexors 442, 444 is input to the multiplexor 445. When operating in the PAA mode, this multiplexor forwards the output from the multiplexors 442, 444, otherwise the output from the multiplexors 441, 442 is forwarded. In either case, the 2-bit intensity index is provided to a table look-up 422. This table look-up 422 corresponds to the modifier set provider 420 and intensity table 500 of FIG. 21.

The table look-up 422 also receives the 3-bit intensity index on the connection line C10. In cases where different intensity tables are employed for the alpha block modes (PAA and PAT) and the non-alpha block modes (PAP and PP, remember that no intensity table is employed in the PC mode), the OR-gate 437 outputs a PAA or PAT signal, when decompressing an image block according to one of these modes. The look-up 422 uses the input intensity codeword, optional mode signal and intensity index to fetch the correct intensity modifier value from one of the modifier sets in the table. This 9-bit signed (positive or negative) modifier value is provided to a multiplexor 424. In the PC mode, this multiplexor 424 outputs $0_{bin}$, whereas in the other operational modes it outputs the modifier value from the table look-up 422.

The 9-bit multiplexor output is provided to an intensity modifier 450. In this hardware implementation the modifier 450 comprises three adders 451 to 453 and three clampers 454 to 456. The modifier value is input to respective adder 451 to 453. A first adder 451 adds the intensity modifier value to the 8-bit red component from bit extender 434. Correspondingly, adder 452 and adder 453 add the modifier value to the 8-bit green and blue component from bit extender 435 and 436, respectively. In an alternative implementation, the adders 451 to 453 can be replaced with other modifying elements, e.g. multipliers or XOR gates. The outputs from the adders 451 to 453 are forwarded to clampers 454 to 456, which clamp the intensity modified color components between 0 and 255. The output from the clampers 454 to 456 is the decompressed or decoded 24-bit color of the image element.

The alpha generator 460 comprises, in this hardware implementation, three multiplexors 461 to 463, negation means 464 and a bit extender 465. The first multiplexor 461 receives the two quantized alpha values and outputs one of them based on an alpha index from the multiplexor 441. The selected quantized alpha value is forwarded to a second multiplexor 462. The MSB of the "useful" quantized alpha value is provided to the negation means 464 and then combined with its negated value. For example, an $\alpha=1_{bin}$ will be combined with $0_{bin}$ into $10_{bin}$. The multiplexor 462 selects between the quantized alpha value from the multiplexor 461 and the combined (partly extended) quantized alpha value. In the PAT mode, the combined quantized alpha value originating from the MSB of the useful quantized alpha value is forwarded, otherwise the multiplexor output is forwarded. In the PAA and PAT mode, a third multiplexor 463 forwards the quantized alpha value from the multiplexor 462 to the bit extender 465. However, in the other decompression modes, the multiplexor 463 instead forwards the pre-defined non-transparency value to the extender 465. The bit extender 465 extends the received 2-bit input into an 8-bit alpha value. This alpha value is then combined with the 24-bit color value from the clampers 454 to 456 resulting in a decompressed image element.

If the decoder 400 of FIGS. 22A and 22B is configured for only decompressing alpha images, i.e. is limited to the PAP, PAA and PAT modes, the following units can be omitted from the hardware implementation: the multiplexors 424, 431 to 433, the AND-gate 446 and the NOR-gate 447.

However, as can be seen by the hardware implementation of FIGS. 22A and 22B, the entire decoder 400 can be realized using only a few standard components but still being able to decompress both alpha and non-alpha images and blocks according to up to five different decompression modes. As a consequence, the mode that is most suitable for a given image block can thus be selected among these five modes, which will increase the image quality of a processed image dramatically compared to image processing schemes limited to a single compression and decompression mode.

The connection lines C1 to C17 in FIG. 22A are continued as C1 to C17 in FIG. 22B.

FIG. 23 schematically illustrates a possible hardware implementation of the bit extenders 434 to 436 of FIG. 22B. These extenders receive a 4-bit input representing either a 4-bit (red, green or blue) color component or a 3-bit (red, green or blue) color component and one bit of a quantized alpha value. The extender 434 to 436 then extends this 3- or 4-bit color component into a corresponding 8-bit color component. Two multiplexor inputs are generated, one representing the 4-bit component and one representing the 3-bit component. Starting with the 4-bit component, the MSB of the first multiplexor input is the LSB of the 4-bit extender input, the second MSB is the MSB of the extender input, the third MSB is the second MSB of the extender input and the remaining two LSBs correspond to two LSB of the extender input. In the 3-bit component case, the three MSB of the second multiplexor input is the three MSB of the extender input and the two LSB correspond to the MSB and the second MSB of the extender input.

The multiplexor 438 selects one of these two 5-bit values based a 1-bit value from the OR-gate 437 in FIG. 22B. Thus, in the PAA and PAT mode, this OR-gate output is $1_{bin}$ and the multiplexor 438 forwards the second 5-bit value corresponding to a 3-bit color component, otherwise it outputs the first 5-bit value corresponding to a 4-bit color component. In either case, the 5-bit multiplexor output is then combined with the three MSB of the extender input forming an extended 8-bit color component.

FIG. 24 schematically illustrates a possible hardware implementation of the bit extenders 465 used in the alpha generator 460 of FIG. 22B. This extender 465 simply repeats the 2-bit input quantized alpha value into an 8-bit alpha value. For example, a 2-bit input of $10_{bit}$ is extended into $1010\ 1010_{bin}$.

FIG. 25 schematically illustrates a possible hardware implementation of the clampers 454 to 456 of FIG. 22B. The input to the clamper 454 to 456 is a 10-bit intensity-modified color component value. The eight LSBs of this input value are brought a multiplexor 457. The other input to the multiplexor is the maximum threshold value (255; 8 bits). The multiplexor 457 selects either the 8-bit input value or the maximum threshold value based on the second MSB of the intensity modified color component. In other words, if this second MSB is equal to one, the multiplexor 457 outputs the threshold value, otherwise (the second MSB is equal to zero) the 8-bit input value is output to a second multiplexor 458. This second multiplexor 458 selects the output from the first multiplexor 457 or the minimum threshold value (0; 8 bits) based on the MSB of the color component. If this MSB or sign bit is equal to one, the output from the first multiplexor 457 is negative and the minimum threshold value should be selected by the second multiplexor 458. However, if the sign bit is zero the output from the first multiplexor 457 should also be output from the second multiplexor 458.

FIG. 26 schematically illustrates a possible hardware implementation of a table look-up 422. This table look-up 422 is adapted for using a single intensity table common to all decompression modes. The two LSBs of the 3-bit input intensity codewords are input to two multiplexors 421 and 423 for selecting one 7-bit intensity modifier value from four possible modifier values for each multiplexor 421 and 423. From these 8 intensity modifiers the remaining 24 values could be calculated if employing an intensity table according to Table 1. The selected intensity modifier values from the multiplexors 421 and 423 are input to another multiplexor 425 that selects one of these values based on 1-bit input data (1 bit of the 2-bit intensity representation) from the multiplexor 445 in FIG. 22B. The selected modifier value is then forwarded both to a multiplexor 426 and to negation means 427 that negates the modifier value. Also this negated value is forwarded to the multiplexor 426. This multiplexor 426 selects either the positive 7-bit intensity modifier value or the negated value based on the remaining bit of the intensity representation from the multiplexor 445 in FIG. 22B. The selected (8-bit) modifier value is then brought both to a multiplexor 428 and to a bit-shifter 429 that shifts the modifier value one bit to the left, resulting in a 9-bit intensity modifier (corresponds to a multiplication of the value, in base ten, by two). The multiplexor 428 selects either the 8-bit modifier value or the 9-bit modifier value based on the MSB from the intensity codeword.

The result from the selection is the 9-bit intensity modifier value, out of the 48 possible modifier values, to use for a specific image element.

FIG. 27 schematically illustrates a possible hardware implementation of the table look-up 422 of FIG. 22B and comprising two mode-specific intensity tables. The two LSBs of the 3-bit input intensity codewords are input to four multiplexors 421A, 423A and 421B, 423B for selecting one 7-bit intensity modifier value from four possible modifier values for each multiplexor 421A, 423A and 421B, 423B. The selected intensity modifier values from the multiplexors 421A, 423A and 421B, 423B are input to a pair of multiplexors 425A, 425B. These multiplexors 425A, 425B each select one of these values based on 1-bit input data (1 bit of the 2-bit intensity representation) from the multiplexor 445 in FIG. 22B. The selected modifier values are then forwarded both to a multiplexor 425C. This multiplexor 425C selects, which of these two modifier input values and, thus, which intensity table that should be used for the current block based on 1-bit data from the OR-gate 437 of FIG. 22B. The selected modifier value is then processed in multiplexors 426, 428, negation means 427 and bit-shifter 429 as was discussed above in connection with FIG. 26.

It will be understood by a person skilled in the art that various modifications and changes may be made to the technology disclosed herein without departure from the scope thereof, which is defined by the appended claims.

REFERENCES

[1] U.S. Pat. No. 5,956,431
[2] Y. Linde, A. Buzo and R. Gray, "An algorithm for vector quantizer design", *IEEE Transactions on Communications*, Vol. 28, pp. 84-94, January, 1980

The invention claimed is:

1. A method of compressing an image block comprising multiple image elements, said method comprising the steps of:
 a computer-implemented color quantizer determining a color codeword that is a representation of the colors of said multiple image elements;
 a computer-implemented alpha quantizer providing an alpha codeword comprising multiple quantized alpha values that are representations of at least one alpha value of said multiple image elements;
 a computer-implemented intensity quantizer providing an intensity codeword that is a representation of a set of multiple intensity modifiers for modifying the intensity of said multiple image elements;
 a computer-implemented sequence provider providing an index sequence of image element associated indices; and a computer-implemented mode selector selecting a compression mode based on said alpha codeword, wherein if said selected compression mode is a first compression mode,
 said index sequence comprises a first index subsequence that comprises, for each subset of at least one image element in said image block, an intensity index associated with an intensity modifier from said intensity modifier set, and a second index subsequence that comprises, for each image element in at least a portion of said multiple image elements, an alpha index associated with a quantized alpha value from said multiple quantized alpha values, and if said selected compression mode is a second compression mode,
 said index sequence comprises, for each image element in said image block, an intensity index associated with an intensity modifier from said intensity modifier set.

2. The method according to claim 1, wherein said step of said computer-implemented mode selector selecting comprises said computer-implemented mode selector selecting said compression mode based on at least one of said multiple quantized alpha values of said alpha codeword.

3. The method according to claim 2, wherein said step of said computer-implemented mode selector selecting comprises the steps of:
 said computer-implemented mode selector selecting said first compression mode if said multiple quantized alpha values differ; and
 said computer-implemented mode selector selecting said second compression mode if said multiple quantized alpha values are equal.

4. The method according to claim 1, wherein said step of said computer-implemented intensity quantizer providing is performed after said step of said mode selector selecting said compression mode.

5. The method according to claim 1, wherein each of said subsets comprises two neighboring image elements in said image block.

6. The method according to claim 1, wherein each of said subsets comprises one image element and said intensity index is associated with an intensity modifier from a subset of said intensity modifier set.

7. The method according to claim 1, wherein said second index subsequence comprises, for each image element in a first portion of said multiple image elements, an alpha index associated with a quantized alpha value from said multiple quantized alpha values, each image element in a second remaining portion of said multiple image elements is associated with a pre-determined quantized alpha value from said multiple quantized alpha values.

8. A method of processing a compressed representation of an image block comprising multiple image elements, said compressed image block representation comprises a color codeword, an alpha codeword, an intensity codeword and an index sequence of image element associated indices, said method comprising the steps of:
 a computer-implemented mode selector selecting a decompression mode based on said alpha codeword;
 a computer-implemented sequence provider providing a set of multiple intensity modifiers based on said intensity codeword;
 for at least one image element in said image block:
 a computer-implemented color generator generating a color representation based on said color codeword;
 a computer-implemented modifier selector selecting an intensity modifier from said intensity modifier set based on said index sequence;

a computer-implemented intensity modifier modifying the intensity of said at least one image element based on said selected intensity modifier; and a computer-implemented alpha generator generating at least one alpha value based on said alpha codeword, wherein if said selected decompression mode is a first decompression mode, said method comprising the steps of:

a computer-implemented alpha assigner selecting, for said at least one image element, an alpha value from multiple alpha values generated based on said alpha codeword; and said computer-implemented alpha assigner assigning said selected alpha value to said at least one image element, and if said selected decompression mode is a second decompression mode, said method comprises the step of:

said computer-implemented alpha assigner assigning said at least one alpha value to said at least one image element.

9. The method according to claim 8, wherein said step of said computer-implemented mode selector selecting comprises the step of said computer-implemented mode selector selecting said decompression mode based on at least one quantized alpha value of multiple quantized alpha values represented by said alpha codeword.

10. The method according to claim 9, wherein said step of said computer-implemented mode selector selecting comprises the steps of:

said computer-implemented mode selector selecting said first decompression mode if said multiple quantized alpha values differ; and said computer-implemented mode selector selecting said second decompression mode if said multiple quantized alpha values are equal.

11. The method according to claim 8, wherein said step of said computer-implemented sequence provider providing is performed after said computer-implemented mode selector selecting said decompression mode.

12. The method according to claim 8, wherein in said first decompression mode said index sequence comprises a first index subsequence that comprises, for each subset of at least one image element in said image block, an intensity index associated with an intensity modifier from said intensity modifier set, and a second index subsequence that comprises, for each image element in at least a portion of said multiple image elements, an alpha index associated with an alpha value from said multiple alpha values, and in said second decompression mode said index sequence comprises, for each image element in said image block, an intensity index associated with an intensity modifier from said intensity modifier set.

13. The method according to claim 12, wherein said second index subsequence comprises, for each image element in a first portion of said multiple image elements, an alpha index associated with an alpha value from said multiple alpha values, each image element in a second remaining portion of said multiple image elements is associated with a pre-determined alpha value from said multiple alpha values.

14. The method according to claim 13, wherein said step of said computer-implemented alpha assigner selecting comprises, if said selected decompression mode is said first decompression mode, the steps of:

said computer-implemented alpha assigner selecting said alpha value from said multiple alpha values based on said index sequence if said at least one image element belongs to said first portion of said multiple image elements;

said computer-implemented alpha assigner selecting said pre-defined alpha value if said at least one image element belongs to said second remaining portion of said multiple image elements.

15. A computer-implemented compressor for compressing an image block comprising multiple image elements, said computer-implemented compressor comprising:

a color quantizer for determining a color codeword that is a representation of the colors of said multiple image elements;

an alpha quantizer for providing an alpha codeword comprising multiple quantized alpha values that are representations of at least one alpha value of said multiple image elements;

an intensity quantizer for providing an intensity codeword that is a representation of a set of multiple intensity modifiers for modifying the intensity of said multiple image elements;

a sequence provider for providing an index sequence of image element associated indices; and a signal generator for generating a compression mode signal based on said alpha codeword, wherein if said compression mode signal represents a first compression mode, said sequence provider is configured to provide a first index subsequence that comprises, for each subset of at least one image element in said image block, an intensity index associated with an intensity modifier from said intensity modifier set, and a second index subsequence that comprises, for each image element in at least a portion of said multiple image elements, an alpha index associated with a quantized alpha value from said multiple quantized alpha values, and if said compression mode signal represents a second compression mode, said sequence provider is configured to provide, for each image element in said image block, an intensity index associated with an intensity modifier from said intensity modifier set.

16. The computer-implemented compressor according to claim 15, wherein said signal generator generates said compression mode signal based on at least one of said multiple quantized alpha values of said alpha codeword.

17. The computer-implemented compressor according to claim 16, wherein said signal generator generates a first compression mode signal if said multiple quantized alpha values differ and generates a second compression mode signal if said multiple quantized alpha values are equal.

18. The computer-implemented compressor according to claim 15, wherein said intensity quantizer is configured for providing said intensity codeword in response to said compression mode signal.

19. The computer-implemented compressor according to claim 15, wherein each of said subsets comprises two neighboring images in said image block.

20. The computer-implemented compressor according to claim 15, wherein each of said subsets comprises one image element and said intensity index is associated with an intensity modifier from a subset of said intensity modifier set.

21. The computer-implemented compressor according to claim 15, wherein said second index subsequence comprises, for each image element in a first portion of said multiple image elements, an alpha index associated with a quantized alpha value of said multiple quantized alpha values, each image element in a second remaining portion of said multiple image elements is associated with a pre-determined quantized alpha value of said multiple quantized alpha values.

22. A computer program product stored on a computer-readable medium and defining a block encoder for compressing an image block comprising multiple image elements, said computer program product comprising coded instructions which, when executed by a computer, perform the functions of:
- determining a color codeword that is a representation of the colors of said multiple image elements;
- providing an alpha codeword comprising multiple quantized alpha values that are representations of at least one alpha value of said multiple image elements;
- providing an intensity codeword that is a representation of a set of multiple intensity modifiers for modifying the intensity of said multiple image elements;
- providing an index sequence of image element associated indices; and
- generating a compression mode signal based on said alpha codeword,
- wherein if said compression mode signal represents a first compression mode, providing a first index subsequence that comprises, for each subset of at least one image element in said image block, an intensity index associated with an intensity modifier from said intensity modifier set, and a second index subsequence that comprises, for each image element in at least a portion of said multiple image elements, an alpha index associated with a quantized alpha value from said multiple quantized alpha values, and if said compression mode signal represents a second compression mode, providing, for each image element in said image block, an intensity index associated with an intensity modifier from said intensity modifier set.

23. A computer-implemented program product stored on a computer-readable medium and defining a block decoder for processing a compressed representation of an image block comprising multiple image elements, said compressed representation comprising a color codeword, an alpha codeword, an intensity codeword and an index sequence of image element associated indices, said block decoder having computer program which when executed by a computer performs the following:
- provides a set of multiple intensity modifiers based on said intensity codeword;
- generates a color representation for at least one image element in said image block based on said color codeword;
- selects, for said at least one image element, an intensity modifier from said intensity modifier set based on said index sequence;
- modifies the intensity of said at least one image element based on said selected intensity modifier;
- generates at least one alpha value based on said alpha codeword;
- generates a decompression mode signal based on said alpha codeword; and
- wherein if said decompression mode signal represents a first decompression mode, selects an alpha value from multiple alpha values generated based on said alpha codeword and for assigning said selected alpha value to said at least one image element, and if said decompression mode signal represents a second decompression mode, assigns said at least one alpha value to said at least one image element.

24. A computer comprising a block decoder for processing a compressed representation of an image block comprising multiple image elements, said compressed image block representation comprises a color codeword, an alpha codeword, an intensity codeword and an index sequence of image element associated indices, said block decoder comprising:
- a set provider for providing a set of multiple intensity modifiers based on said intensity codeword;
- a color generator for generating a color representation for at least one image element in said image block based on said color codeword;
- a modifier selector for selecting, for said at least one image element, an intensity modifier from said intensity modifier set based on said index sequence;
- an intensity modifier for modifying the intensity of said at least one image element based on said selected intensity modifier;
- an alpha generator for generating at least one alpha value based on said alpha codeword;
- a signal generator for generating a decompression mode signal based on said alpha codeword; and
- an alpha assigner, wherein if said decompression mode signal represents a first decompression mode,
- said assigner is configured to select an alpha value from multiple alpha values generated based on said alpha codeword and for assigning said selected alpha value to said at least one image element, and if said decompression mode signal represents a second decompression mode,
- said assigner is configured to assign said at least one alpha value to said at least one image element.

25. A mobile user terminal comprising:
- a memory for storing a compressed representation of an image block comprising multiple image elements, said compressed representation of said image block comprises a color codeword, an alpha codeword, an intensity codeword and an index sequence of image element associated indices; and
- a block decoder for processing said compressed representation of said image block, said block decoder comprising:
  - a set provider for providing a set of multiple intensity modifiers based on said intensity codeword;
  - a color generator for generating a color representation for at least one image element in said image block based on said color codeword;
  - a modifier selector for selecting, for said at least one image element, an intensity modifier from said intensity modifier set based on said index sequence;
  - an intensity modifier for modifying the intensity of said at least one image element based on said selected intensity modifier;
  - an alpha generator for generating at least one alpha value based on said alpha codeword;
  - a signal generator for generating a decompression mode signal based on said alpha codeword; and
  - an alpha assigner, wherein if said decompression mode signal represents a first decompression mode,
  - said assigner is configured to select an alpha value from multiple alpha values generated based on said alpha codeword and for assigning said selected alpha value to said at least one image element, and if said decompression mode signal represents a second decompression mode,
  - said assigner is configured to assign said at least one alpha value to said at least one image element.

26. The mobile user terminal according to claim 25, wherein said signal generator is configured to generate said decompression mode signal based on the value of at least one quantized alpha value of multiple quantized alpha values represented by said alpha codeword.

27. The mobile user terminal according to claim 26, wherein said signal generator is configured to generate a first decompression mode signal if said multiple quantized alpha values differ and generates a second decompression mode signal if said multiple quantized alpha values are equal.

28. The mobile user terminal according to claim 25, wherein said set provider is configured for providing said set in response to said decompression mode signal.

29. The mobile user terminal according to claim 25, wherein in said first decompression mode said index sequence comprises a first index subsequence that comprises, for each subset of at least one image element in said image block, an intensity index associated with an intensity modifier from said intensity modifier set, and a second index subsequence that comprises, for each image element in at least a portion of said multiple image elements, an alpha index associated with an alpha value from said multiple alpha values, and in said second decompression mode said index sequence comprises, for each image element in said image block, an intensity index associated with an intensity modifier from said intensity modifier set.

30. The mobile user terminal according to claim 29, wherein said second index subsequence comprises, for each image element in a first portion of said multiple image elements, an alpha index associated with an alpha value from said multiple alpha values, each image element in a second remaining portion of said multiple image elements is associated with a pre-determined alpha value from said multiple alpha values.

31. The mobile user terminal according to claim 30, wherein said assigner is configured, if said decompression mode signal represents said first decompression mode, for selecting said alpha value from said multiple alpha values based on said index sequence if said at least one image element belongs to said first portion of said multiple image elements, and for selecting said pre-defined alpha value if said at least one image element belongs to said second remaining portion of said multiple image elements.

* * * * *

UNITED STATES PATENT AND TRADEMARK OFFICE
CERTIFICATE OF CORRECTION

PATENT NO. : 7,693,337 B2  
APPLICATION NO. : 10/583454  
DATED : April 6, 2010  
INVENTOR(S) : Strom et al.

Page 1 of 2

It is certified that error appears in the above-identified patent and that said Letters Patent is hereby corrected as shown below:

On the Title Page, in item (75), under "Inventor", in Column 1, Line 1, delete "Stockhoolm" and insert -- Stockholm --, therefor.

In Column 7, Line 46, after "an", insert -- example --.

In Column 10, Line 17, delete "singe" and insert -- single --, therefor.

In Column 12, Line 22, delete "exam le" and insert -- example --, therefor.

In Column 20, Line 55, insert -- $w_R = \frac{5}{16}, \quad w_G = \frac{9}{16}$ and --.

In Column 21, Lines 1-7, delete " $w_R = \frac{5}{16}, \quad w_G = \frac{9}{16}$ ".

In Column 22, Line 39, in Equation (8), delete " $\varepsilon^2 \approx \frac{2}{3}(\delta_R^2 + \delta_G^2 + \delta_B^2 - \delta_R\delta_G - \delta_R\delta_B + 36^2 + 36 \times 2\delta_R - \delta_G - \delta_B)$ " and insert -- $\varepsilon^2 \approx \frac{2}{3}(\delta_R^2 + \delta_G^2 + \delta_B^2 - \delta_R\delta_G - \delta_R\delta_B - \delta_G\delta_B + 36^2 + 36 \times 2\delta_R - \delta_G - \delta_B)$ --, therefor.

In Column 22, Line 47, delete "$_{Glow}$," and insert -- $G_{low}$, --, therefor.

In Column 27, Line 59, delete "1010 0101$_{bin}$." and insert -- 1010 1010$_{bin}$ --, therefor.

Signed and Sealed this

Fifth Day of October, 2010

David J. Kappos  
*Director of the United States Patent and Trademark Office*

In Column 28, Line 55, delete "0110110$_{bin}$" and insert -- 10110110$_{bin}$ --, therefor.

In Column 28, Line 56, delete "0l00100$_{bin}$" and insert -- 01001001$_{bin}$ --, therefor.

In Column 28, Line 57, delete "0110110$_{bin}$" and insert -- 00100100$_{bin}$ --, therefor.

In Column 29, Line 60, delete "0.66670" and insert -- 0.6667 --, therefor.

In Column 38, Line 36, delete "average" and insert -- averager --, therefor.